US008994658B2

(12) United States Patent
Yamamoto et al.

(10) Patent No.: US 8,994,658 B2
(45) Date of Patent: Mar. 31, 2015

(54) INPUT APPARATUS, CONTROL APPARATUS, CONTROL METHOD, AND HANDHELD APPARATUS

(75) Inventors: Kazuyuki Yamamoto, Tokyo (JP); Toshio Mamiya, Tokyo (JP); Hidetoshi Kabasawa, Tokyo (JP); Katsuhiko Yamada, Tokyo (JP); Takashi Yamada, Tokyo (JP); Hideaki Kumagai, Tokyo (JP)

(73) Assignee: Sony Corporation, Tokyo (JP)

( * ) Notice: Subject to any disclaimer, the term of this patent is extended or adjusted under 35 U.S.C. 154(b) by 1219 days.

(21) Appl. No.: 12/522,086

(22) PCT Filed: Jul. 4, 2008

(86) PCT No.: PCT/JP2008/062211
§ 371 (c)(1),
(2), (4) Date: Jul. 2, 2009

(87) PCT Pub. No.: WO2009/005150
PCT Pub. Date: Jan. 8, 2009

(65) Prior Publication Data
US 2010/0001953 A1 Jan. 7, 2010

(30) Foreign Application Priority Data

Jul. 4, 2007 (JP) ................................. 2007-176800
May 13, 2008 (JP) ................................. 2008-125939
May 13, 2008 (JP) ................................. 2008-125984

(51) Int. Cl.
*G06F 3/033* (2013.01)
*G06F 3/038* (2013.01)
*G06F 3/0346* (2013.01)

(52) U.S. Cl.
CPC .............. *G06F 3/038* (2013.01); *G06F 3/0346* (2013.01)

USPC ............................ 345/158; 345/163; 345/166

(58) Field of Classification Search
USPC ............................ 345/156–169; 715/856–865
See application file for complete search history.

(56) References Cited

U.S. PATENT DOCUMENTS 5,298,918 A * 3/1994 Yen-Chen et al. ............ 345/163
5,453,758 A 9/1995 Sato (Continued)

FOREIGN PATENT DOCUMENTS

JP 6-326887 11/1994
JP 7-284166 10/1995

(Continued)

OTHER PUBLICATIONS

Supplementary European Search Report mailed Jul. 5, 2011, for corresponding European Appln. No. 08790892.7.

(Continued)

*Primary Examiner* — Jason Olson
*Assistant Examiner* — Sosina Abebe
(74) *Attorney, Agent, or Firm* — K&L Gates LLP

(57) ABSTRACT

To provide an input apparatus, a control apparatus, a control system, and a control method that are capable of improving an operational feeling when a user uses the input apparatus to input an operation signal via an operation section. An MPU (19) of an input apparatus (1) stops generating or transmitting a movement command corresponding to a displacement amount of a pointer on a screen, during a predetermined timer-operating time period since a cancel of an input of an operation signal (Step 309) made by a user using an operation button. Alternatively, it is also possible for the MPU (19) to continue outputting the movement command with the displacement amount of the pointer on the screen set to 0 during the predetermined time period (Step 311). By such processing, a movement of the pointer on the screen is regulated even when a casing of the input apparatus is moved when the user presses and releases the operation button and the movement is detected by a sensor unit.

19 Claims, 38 Drawing Sheets

(56) References Cited

U.S. PATENT DOCUMENTS

| | | | |
|---|---|---|---|
| 5,554,980 A | 9/1996 | Hashimito et al. | |
| 6,072,470 A * | 6/2000 | Ishigaki | 345/158 |
| 6,732,170 B2 * | 5/2004 | Miyake et al. | 709/223 |
| 2005/0231472 A1 * | 10/2005 | Gordon et al. | 345/157 |
| 2005/0253806 A1 * | 11/2005 | Liberty et al. | 345/156 |
| 2006/0094480 A1 | 5/2006 | Tanaka | |

FOREIGN PATENT DOCUMENTS

| | | | | |
|---|---|---|---|---|
| JP | 9-167040 | 6/1997 | | |
| JP | 10207636 A * | 8/1998 | | G60F 3/033 |
| JP | 2001-56743 | 2/2001 | | |
| JP | 3264291 | 12/2001 | | |
| JP | 2002-82773 | 3/2002 | | |
| JP | 2006-113859 | 4/2006 | | |
| JP | 2006-119791 | 5/2006 | | |

OTHER PUBLICATIONS

International Search Report dated Sep. 9, 2008.

* cited by examiner

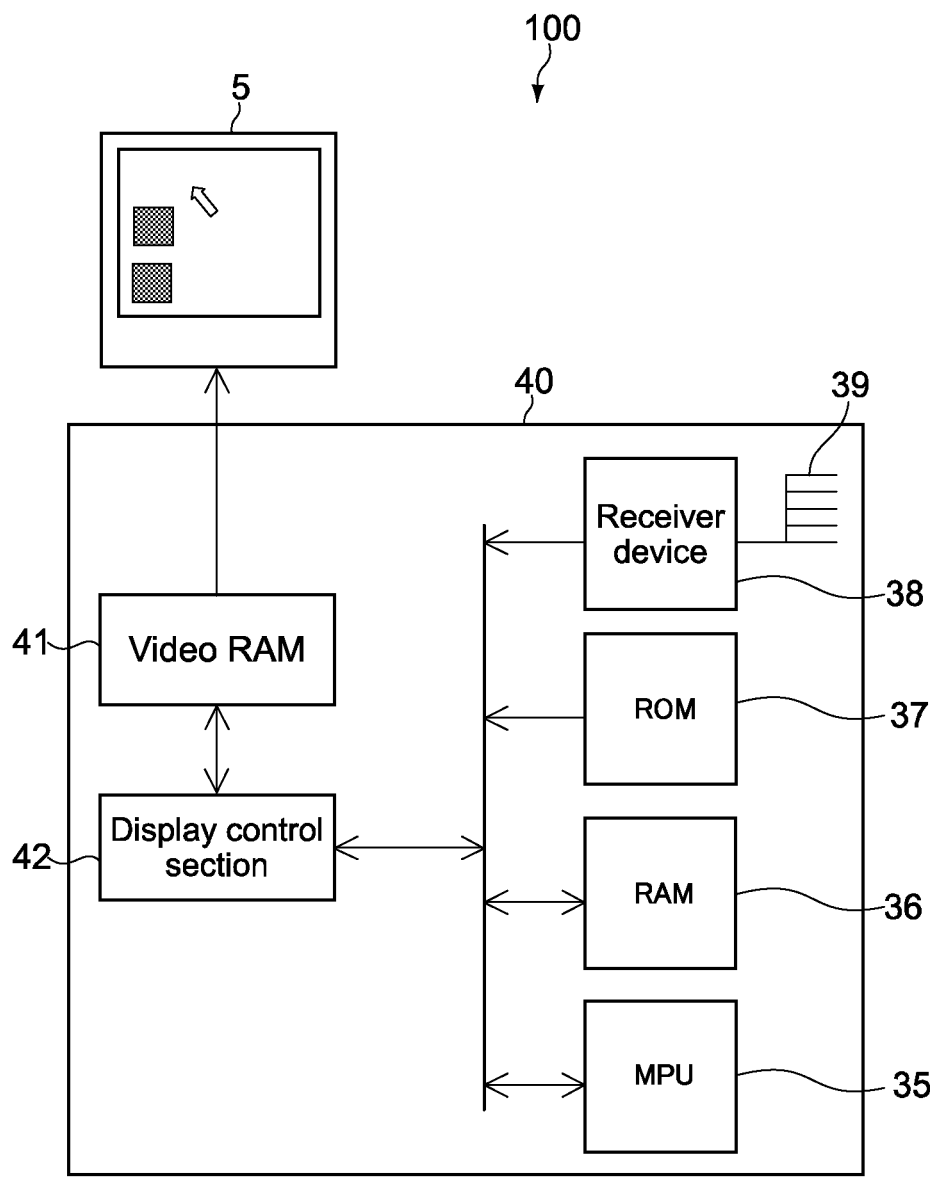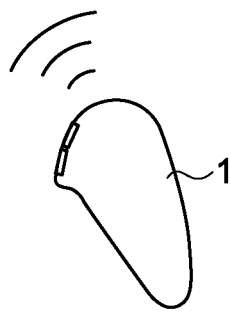
FIG.1

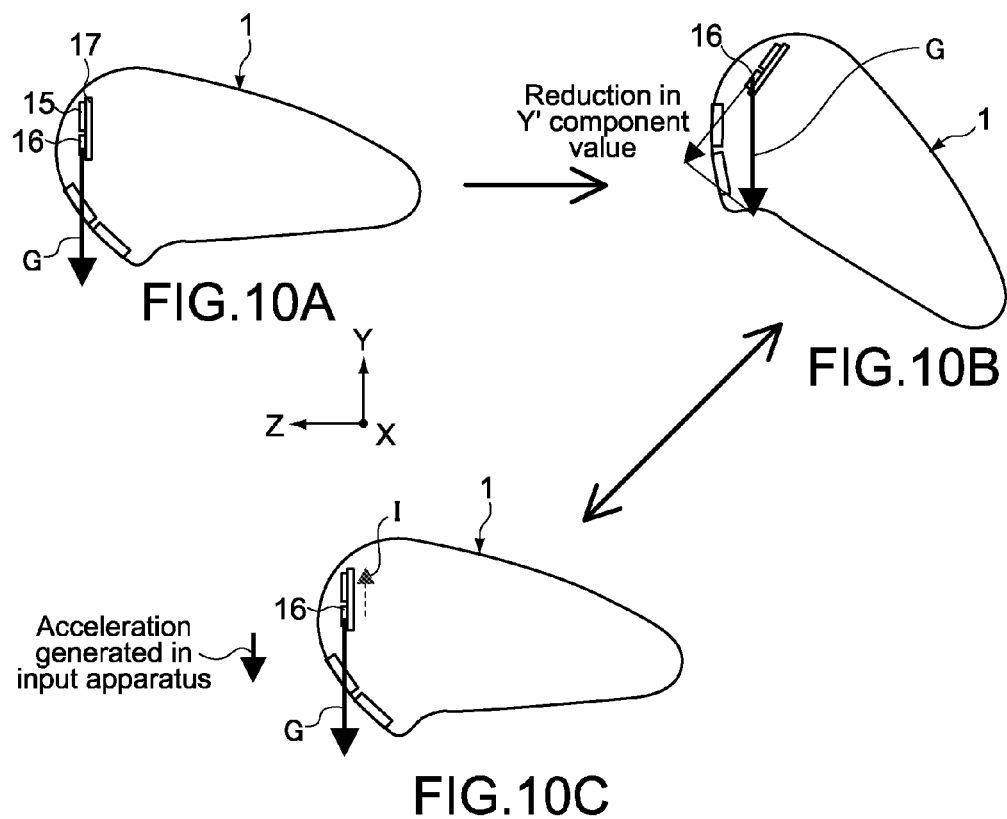

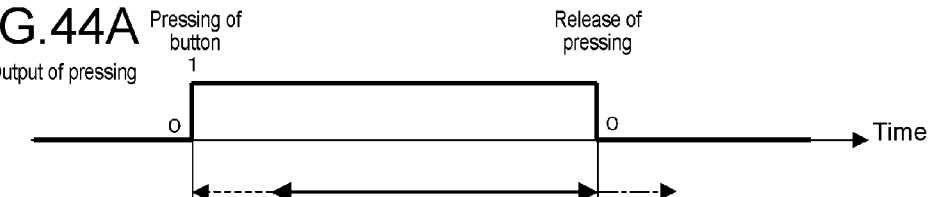
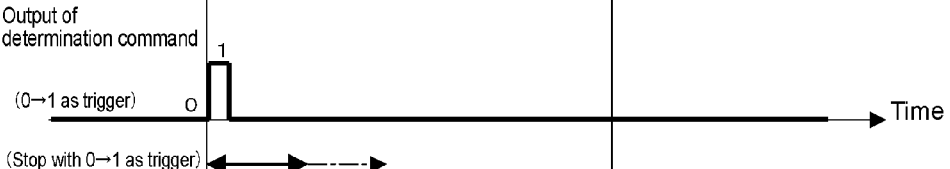
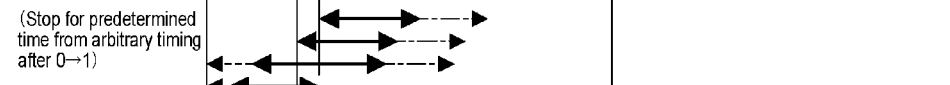
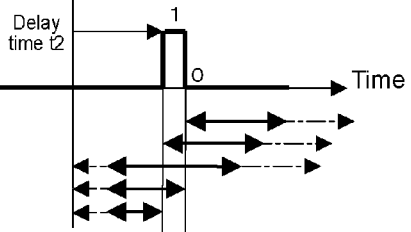

INPUT APPARATUS, CONTROL APPARATUS, CONTROL METHOD, AND HANDHELD APPARATUS

CROSS REFERENCE TO RELATED APPLICATIONS

The present application is a national stage of International Application No. PCT/JP2008/062211 filed on Jul. 4, 2008 and claims priority to Japanese Patent Application No. 2007-176800 filed on Jul. 4, 2007; Japanese Patent Application No. 2008-125939 filed on May 13, 2008; and Japanese Patent Application No. 2008-125984 filed on May 13, 2008, the disclosures of which are incorporated herein by reference.

BACKGROUND

The present invention relates to an input apparatus for 3-dimensional operations used for operating GUIs (Graphical User Interfaces), a control apparatus for controlling the GUIs in accordance with operational information, a control system including those apparatuses, a control method, and a handheld apparatus.

Pointing devices, particularly a mouse and a touchpad, are used as controllers for GUIs widely used in PCs (Personal Computers). Not just as HIs (Human Interfaces) of PCs of the related art, the GUIs are now starting to be used as interfaces for AV equipment and game machines used in living rooms etc. with televisions as image media. Various pointing devices that a user is capable of operating 3-dimensionally are proposed as controllers for the GUIs of this type (see, for example, Patent Documents 1 and 2).

Patent Document 1 discloses an input apparatus including angular velocity gyroscopes of two axes, that is, two angular velocity sensors. Each angular velocity sensor is a vibration-type angular velocity sensor. For example, upon application of an angular velocity with respect to a vibrating body piezoelectrically vibrating at a resonance frequency, Coriolis force is generated in a direction orthogonal to a vibration direction of the vibrating body. The Coriolis force is in proportion to the angular velocity, so detection of the Coriolis force leads to detection of the angular velocity. The input apparatus of Patent Document 1 detects angular velocities about two orthogonal axes by the angular velocity sensors, generates, in accordance with the angular velocities, a command signal as positional information of a cursor or the like displayed by a display means, and transmits it to the control apparatus.

Incidentally, such pointing devices are generally provided with, in addition to detection of a positional change by various sensors, a command input key mainly typified by left and right buttons or a wheel button of a mouse. When issuing some kind of a command to an icon as an operation target, a user operates the pointing device to place a pointer on an arbitrary icon and presses the command input key. However, there are cases where the pointing device itself is moved by an operation caused when pressing the command input key, and the pointer is consequently moved according to the pointing device. As a result, there arises a problem that operations unintended by the user are made, such as the pointer is moved from the icon as the operation target and a command cannot be issued, or, though intended for a click operation, by the pointer moving while the user is pressing the button, a drag operation is made.

To solve the problems as described above, Patent Document 2 discloses processing in which, while an enter operation is being made by the pointing device (remote commander), that is, while the button is pressed, the pointer is not moved. However, there is a problem that although the PC processes the operation as the drag operation if an enter operation signal is generated for more than a predetermined time period, if operations of the pointer are stopped during the entire time period during which an enter code is input, the PC cannot carry out the drag operation on the contrary. For solving this problem, Patent Document 2 also discloses processing in which a predetermined time period is counted from a point when enter information is input, and a display output of the pointer is stopped only during that time period.

Patent Document 1: Japanese Patent Application Laid-open No. 2001-56743 (paragraphs (0030) and (0031), FIG. 3)
Patent Document 2: Japanese Patent No. 3,264,291 (paragraphs (0062) and (0063))

SUMMARY

The PC and the like, however, often recognizes the command when the user releases the pressed button and the enter code is thus canceled. Therefore, depending on the way the button is released, the pointer may move from the icon before the PC issues a command. In this case, the PC cannot issue a command.

Moreover, as described above, since the PC recognizes the command when the enter code is canceled, when the pointing device is moved during a double click, there is a fear that the PC may erroneously judge to have been dragged.

Here, using the input apparatus with which the movement of the pointer is stopped during a predetermined time period since a starting point of the input of the enter code as described in Patent Document 2, for example, the inventors of the present invention have conducted an experiment, that targets a plurality of users, on an optimal value of the time period during which the pointer is to be stopped. As a result, the optimal value of the time period during which the pointer is to be stopped since the starting point of the input of the enter information, that is, the time period during which the pointer is to be stopped since the start of the pressing of the button by the user varied depending on the user with differences among individuals being large.

For example, even when a stop time period of the pointer is an optimal value for a certain user, other users may feel that the stop time period of the pointer may be too long or too short.

In the case of the user who feels that the stop time period of the pointer is long, there is a problem that even when the user swings the input apparatus immediately after placing the pointer on an icon and pressing the button so as to move the pointer, the pointer does not move during a predetermined time period, resulting in a poor operational feeling.

On the other hand, in the case of the user who feels that the stop time period of the pointer is short, there is a problem that though wanting the pointer to still be placed on the icon after pressing the button, the movement of the pointer is started, resulting in a poor operational feeling.

The problem regarding the operational feeling as described above is considered to be derived from the fact that the time period during which the pointer is stopped is fixed.

In view of the circumstances above, an object of the present invention is to provide an input apparatus, a control apparatus, a control system, a control method, and a handheld apparatus that are capable of improving an operational feeling when a user uses the input apparatus to input an operation signal via an operation section.

Means for Solving the Problems

To achieve the object above, there is provided an input apparatus outputting a command for controlling a pointer on a screen, including: a casing; a sensor to detect a movement of the casing and output a detection signal corresponding to the movement of the casing; an operation section to input an operation signal with respect to the input apparatus, that is unrelated to the movement of the casing; a command output means for outputting a movement command corresponding to a displacement amount of the pointer on the screen, the movement command corresponding to the detection signal, and an operation command corresponding to the operation signal input via the operation section; and a control means for controlling the command output means so that, during a first time period since a cancel of the input of the operation signal via the operation section, the output of the movement command is stopped or the movement command with the displacement amount set to 0 is output.

In the present invention, during a predetermined time period since the cancel of the input of the operation signal, the movement of the pointer on the screen is regulated even when the detection signal corresponding to the movement of the casing is output by the sensor. In other words, even when the user inputs the operation signal to the input apparatus via the operation section and the casing is moved when canceling the input, the movement of the pointer is regulated. Therefore, it is possible to prevent operations of the pointer, icon, or the like unintended by the user from being made.

The stop of the output of the command means that at least one of a stop of generation of the command and a stop of transmission of the command is carried out. The same holds true in descriptions below.

In the present invention, the control means controls the command output means so that, during a second time period since a start of the input of the operation signal via the operation section, the output of the movement command is stopped. Specifically, it is possible to prevent a situation in which the pointer is moved from the icon when the input apparatus is inadvertently moved by the user operating the operation section, and to carry out, for example, a drag operation since the stopped state is released after the second time period even when the operation signal is continued to be input.

The second time period may be the same as the first time period, or may be different.

In the present invention, the control means controls the command output means so that, during a second time period since a start of the input of the operation signal via the operation section, the movement command with the displacement amount set to 0 is output. Even when the movement command with the displacement amount set to 0 is output instead of stopping the output of the movement command as described above, the same effect can be obtained.

In the present invention, the control means controls the command output means so that, when the input of the operation signal is started within the first time period since the cancel of the input of the operation signal, the output of the movement command is stopped during a second time period since the start of the input of the operation signal. Alternatively, the control means controls the command output means so that, when the input of the operation signal is started within the first time period since the cancel of the input of the operation signal, the movement command with the displacement amount set to 0 is output during a second time period since the start of the input of the operation signal. Accordingly, the user can control the pointer and the like without feeling uncomfortable.

In the present invention, the control means controls the command output means so that, when the input of the operation signal is canceled within the second time period since the start of the input of the operation signal, the output of the movement command is stopped during the first time period since the cancel of the input of the operation signal. Alternatively, the control means controls the command output means so that, when the input of the operation signal is canceled within the second time period since the start of the input of the operation signal, the movement command with the displacement amount set to 0 is output during the first time period since the cancel of the input of the operation signal. Accordingly, the user can control the pointer and the like without feeling uncomfortable.

In the present invention, the operation section includes a push button to input the operation signal. In the case of the present invention, the input of the operation signal is started with the pressing of the push button by the user as a trigger, and the input of the operation signal is canceled with the release of the pressed push button by the user as a trigger.

In the present invention, the sensor is a biaxial angular velocity sensor or a biaxial acceleration sensor to detect a movement corresponding to an X axis as a horizontal axis on the screen and a movement corresponding to a Y axis as a vertical axis on the screen.

According to the present invention, there is provided a control apparatus controlling a pointer on a screen in accordance with a detection signal and an operation signal output from an input apparatus including a casing, a sensor to detect a movement of the casing and output the detection signal corresponding to the movement of the casing, and an operation section to input the operation signal that is unrelated to the movement of the casing, the control apparatus including: a reception means for receiving the detection signal and the operation signal; an output means for outputting a first control signal corresponding to a displacement amount of the pointer on the screen, the first control signal corresponding to the detection signal, and a second control signal corresponding to the operation signal input via the operation section; a processing means for controlling a display position of the pointer on the screen in accordance with the first control signal and executing predetermined processing in accordance with the second control signal; and a control means for controlling the output means so that, during a first time period since a cancel of the input of the operation signal via the operation section, the output of the first control signal is stopped or the first control signal with the displacement amount set to 0 is output.

According to the present invention, there is provided a control system controlling a pointer on a screen, including: an input apparatus including a casing, a sensor to detect a movement of the casing and output a detection signal corresponding to the movement of the casing, an operation section to input an operation signal that is unrelated to the movement of the casing, a command output means for outputting a movement command corresponding to a displacement amount of the pointer on the screen, the movement command corresponding to the detection signal, and an operation command corresponding to the operation signal input via the operation section, and a control means for controlling the command output means so that, during a first time period since a cancel of the input of the operation signal via the operation section, the output of the movement command is stopped or the movement command with the displacement amount set to 0 is output; and a control apparatus including a reception means for receiving a signal of the movement command and a signal of the operation command, and a processing means for controlling a display position of the pointer on the screen in accordance with the received movement command and executing predetermined processing in accordance with the received operation command.

According to another aspect of the present invention, there is provided a control system controlling a pointer on a screen, including: an input apparatus including a casing, a sensor to detect a movement of the casing and output a detection signal corresponding to the movement of the casing, and an operation section to input an operation signal that is unrelated to the movement of the casing; and a control apparatus including a reception means for receiving the detection signal and the operation signal, an output means for outputting a first control signal corresponding to a displacement amount of the pointer on the screen, the first control signal corresponding to the detection signal, and a second control signal corresponding to the operation signal input via the operation section, a processing means for controlling a display position of the pointer on the screen in accordance with the first control signal and executing predetermined processing in accordance with the second control signal, and a control means for controlling the output means so that, during a first time period since a cancel of the input of the operation signal via the operation section, the output of the first control signal is stopped or the first control signal with the displacement amount set to 0 is output.

According to the present invention, there is provided a control method including: detecting a movement of a casing of an input apparatus and outputting a detection signal corresponding to the movement of the casing; outputting a movement command corresponding to a displacement amount of a pointer on a screen, the movement command corresponding to the detection signal; controlling a display position of the pointer on the screen in accordance with the movement command; outputting an operation command corresponding to an operation signal with respect to the input apparatus input via an operation section of the casing, the operation signal being unrelated to the movement of the casing; executing predetermined processing in accordance with the operation command; and controlling the output so that, during a first time period since a cancel of the input of the operation signal via the operation section, the output of the movement command is stopped or the movement command with the displacement amount set to 0 is output.

In the present invention, the operation section may be an operation section to input, as the operation signal, a code-corresponding operation signal corresponding to a code that includes at least one of a letter, a number, and a symbol.

In the present invention, even when the user inputs input information including letters or numbers via the operation section and the input apparatus is moved when canceling the input operation, for example, the movement of the pointer is regulated during the first time period. Accordingly, the pointer is prevented from making any moves unintended by the user.

In the present invention, the control means controls the command output means so that, from a start of the input of the code-corresponding operation signal until the input of the code-corresponding operation signal is canceled, the output of the movement command is stopped.

Accordingly, the movement of the pointer is regulated even when the input apparatus is moved during the time period from when the user starts inputting the input information including letters and numbers via the operation section to the cancel of the input operation.

In the present invention, the control means controls the command output means so that, from a start of the input of the code-corresponding operation signal until the input of the code-corresponding operation signal is canceled, the movement command with the displacement amount set to 0 is output.

According to another aspect of the present invention, there is provided an input apparatus controlling a movement of a pointer on a screen, including: a casing; a movement signal output means for detecting a movement of the casing and outputting a first movement signal corresponding to the movement of the casing; an operation section to output an operation signal that is unrelated to the movement of the casing; a command output means for outputting a movement command for moving the pointer on the screen and an operation command corresponding to the operation signal; an output control means for controlling the output of the movement command so that, after the operation signal is input, during a first time period since a cancel of the input of the operation signal, the movement of the pointer on the screen is stopped; and a time control means for variably controlling the first time period in accordance with the first movement signal.

In the input apparatus according to the present invention, the time period during which the pointer is to be stopped since the cancel of the input of the operation signal (first time period) can be changed appropriately in accordance with the first movement signal. Accordingly, the pointer can be readily moved when the user swings the input apparatus immediately after canceling the input operation to the operation section so as to move the pointer. On the other hand, the pointer can be stopped when the user wishes to keep the pointer placed on the icon, for example. As described above, the input apparatus according to the present invention is capable of preventing operations of the pointer, the icon, and the like unintended by the user from being made, and improving an operational feeling of the user in pointing operations.

The movement signal output means includes a sensor, or a sensor and means for performing a calculation based on a detection value detected by the sensor. For example, when the sensor is an angular velocity sensor, an angular velocity value may be detected as the detection value, and the angular velocity value may be output as it is as the first movement signal, or the detected angular velocity value may be calculated to obtain an angular acceleration value, and the angular acceleration value may be output as the first movement signal. Alternatively, the angular velocity value may be detected and calculated to obtain a velocity value, and the velocity value may be output as the first movement signal.

Examples of the first movement signal include an angular velocity value, an angular acceleration value, a velocity value, and an acceleration value. However, the first movement signal is not limited thereto, and may be a value of an angular acceleration change rate, a value of an acceleration change rate, or the like, or any other signals may be used as long as it is a signal corresponding to the movement of the casing. Moreover, an absolute value may be used for the first movement signal.

"Controls the output of the movement command so that the movement of the pointer is stopped" includes a case where the output of the movement command itself is stopped to thus stop the movement of the pointer, a case where the movement command is output as 0 to thus stop the movement of the pointer, and the like.

In the present invention, the time control means controls the first time period so that the first time period is shortened as an output value of the first movement signal increases.

For example, there may be a case where a user who is good at performing pointing operations swings the input apparatus immediately after canceling the input operation to the operation section so as to move the pointer. In this case, the output value of the movement signal increases in accordance with the movement of the input apparatus when swung by the user. In the present invention, the first time period can be shortened as the output value of the first movement signal obtained after the input of the operation signal increases. Accordingly, the user can shift to the pointing operation smoothly after the cancel of the input operation to the operation section, thus improving an operational feeling.

In the present invention, the time control means controls the first time period so that the first time period is prolonged as an output value of a signal within a predetermined frequency range out of an output value of the first movement signal increases.

The signal within the predetermined frequency range is a signal within a frequency range that corresponds to an apparatus shake.

For example, there are cases where the user who is not good at performing delicate operations on the pointer causes a large apparatus shake, in the case of which the user wishes for the pointer to be stopped for a longer time period after the cancel of the input operation to the operation section. In the present invention, the first time period can be prolonged as the output value of the signal within the frequency range corresponding to the apparatus shake increases. Accordingly, pointing operations become easier for the user who causes a large apparatus shake, thus improving an operational feeling.

In the present invention, the movement signal output means outputs a second movement signal different from the first movement signal, that corresponds to the movement of the casing, and the time control means controls the first time period so that the first time period is shortened as an output value of the second movement signal increases.

In the present invention, the first time period is controlled variably in accordance with a magnitude of the output value of the two different movement signals. Accordingly, the first time period can be shortened appropriately.

In the present invention, the time control means includes a count means for counting the first time period by a predetermined count amount, and a count amount control means for controlling the count amount so that the count amount increases as the output value of the first movement signal increases.

In the present invention, because the count amount increases as the first movement signal increases, the count by the count means can be made shorter as the first movement signal increases. Therefore, because the first time period can be shortened as the first movement signal increases, the user can shift to the pointing operation smoothly after the cancel of the input operation to the operation section.

The count by the count means may either be by counting up or down.

In the present invention, the count amount control means controls the count amount so that the count amount decreases as an output value of a predetermined frequency out of the output value of the first movement signal increases.

In the present invention, because the count amount decreases as the output value of the predetermined frequency, that is, the output value of the signal corresponding to an apparatus shake increases, the count by the count means can be made longer as the apparatus shake becomes larger. Therefore, because the first time period can be prolonged as the apparatus shake becomes larger, an operational feeling in pointing operations can be improved.

In the present invention, the movement signal output means outputs a second movement signal different from the first movement signal, that corresponds to the movement of the casing, and the count amount control means controls the count amount so that the count amount increases as an output value of the second movement signal increases.

In the present invention, because the count amount increases as the output value of the two different movement signals increases, the count by the count means can be shortened as the output value of the two movement signals increases. Accordingly, because the first time period can be shortened as the two different movement signals increase, the first time period can be shortened appropriately.

In the present invention, the output control means controls the output of the movement command so that, during a second time period since a start of the input of the operation signal, the movement of the pointer on the screen is stopped.

In the present invention, the movement of the pointer on the screen is regulated during the second time period since the start of the input of the operation signal. Accordingly, a situation in which the pointer is moved from the icon as the input apparatus is inadvertently moved when the user starts the input operation to the operation section can be prevented. Furthermore, because the pointer is released from its regulated state after the second time period even when the operation signal is continued to be input, a drag operation can be executed on the screen, for example.

In the present invention, the time control means variably controls the second time period in accordance with the first movement signal.

In the present invention, the time period during which the pointer is to be stopped from the start of the input of the operation signal (second time period) can be changed appropriately in accordance with the movement signal. Accordingly, the pointer is prevented from making any moves unintended by the user at the start of the input operation to the operation section, and an operational feeling in pointing operations as described above can be improved.

Further, the second time period as the time period required until the drag operation is started when the user continues the input operation to the operation section can be varied in accordance with the movement signal, for example. Accordingly, the user can readily shift to the drag operation when the user swings the input apparatus immediately after the start of the input operation to the operation section for drag.

In the present invention, the time control means controls the second time period so that the second time period is shortened as an output value of the first movement signal increases.

Accordingly, the user can shift to the pointing operation smoothly after the start of the input operation to the operation section.

In the present invention, the time control means controls the second time period so that the second time period is prolonged as an output value of a signal within a predetermined frequency range out of an output value of the first movement signal increases.

Accordingly, pointing operations become easier even for users who cause large apparatus shakes, thus improving an operational feeling.

In the present invention, the movement signal output means outputs a second movement signal different from the first movement signal, that corresponds to the movement of the casing, and the time control means controls the second time period so that the second time period is shortened as an output value of the second movement signal increases.

Accordingly, the second time period can be shortened appropriately.

In the present invention, the output control means controls the output of the movement command so that, when the input of the operation signal is started within the variably-controlled first time period, during the variably-controlled second time period since the start of the input of the operation signal, the movement of the pointer on the screen is stopped.

Accordingly, the user can naturally operate the pointer and the like on the screen without feeling uncomfortable.

In the present invention, the output control means controls the output of the movement command so that, when the input of the operation signal is canceled within the variably-controlled second time period, during the variably-controlled first time period since the cancel of the input of the operation signal, the movement of the pointer on the screen is stopped.

Accordingly, the user can naturally operate the pointer and the like on the screen without feeling uncomfortable.

According to another aspect of the present invention, there is provided a control apparatus controlling a movement of a pointer on a screen in accordance with a movement signal and an operation signal output from an input apparatus including a casing, a movement signal output means for detecting a movement of the casing and outputting the movement signal corresponding to the movement of the casing, and an operation section to output the operation signal that is unrelated to the movement of the casing, the control apparatus including: a reception means for receiving the movement signal and the operation signal; an output means for outputting a first control signal for moving the pointer and a second control signal corresponding to the operation signal; a processing means for controlling display of the movement of the pointer on the screen in accordance with the first control signal and executing predetermined processing in accordance with the second control signal; an output control means for controlling the output of the first control signal so that, after the operation signal is input, during a first time period since a cancel of the input of the operation signal, the movement of the pointer on the screen is stopped; and a time control means for variably controlling the first time period in accordance with the movement signal.

In the present invention, the output control means controls the output of the first control signal so that, during a second time period since a start of the input of the operation signal, the movement of the pointer on the screen is stopped.

In the present invention, the time control means variably controls the second time period in accordance with the movement signal.

According to another aspect of the present invention, there is provided a control system controlling a movement of a pointer on a screen, including: an input apparatus including a casing, a movement signal output means for detecting a movement of the casing and outputting a movement signal corresponding to the movement of the casing, an operation section to output an operation signal that is unrelated to the movement of the casing, a command output means for outputting a movement command for moving the pointer and an operation command corresponding to the operation signal, an output control means for controlling the output of the movement command so that, after the operation signal is input, during a first time period since a cancel of the input of the operation signal, the movement of the pointer on the screen is stopped, and a time control means for variably controlling the first time period in accordance with the movement signal; and a control apparatus including a reception means for receiving a signal of the movement command and a signal of the operation command, and a processing means for controlling display of the movement of the pointer on the screen in accordance with the movement command and executing predetermined processing in accordance with the operation command.

According to still another aspect of the present invention, there is provided a control system controlling a movement of a pointer on a screen, including: an input apparatus including a casing, an output means for detecting a movement of the casing and outputting a movement signal corresponding to the movement of the casing, and an operation section to output an operation signal that is unrelated to the movement of the casing; and a control apparatus including a reception means for receiving the movement signal and the operation signal, an output means for outputting a first control signal for moving the pointer and a second control signal corresponding to the operation signal; a processing means for controlling display of the movement of the pointer on the screen in accordance with the first control signal and executing predetermined processing in accordance with the second control signal, an output control means for controlling the output of the first control signal so that, after the operation signal is input, during a first time period since a cancel of the input of the operation signal, the movement of the pointer on the screen is stopped, and a time control means for variably controlling the first time period in accordance with the movement signal.

According to another aspect of the present invention, there is provided a control method including: detecting a movement of a casing and outputting a movement signal corresponding to the movement of the casing; outputting a movement command for moving a pointer on a screen; controlling display of a movement of the pointer on the screen in accordance with the movement command; outputting an operation command corresponding to an operation signal that is unrelated to the movement of the casing; executing predetermined processing in accordance with the operation command; controlling the output of the movement command so that, during a first time period since a cancel of the input of the operation signal, the movement of the pointer on the screen is stopped; and variably controlling the first time period in accordance with the movement signal.

To achieve the object above, according to the present invention, there is provided an input apparatus controlling a movement of a pointer on a screen, including: a casing; a movement signal output means for detecting a movement of the casing and outputting a first movement signal corresponding to the movement of the casing; an operation section to output an operation signal that is unrelated to the movement of the casing; a command output means for outputting a movement command for moving the pointer on the screen and an operation command corresponding to the operation signal; an output control means for controlling the output of the movement command so that, after the operation signal is input, during a first time period since a start of the input of the operation signal, the movement of the pointer on the screen is stopped; and a time control means for variably controlling the first time period in accordance with the first movement signal.

In the input apparatus according to the present invention, the time period during which the pointer is to be stopped since the input of the operation signal (first time period) can be changed appropriately in accordance with the first movement signal. Accordingly, the pointer can be readily moved when the user moves the input apparatus immediately after starting the input operation to the operation section so as to move the pointer, for example. On the other hand, the pointer can be stopped when the user wishes to keep the pointer placed at a predetermined position. As described above, the input apparatus according to the present invention is capable of improving an operational feeling of the user in pointing operations.

Further, in the present invention, because the pointer can be moved after the first time period, when the user continues the input operation to the operation section for a time period equal to or longer than the first time period, for example, the drag operation can be executed on the screen. Furthermore, because the first time period is variable in accordance with the first movement signal as described above, when the user moves the input apparatus immediately after starting the input operation to the operation section for drag, a shift can be readily made to the drag operation.

The movement signal output means includes a sensor, or a sensor and means for performing a calculation based on a detection value detected by the sensor. For example, when the sensor is an angular velocity sensor, an angular velocity value may be detected as the detection value, and the angular velocity value may be output as it is as the first movement signal, or the detected angular velocity value may be calculated to obtain an angular acceleration value, and the angular acceleration value may be output as the first movement signal. Alternatively, the angular velocity value may be detected and calculated to obtain a velocity value, and the velocity value may be output as the first movement signal.

Examples of the first movement signal include an angular velocity value, an angular acceleration value, a velocity value, and an acceleration value. However, the first movement signal is not limited thereto, and may be a value of an angular acceleration change rate, a value of an acceleration change rate, or the like, or any other signals may be used as long as it is a signal corresponding to the movement of the casing. An absolute value may be used for the first movement signal.

"Controls the output of the movement command so that the movement of the pointer is stopped" includes a case where the output of the movement command itself is stopped to thus stop the movement of the pointer, a case where the movement command is output as 0 to thus stop the movement of the pointer, and the like.

In the input apparatus, the time control means controls the first time period so that the first time period is shortened as an output value of the first movement signal increases.

For example, there may be a case where a user who is good at performing pointing operations moves the input apparatus immediately after starting the input operation to the operation section so as to move the pointer. In this case, the output value of the movement signal increases in accordance with the movement of the casing. In the present invention, the first time period can be shortened as the output value of the first movement signal obtained after the input of the operation signal increases. Accordingly, the user can shift to the pointing operation smoothly after the start of the input operation to the operation section, thus improving an operational feeling.

In the input apparatus, the time control means controls the first time period so that the first time period is prolonged as an output value of a signal within a predetermined frequency range out of an output value of the first movement signal increases.

The signal within the predetermined frequency range is a signal within a frequency range that corresponds to an apparatus shake.

For example, there are cases where the user who is not good at performing delicate operations on the pointer causes a large apparatus shake, in the case of which the user wishes for the pointer to be stopped for a longer time period after the start of the input operation to the operation section. In the present invention, the first time period can be prolonged as the output value of the signal within the frequency range corresponding to the apparatus shake increases. Accordingly, pointing operations become easier for the user who causes a large apparatus shake, thus improving an operational feeling.

In the input apparatus, the movement signal output means outputs a second movement signal different from the first movement signal, that corresponds to the movement of the casing, and the time control means controls the first time period so that the first time period is shortened as an output value of the second movement signal increases.

In the present invention, the first time period is controlled variably in accordance with a magnitude of the output value of the two different movement signals. Accordingly, the first time period can be shortened appropriately.

In the input apparatus, the time control means includes a count means for counting the first time period by a predetermined count amount, and a count amount control means for controlling the count amount so that the count amount increases as the output value of the first movement signal increases.

In the present invention, because the count amount increases as the first movement signal increases, the count by the count means can be made shorter as the first movement signal increases. Therefore, because the first time period can be shortened as the first movement signal increases, the user can shift to the pointing operations smoothly after the start of the input operation to the operation section.

The count by the count means may either be by counting up or down.

In the input apparatus, the count amount control means controls the count amount so that the count amount decreases as an output value of a predetermined frequency out of the output value of the first movement signal increases.

In the present invention, because the count amount decreases as the output value of the predetermined frequency, that is, the output value of the signal within the frequency range corresponding to an apparatus shake increases, the count by the count means can be made longer as the apparatus shake becomes larger. Therefore, because the first time period can be prolonged as the apparatus shake becomes larger, an operational feeling in pointing operations can be improved.

In the input apparatus, the movement signal output means outputs a second movement signal different from the first movement signal, that corresponds to the movement of the casing, and the count amount control means controls the count amount so that the count amount increases as an output value of the second movement signal increases.

In the present invention, because the count amount can be increased as the output value of the two different movement signals increases, the first time period can be shortened appropriately.

In the input apparatus, the output control means controls the output of the movement command so that, during a second time period since a cancel of the input of the operation signal, the movement of the pointer on the screen is stopped.

In the present invention, the movement of the pointer on the screen is regulated during the second time period since the cancel of the input of the operation signal. For example, even when the input apparatus is moved when the user cancels the input operation after operating the operation section, the pointer does not move during the second time period. Accordingly, operations of the pointer, the icon, and the like unintended by the user can be prevented from being made.

In the input apparatus, the time control means variably controls the second time period in accordance with the first movement signal.

In the present invention, the time period during which the pointer is to be stopped from the cancel of the input of the operation signal (second time period) can be changed appropriately in accordance with the movement signal. Accordingly, the pointer, the icon, and the like can be prevented from making any moves unintended by the user, and an operational feeling in pointing operations as described above can be improved.

In the input apparatus, the time control means may control the second time period so that the second time period is shortened as an output value of the first movement signal increases.

Accordingly, the user can shift to the pointing operation smoothly after the cancel of the input operation to the operation section.

In the input apparatus, the time control means may control the second time period so that the second time period is prolonged as an output value of a signal within a predetermined frequency range out of an output value of the first movement signal increases.

Accordingly, pointing operations become easier even for users who cause large apparatus shakes, thus improving an operational feeling.

In the input apparatus, the movement signal output means outputs a second movement signal different from the first movement signal, that corresponds to the movement of the casing, and the time control means controls the second time period so that the second time period is shortened as an output value of the second movement signal increases.

Accordingly, the second time period can be shortened appropriately.

In the input apparatus, the output control means controls the output of the movement command so that, when the input of the operation signal is canceled within the variably-controlled first time period, during the variably-controlled second time period since the cancel of the input of the operation signal, the movement of the pointer on the screen is stopped.

Accordingly, the user can naturally operate the pointer and the like on the screen without feeling uncomfortable.

In the input apparatus, the output control means controls the output of the movement command so that, when the input of the operation signal is started within the variably-controlled second time period, during the variably-controlled first time period since the start of the input of the operation signal, the movement of the pointer on the screen is stopped.

Accordingly, the user can naturally operate the pointer and the like on the screen without feeling uncomfortable.

According to the present invention, there is provided a control apparatus controlling a movement of a pointer on a screen in accordance with a movement signal and an operation signal output from an input apparatus including a casing, a movement signal output means for detecting a movement of the casing and outputting the movement signal corresponding to the movement of the casing, and an operation section to output the operation signal that is unrelated to the movement of the casing, the control apparatus including: a reception means for receiving the movement signal and the operation signal; an output means for outputting a first control signal for moving the pointer and a second control signal corresponding to the operation signal; a processing means for controlling display of the movement of the pointer on the screen in accordance with the first control signal and executing predetermined processing in accordance with the second control signal; an output control means for controlling the output of the first control signal so that, after the operation signal is input, during a first time period since a start of the input of the operation signal, the movement of the pointer on the screen is stopped; and a time control means for variably controlling the first time period in accordance with the movement signal.

In the control apparatus, the output control means may control the output of the first control signal so that, during a second time period since a cancel of the input of the operation signal, the movement of the pointer on the screen is stopped.

In the control apparatus, the time control means may variably control the second time period in accordance with the movement signal.

According to the present invention, there is provided a control system controlling a movement of a pointer on a screen, including: an input apparatus including a casing, a movement signal output means for detecting a movement of the casing and outputting a movement signal corresponding to the movement of the casing, an operation section to output an operation signal that is unrelated to the movement of the casing, a command output means for outputting a movement command for moving the pointer and an operation command corresponding to the operation signal, an output control means for controlling the output of the movement command so that, after the operation signal is input, during a first time period since a start of the input of the operation signal, the movement of the pointer on the screen is stopped, and a time control means for variably controlling the first time period in accordance with the movement signal; and a control apparatus including a reception means for receiving the movement command and the operation command, and a processing means for controlling display of the movement of the pointer on the screen in accordance with the movement command and executing predetermined processing in accordance with the operation command.

According to another aspect of the present invention, there is provided a control system controlling a movement of a pointer on a screen, including: an input apparatus including a casing, an output means for detecting a movement of the casing and outputting a movement signal corresponding to the movement of the casing, and an operation section to output an operation signal that is unrelated to the movement of the casing; and a control apparatus including a reception means for receiving the movement signal and the operation signal, an output means for outputting a first control signal for moving the pointer and a second control signal corresponding to the operation signal, a processing means for controlling display of the movement of the pointer on the screen in accordance with the first control signal and executing predetermined processing in accordance with the second control signal, an output control means for controlling the output of the first control signal so that, after the operation signal is input, during a first time period since a start of the input of the operation signal, the movement of the pointer on the screen is stopped, and a time control means for variably controlling the first time period in accordance with the movement signal.

According to the present invention, there is provided a control method including: detecting a movement of a casing and outputting a movement signal corresponding to the movement of the casing; outputting a movement command for moving a pointer on a screen; controlling display of a movement of the pointer on the screen in accordance with the movement command; outputting an operation command corresponding to an operation signal that is unrelated to the movement of the casing; executing predetermined processing in accordance with the operation command; controlling the output of the movement command so that, during a first time period since a start of the input of the operation signal, the movement of the pointer on the screen is stopped; and variably controlling the first time period in accordance with the movement signal.

According to an embodiment of the present invention, there is provided a handheld apparatus including: a casing; a display section; a sensor to detect a movement of the casing and output a detection signal corresponding to the movement of the casing; an operation section to input an operation signal that is unrelated to the movement of the casing; a command output means for outputting a movement command corresponding to a displacement amount of a pointer on a screen of the display section, the movement command corresponding to the detection signal, and an operation command corresponding to the operation signal input via the operation section; a control means for controlling the command output means so that, during a first time period since a start or cancel of the input of the operation signal via the operation section, the movement of the pointer on the screen is stopped; and a processing means for controlling a display position of the pointer on the screen in accordance with the movement command and executing predetermined processing in accordance with the operation command.

According to an embodiment of the present invention, there is provided a handheld apparatus including: a casing; a display section; a movement signal output means for detecting a movement of the casing and outputting a movement signal corresponding to the movement of the casing; an operation section to output an operation signal that is unrelated to the movement of the casing; a command output means for outputting a movement command for moving a pointer and an operation command corresponding to the operation signal; an output control means for controlling the output of the movement command so that, after the operation signal is input, during a first time period since a start or cancel of the input of the operation signal, a movement of the pointer on a screen of the display section is stopped; a time control means for variably controlling the first time period in accordance with the movement signal; and a processing means for controlling a display position of the pointer on the screen in accordance with the movement command and executing predetermined processing in accordance with the operation command.

According to an embodiment of the present invention, there is provided an input apparatus including:

a movement signal output means for detecting a movement of the input apparatus and outputting a movement signal corresponding to the movement of the input apparatus;

a control command generation means for generating a control command for controlling a movement of an image represented on a screen, that corresponds to the movement signal;

an operation command generation means including an operation section to generate operational information caused by an operation of a user, that is unrelated to the movement of the input apparatus, for generating an operation command based on the generated operational information; and a control means for controlling the control command generation means so that the control command for changing a sensitivity of the movement of the image with respect to the movement of the input apparatus is generated in temporal relation to a generation timing of the operational information or the operation command.

The image represented on the screen is an image represented on the entire screen or a part thereof. Examples of the control of the movement of the image include control of the movement of the pointer and control of scroll, zoom, rotation, and other movements of the screen.

"Generating operational information" means that a state of an electric signal is shifted by the operation to the operation section by one of the input of the operation signal and the cancel thereof, which implies that the state of both the input and cancel is contained.

According to an embodiment of the present invention, there is provided a control apparatus controlling a screen based on a control command and an operation command transmitted from an input apparatus including a movement signal output means for detecting a movement of the input apparatus and outputting a movement signal corresponding to the movement of the input apparatus, a control command generation means for generating the control command corresponding to the movement signal, an operation command generation means including an operation section to generate operational information caused by an operation of a user, that is unrelated to the movement of the input apparatus, for generating the operation command based on the generated operational information, and a transmission means for transmitting the operational information, the control command, and the operation command that have been generated, the control apparatus including:

a reception means for receiving the operational information, the control command, and the operation command that have been transmitted;

a movement information generation means for generating, based on the received control command, movement information for moving an image represented on the screen; and a control means for controlling the movement information generation means so that the movement information for changing a sensitivity of a movement of the image with respect to the movement of the input apparatus is generated in temporal relation to a reception timing of the operational information or the operation command.

According to an embodiment of the present invention, there is provided a handheld apparatus including:

a display section;

a movement signal output means for detecting a movement of the handheld apparatus and outputting a movement signal corresponding to the movement of the handheld apparatus;

a control command generation means for generating a control command for controlling a movement of an image represented on a screen of the display section, that corresponds to the movement signal;

an operation command generation means including an operation section to generate operational information caused by an operation of a user, that is unrelated to the movement of the handheld apparatus, for generating an operation command based on the generated operational information; and a control means for controlling the control command generation means so that the control command for changing a sensitivity of a movement of the image with respect to the movement of the handheld apparatus is generated in temporal relation to a generation timing of the operational information or the operation command.

According to an embodiment of the present invention, there is provided a control method including:

detecting a movement of an input apparatus;

outputting a movement signal corresponding to the movement of the input apparatus;

generating operational information caused by an operation of a user, that is unrelated to the movement of the input apparatus;

generating an operation command based on the generated operational information; and generating, in temporal relation to a generation timing of the operational information or the operation command, a control command for controlling a movement of an image represented on a screen, that corresponds to the movement signal, the control command for changing a sensitivity of the movement of the image with respect to the movement of the input apparatus.

According to an embodiment of the present invention, there is provided an input apparatus including:

a movement signal output means for detecting a movement of the input apparatus and outputting a movement signal corresponding to the movement of the input apparatus;

a control command generation means for generating a control command for controlling a movement of an image represented on a screen, that corresponds to the movement signal;

an operation command generation means including an operation section to generate operational information caused by an operation of a user, that is unrelated to the movement of the input apparatus, for generating an operation command based on the generated operational information; and a control means for controlling an output of the control command so that, during a first time period since the generation of the operation command, the movement of the image is stopped.

The input apparatus may further include a time control means for variably controlling the first time period.

According to an embodiment of the present invention, there is provided a control apparatus controlling a movement of an image represented on a screen based on input information transmitted from an input apparatus including a movement signal output means for detecting a movement of the input apparatus and outputting a movement signal corresponding to the movement of the input apparatus, a control command generation means for generating a control command for controlling the movement of the image represented on the screen, that corresponds to the movement signal, an operation command generation means for generating an operation command caused by an operation of a user, that is unrelated to the movement of the input apparatus, and a transmission means for transmitting the control command and the operation command as the input information, the control apparatus including:

a reception means for receiving the input information;

a movement information generation means for generating movement information for moving the image represented on the screen based on the received control command; and a control means for controlling the generation of the movement information so that, during a first time period since the reception of the operation command, the movement of the image is stopped.

The control apparatus may further include a time control means for variably controlling the first time period.

According to an embodiment of the present invention, there is provided a handheld apparatus including:

a display section;

a movement signal output means for detecting a movement of the handheld apparatus and outputting a movement signal corresponding to the movement of the handheld apparatus;

a control command generation means for generating a control command for controlling a movement of an image represented on a screen of the display section, that corresponds to the movement signal;

an operation command generation means including an operation section to generate operational information caused by an operation of a user, that is unrelated to the movement of the handheld apparatus, for generating an operation command based on the generated operational information; and a control means for controlling an output of the control command so that, during a first time period since the generation of the operation command, the movement of the image is stopped.

The handheld apparatus may further include a time control means for variably controlling the first time period.

In the descriptions above, elements described as " . . . means" may be realized by hardware, or may be realized by both software and hardware. In the case of realization by both the software and hardware, the hardware includes at least a storage device for storing a software program.

Typically, the hardware is constituted by selectively using at least one of a CPU (Central Processing Unit), an MPU (Micro Processing Unit), a RAM (Random Access Memory), a ROM (Read Only Memory), a DSP (Digital Signal Processor), an FPGA (Field Programmable Gate Array), an ASIC (Application Specific Integrated Circuit), a NIC (Network Interface Card), a WNIC (Wireless NIC), a modem, an optical disk, a magnetic disk, and a flash memory.

Effect of the Invention

As described above, according to the present invention, an operational feeling when a user uses an input apparatus to input an operation signal via an operation section can be improved.

Additional features and advantages are described herein, and will be apparent from, the following Detailed Description and the figures.

BRIEF DESCRIPTION OF THE FIGURES

FIG. 1 A diagram showing a control system according to an embodiment of the present invention.

FIG. 10 Other diagrams for illustrating the gravitational effect with respect to the acceleration sensor unit.

FIG. 44 Diagrams for illustrating various modifications of this embodiment.

Figure 2:
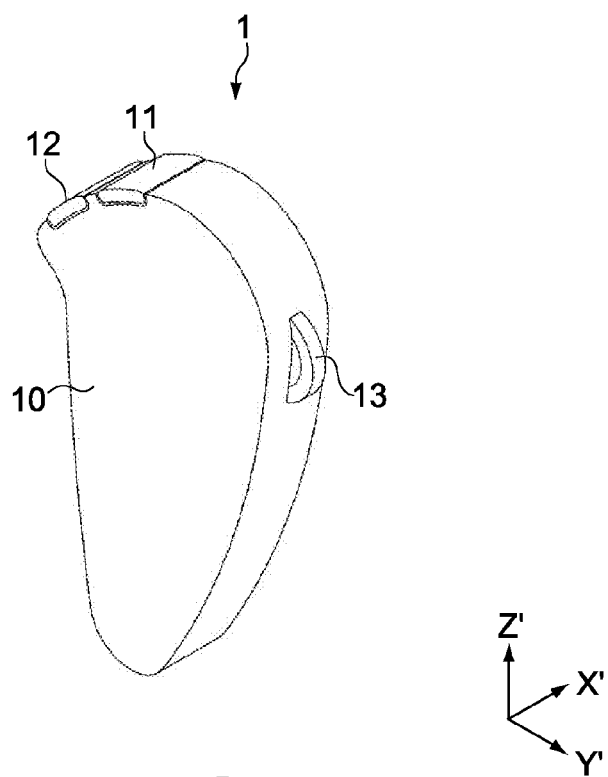
FIG. 2 A perspective diagram showing an input apparatus.

DESCRIPTION OF SYMBOLS 1, 51, 61, 71, 81, 91, 111 input apparatus
2 pointer
3 screen
10, 50, 60, 70, 80, 90, 110 casing
15 angular velocity sensor unit
16 acceleration sensor unit
19, 35 MPU
20 crystal oscillator
21 transmitting device
22 antenna
23 operation section
40 control apparatus
100 control system
151 first angular velocity sensor
152 second angular velocity sensor
161 first acceleration sensor
162 second acceleration sensor

DETAILED DESCRIPTION

Hereinafter, embodiments of the present invention will be described with reference to the drawings.

FIG. 1 is a diagram showing a control system according to an embodiment of the present invention. A control system 100 includes a display apparatus 5, a control apparatus 40, and an input apparatus 1.

FIG. 2 is a perspective diagram showing the input apparatus 1. The input apparatus 1 is of a size that a user is capable of holding. The input apparatus 1 includes a casing 10. Further, the input apparatus 1 includes an operation section 23 (see FIG. 6) including a button 11 and a button 12 adjacent to the button 11 that are provided at a center of an upper portion of the casing 10, and a rotary wheel button 13.

Typically, the buttons 11 and 12 are each a press-type button, and push buttons or capacitance-type touch buttons are used. The operation section 23 is not limited to the press-type button, and a bar-type operation section 23 that is operated with one end as a fulcrum, or a slide-type operation section 23 may also be used.

The button 11 has a function corresponding to a left button of a mouse as an input device used for a PC, and the button 12 adjacent to the button 11 has a function corresponding to a right button of a mouse, for example. For example, an operation of selecting an icon 4 (see FIG. 5) may be carried out by clicking the button 11, and an operation of opening a file may be carried out by double-clicking the button 11. The icons are images on a screen 3 representing functions of programs, execution commands, file contents, and the like on the computer.

Figure 3:
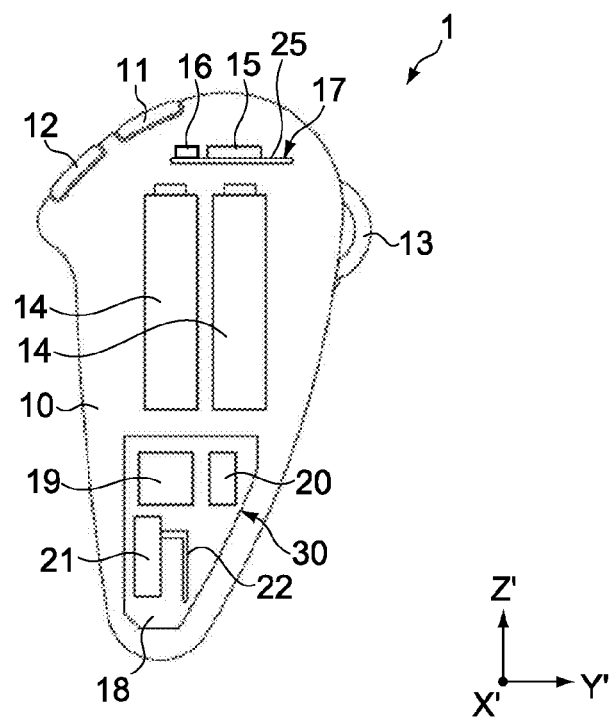
FIG. 3 A diagram schematically showing an internal structure of the input apparatus.
Figure 4:
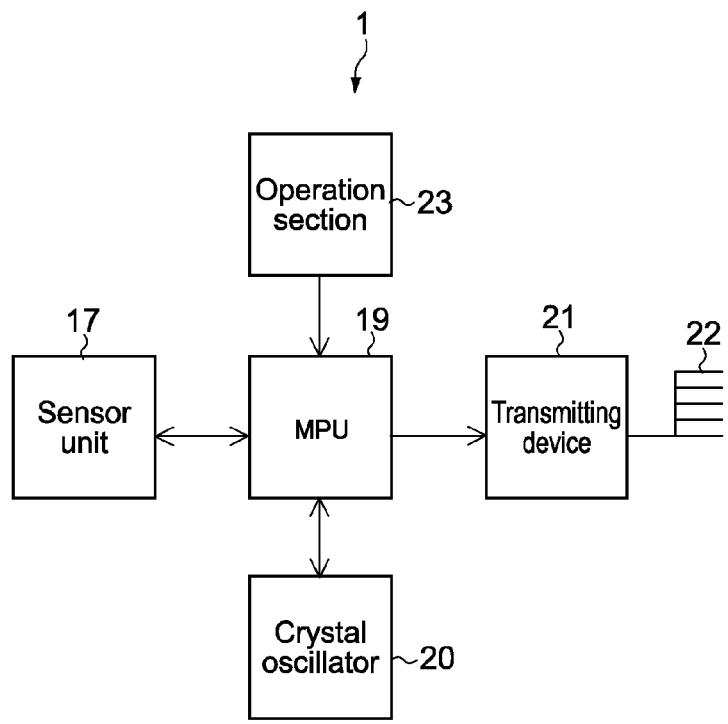
FIG. 4 A block diagram showing an electrical structure of the input apparatus.

FIG. 3 is a diagram schematically showing an internal structure of the input apparatus 1. FIG. 4 is a block diagram showing an electrical structure of the input apparatus 1.

The input apparatus 1 includes a sensor unit 17, a control unit 30, and batteries 14.

Figure 8:
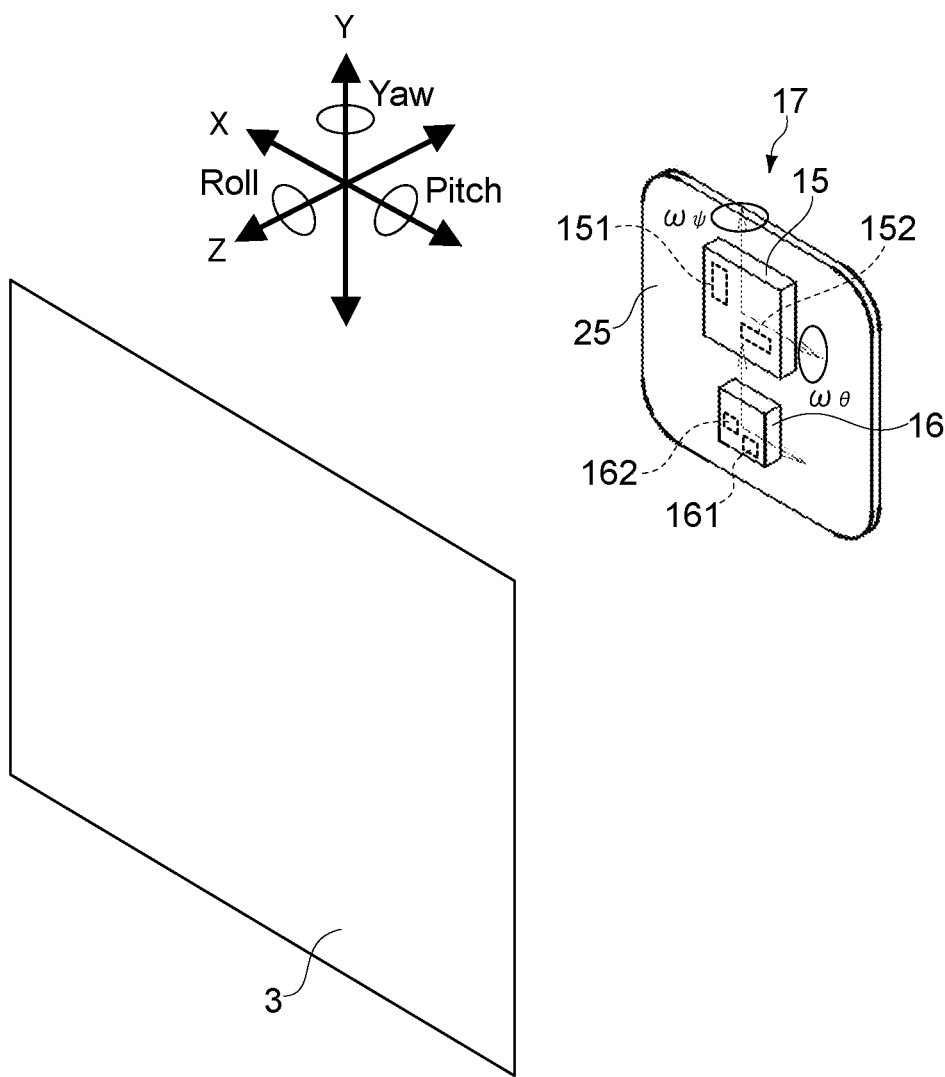
FIG. 8 A perspective diagram showing a sensor unit.

FIG. 8 is a perspective diagram showing the sensor unit 17. The sensor unit 17 is a sensor that detects a movement of the casing 10, that is, a movement of the input apparatus 1. The sensor unit 17 includes an acceleration sensor unit 16 for detecting accelerations in different angles such as along two orthogonal axes (X axis and Y axis). Specifically, the acceleration sensor unit 16 includes two sensors, that is, a first acceleration sensor 161 and a second acceleration sensor 162.

The sensor unit 17 further includes an angular velocity sensor unit 15 for detecting angular accelerations about the two orthogonal axes. Specifically, the angular velocity sensor unit 15 includes two sensors, that is, a first angular velocity sensor 151 and a second angular velocity sensor 152. The acceleration sensor unit 16 and the angular velocity sensor unit 15 are packaged and mounted on a circuit board 25.

As each of the first angular velocity sensor 151 and the second angular velocity sensor 152, a vibration gyro sensor for detecting Coriolis force in proportion to an angular velocity is used. As each of the first acceleration sensor 161 and the second acceleration sensor 162, any sensor such as a piezoresistive sensor, a piezoelectric sensor, or a capacitance sensor may be used. Each of the angular velocity sensors 151 and 152 is not limited to the vibration gyro sensor, and a rotary top gyro sensor, a ring laser gyro sensor, a gas rate gyro sensor, and the like may also be used.

In descriptions on FIGS. 2 and 3, a longitudinal direction of the casing 10 is referred to as Z' direction, a thickness direction of the casing 10 is referred to as X' direction, and a width direction of the casing 10 is referred to as Y' direction for convenience. In this case, the sensor unit 17 is incorporated into the casing 10 such that a surface of the circuit board 25 on which the acceleration sensor unit 16 and the angular velocity sensor unit 15 are mounted becomes substantially parallel to an X'-Y' plane. As described above, the sensor units 16 and 15 each detect physical amounts with respect to the two axes, that is, the X axis and the Y axis. In descriptions below, with regard to the movement of the input apparatus 1, a rotational direction about the X' axis is sometimes referred to as pitch direction, a rotational direction about the Y' axis is sometimes referred to as yaw direction, and a rotational direction about the Z' axis (roll axis) is sometimes referred to as roll direction.

The control unit 30 includes a main substrate 18, an MPU 19 (Micro Processing Unit) (or CPU) mounted on the main substrate 18, a crystal oscillator 20, a transmitting device 21, and an antenna 22 printed on the main substrate 18.

The MPU 19 includes a built-in volatile or nonvolatile memory requisite therefor. The MPU 19 is input with a detection signal from the sensor unit 17, an operation signal from the operation section 23, and the like, and the MPU 19 executes various calculations in order to generate predetermined control signals (commands) in response to those input signals. The memory may be provided separate from the MPU 19.

Typically, the MPU 19 generates, as the control signals, a movement command corresponding to a detection signal detected by the sensor unit 17 and an operation command corresponding to the operation signal output from the operation section. The operation signal output from the operation section 23 is an input signal other than the detection signal of the sensor unit 17 as a signal obtained by the movement of the input apparatus 1 (casing 10), that is, an operation signal unrelated to the movement of the casing 10.

Typically, the sensor unit 17 outputs analog signals. In this case, the MPU 19 includes an A/D (Analog/Digital) converter. However, a unit in which the sensor unit 17 includes the A/D converter is also possible.

The transmitting device 21 transmits the control signals generated in the MPU 19 as RF radio signals to the control apparatus 40 via the antenna 22.

The crystal oscillator 20 generates clocks and supplies them to the MPU 19. As the batteries 14, dry cell batteries, rechargeable batteries, and the like are used.

The control apparatus 40 is a computer and includes an MPU 35 (or CPU), a RAM 36, a ROM 37, a video RAM 41, an antenna 39, and a receiver device 38.

The receiver device 38 receives the control signal transmitted from the input apparatus 1 via the antenna 39. The MPU 35 analyzes the control signal and executes various calculations. A display control section 42 mainly generates screen data to be displayed on the screen 3 of the display apparatus 5 in accordance with the control of the MPU 35. The video RAM 41 serves as a work region of the display control section 42 and temporarily stores the generated screen data.

The control apparatus 40 may be an apparatus dedicated to the input apparatus 1, or may be a PC or the like. The control apparatus 40 is not limited to the PC, and may be a computer integrally formed with the display apparatus 5, audiovisual equipment, a projector, a game device, a car navigation system, or the like.

Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like.

Figure 5:
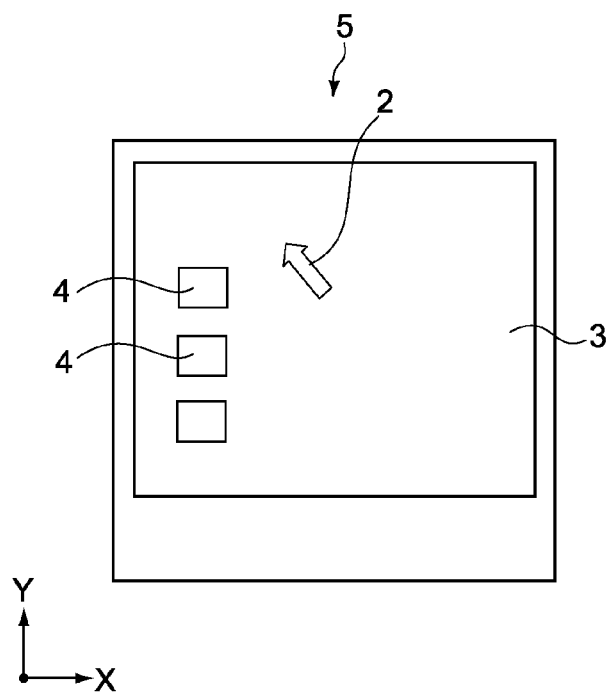
FIG. 5 A diagram showing an example of a screen displayed on a display apparatus.

FIG. 5 is a diagram showing an example of the screen 3 displayed on the display apparatus 5. UIs such as icons 4 and a pointer 2 are displayed on the screen 3. It should be noted that on the screen 3, the horizontal direction is referred to as X-axis direction and the vertical direction is referred to as Y-axis direction. Unless stated otherwise, to help understand descriptions below, the UT as an operation target of the input apparatus 1 will be described as being the pointer 2 (so-called cursor).

Figure 6:
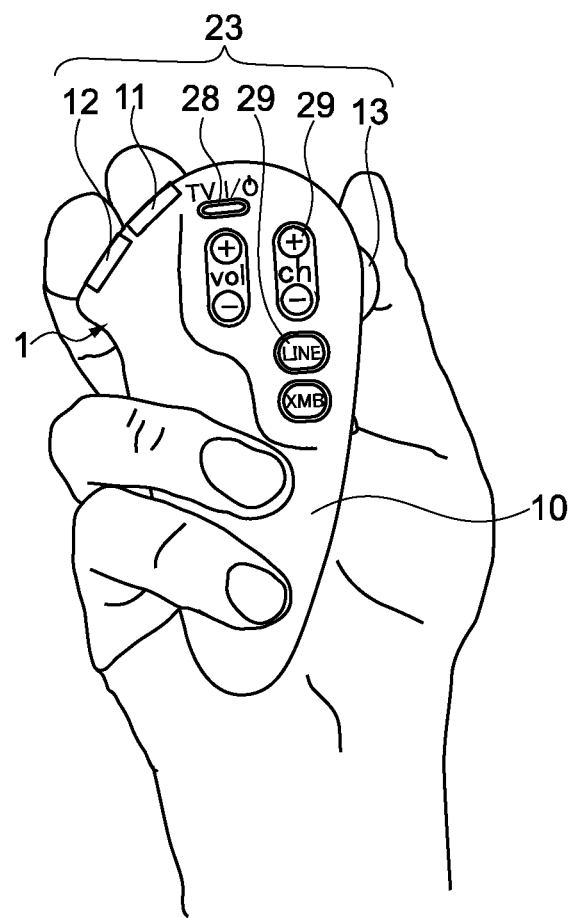
FIG. 6 A diagram showing a state where a user is holding the input apparatus.

FIG. 6 is a diagram showing a state where a user is holding the input apparatus 1. As shown in FIG. 6, the input apparatus 1 may include, as the operation section 23, in addition to the buttons 11, 12, and 13, various operation buttons 29 such as those provided to a remote controller for operating a television or the like and a power switch 28, for example. Control signals generated when the user moves the input apparatus 1 in the air or operates the operation section 23 while holding the input apparatus 1 as shown in the figure are output to the control apparatus 40, and the control apparatus 40 controls the UI.

Next, a description will be given on typical examples of ways of moving the input apparatus 1 and ways the pointer 2 moves on the screen 3 thereby. FIG. 7 are explanatory diagrams therefor. In descriptions below, an absolute coordinate system is represented by the X axis, Y axis, and Z axis. On the other hand, a coordinate system that moves integrally with the input apparatus 1 (coordinate system of input apparatus 1) is represented by the X' axis, Y' axis, and Z' axis.

Figure 7A:
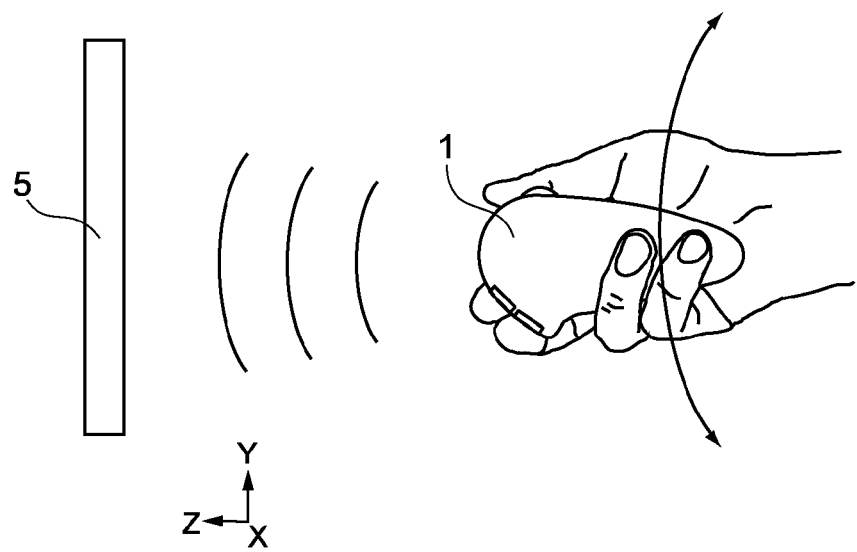
FIG. 7 Explanatory diagrams showing typical examples of ways of moving the input apparatus and ways a pointer moves on a screen thereby.
Figure 7B:
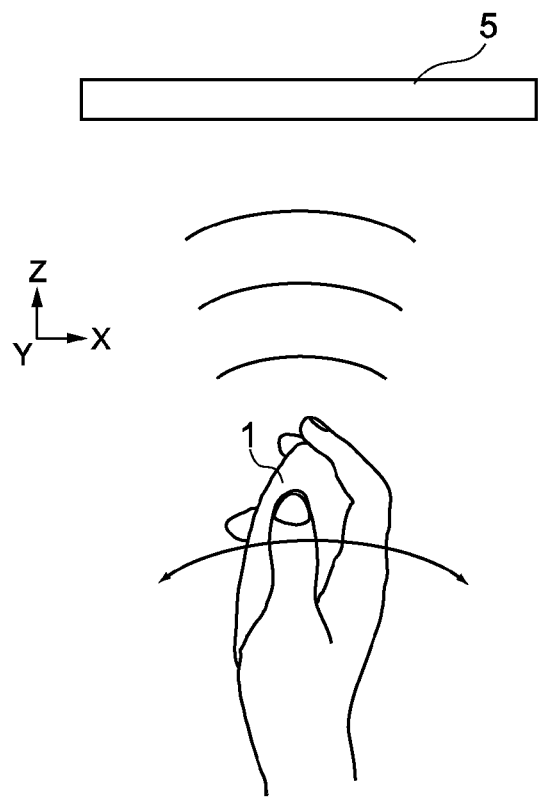

As shown in FIGS. 7A and 7B, the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 (see FIG. 8) of the sensor unit 17 is close to being in parallel with the screen 3 of the display apparatus 5, and the two axes as detection axes of the sensor unit 17 respectively correspond to the horizontal axis (X axis) and the vertical axis (Y axis) on the screen 3. Hereinafter, the position of the input apparatus 1 as shown in FIGS. 7A and 7B is referred to as reference position.

As shown in FIG. 7A, in the reference position, the user moves a wrist or an arm in the vertical direction or causes a rotation about the X axis. At this time, the second acceleration sensor 162 detects an acceleration $a_y$ in the pitch direction (second acceleration) and the second angular velocity sensor 152 detects an angular velocity $\omega_\theta$ about the X axis (second angular velocity). Based on those detection values, the control apparatus 40 controls display of the pointer 2 so as to move the pointer 2 in the Y-axis direction.

Meanwhile, as shown in FIG. 7B, in the reference position, the user moves the wrist or the arm in the lateral direction or causes a rotation about the Y axis. At this time, the first acceleration sensor 161 detects an acceleration $a_x$ in the yaw direction (first acceleration) and the first angular velocity sensor 151 detects an angular velocity $\omega_\psi$ about the Y axis (first angular velocity). Based on those detection values, the control apparatus 40 controls display of the pointer 2 so as to move the pointer 2 in the X-axis direction.

Although descriptions will be given later, in the embodiment, the MPU 19 of the input apparatus 1 calculates the velocity values in the yaw and pitch directions based on the detection values detected by the sensor unit 17 in accordance with the program stored in the built-in nonvolatile memory. Here, for control of the movement of the pointer 2, a dimension of an integration value (velocity) of biaxial acceleration values detected by the acceleration sensor unit 16 is used. Information on the dimension of the velocity is transmitted to the control apparatus 40 as a movement command signal (see FIG. 11).

In another embodiment, the input apparatus 1 transmits, as the movement command signal, information on a dimension of physical amounts detected by the sensor unit 17 to the control apparatus 40. In this case, the MPU 35 of the control apparatus 40 calculates, in accordance with the program stored in the ROM 37, the velocity values in the yaw and pitch directions based on the received movement command. The display control section 42 makes display so as to move the pointer 2 in accordance with the velocity values (see FIG. 14).

The control apparatus 40 converts a displacement of the input apparatus 1 in the yaw direction per unit time into a displacement amount of the pointer 2 on the X axis on the screen 3, and converts a displacement of the input apparatus 1 in the pitch direction per unit time into a displacement amount of the pointer 2 on the Y axis on the screen 3, to thus move the pointer 2. Typically, in the example shown in FIG. 11, for example, regarding the velocity values supplied every predetermined number of clocks, the MPU 35 of the control apparatus 40 adds an n-th velocity value that has been supplied to a (n−1)-th velocity value that has been supplied. Accordingly, the n-th velocity value that has been supplied corresponds to the displacement amount of the pointer 2, and coordinate information of the pointer 2 on the screen 3 is generated.

A calculation method regarding an integral of the acceleration values that is used when calculating the velocity values only needs to be the same as that for the displacement amount.

Next, a description will be given on a gravitational effect with respect to the acceleration sensor unit 16. FIGS. 9 and 10 are explanatory diagrams therefor. FIG. 9 are diagrams showing the input apparatus 1 seen from the Z direction. FIG. 10 are diagrams showing the input apparatus 1 seen from the X direction.

Figure 9A:
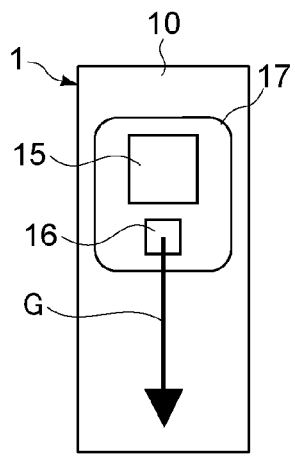
FIG. 9 Diagrams for illustrating a gravitational effect with respect to an acceleration sensor unit.
Figure 9B:
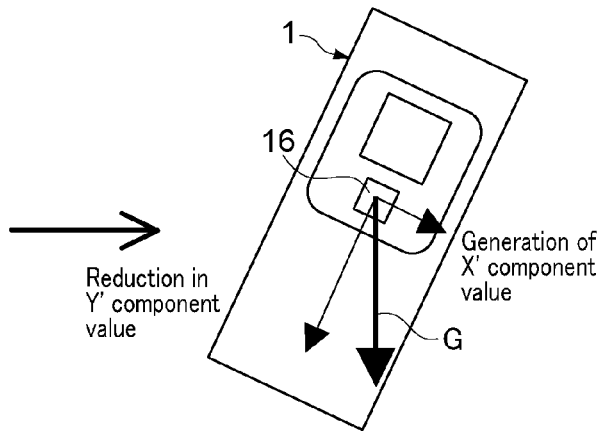

In FIG. 9A, the input apparatus 1 is in the reference position and is held still. At this time, an output of the first acceleration sensor 161 is substantially 0, and an output of the second acceleration sensor 162 is an output corresponding to a gravity acceleration G. However, as shown in FIG. 9B, for example, in a state where the input apparatus 1 is tilted in the roll direction, the first and second acceleration sensors 161 and 162 respectively detect acceleration values of tilt components of the gravity acceleration G.

Figure 9C:
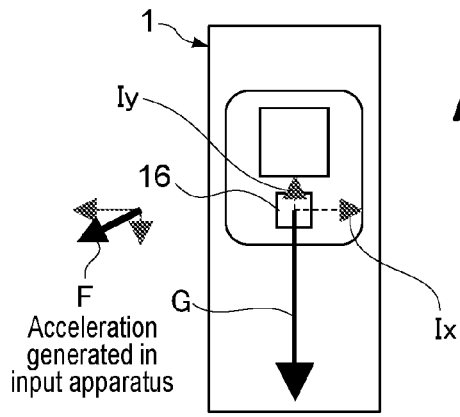

In this case, the first acceleration sensor 161 detects the acceleration in the yaw direction even when the input apparatus 1 is not actually moved in the yaw direction in particular. The state shown in FIG. 9B is equivalent to a state where, when the input apparatus 1 is in the reference position as shown in FIG. 9C, the acceleration sensor unit 16 has received inertial forces Ix and Iy as respectively indicated by arrows with broken lines, thus being undistinguishable by the acceleration sensor unit 16. As a result, the acceleration sensor unit 16 judges that an acceleration in a downward left-hand direction as indicated by an arrow F is applied to the input apparatus 1 and outputs a detection signal different from the actual movement of the input apparatus 1. In addition, because the gravity acceleration G constantly acts on the acceleration sensor unit 16, an integration value is increased and an amount by which the pointer 2 is displaced in the downward oblique direction is increased at an accelerating pace. When the state is shifted from that shown in FIG. 9A to that shown in FIG. 9B, it is considered that inhibition of the movement of the pointer 2 on the screen 3 is an operation that intrinsically matches the intuitional operation of the user.

The same holds true also when the input apparatus 1 is rolled in the pitch direction from the reference position as shown in FIG. 10A to tilt as shown in FIG. 10B, for example. In such a case, because the gravity acceleration G detected by the second acceleration sensor 162 at the time the input apparatus 1 is in the reference position decreases, it is difficult for the input apparatus 1 to make a distinguishment from the inertial force I in the pitch direction as shown in FIG. 10C.

Figure 11:
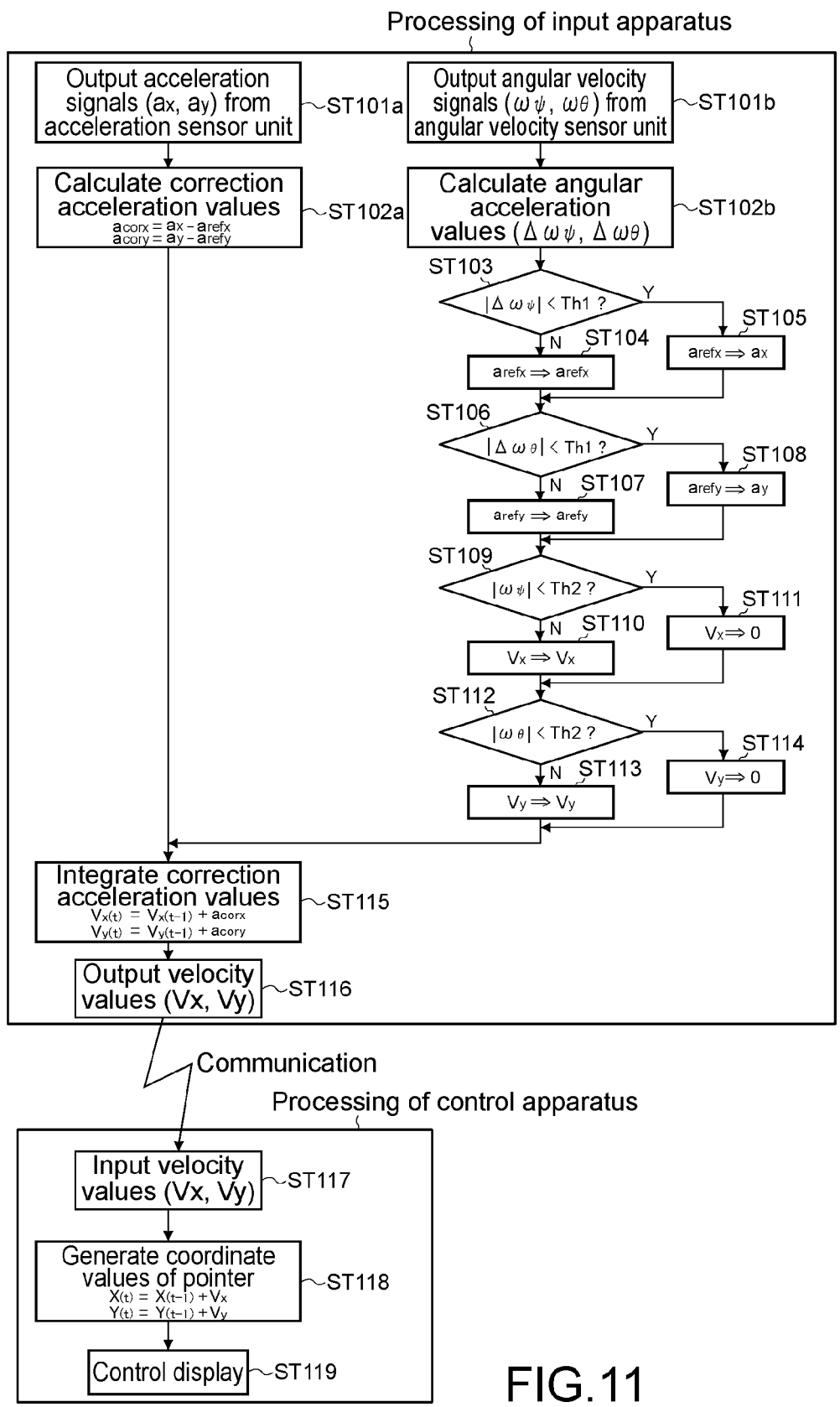
FIG. 11 A flowchart showing an operation performed when calculating velocity values of the input apparatus based on angular velocity values detected by an angular velocity sensor unit.

To reduce such a gravitational effect with respect to the acceleration sensor unit 16 as much as possible, the input apparatus 1 of this embodiment uses the angular velocity values detected by the angular velocity sensor unit 15 to calculate the velocity values of the input apparatus 1. Hereinafter, descriptions will be given on an operation thereof. FIG. 11 is a flowchart showing the operation.

Power of the input apparatus 1 is turned on. For example, the user turns on a power supply switch or the like provided to the input apparatus 1 or the control apparatus 40 to turn on the power of the input apparatus 1. Upon turning on the power, biaxial acceleration signals (first and second acceleration values $a_x$ and $a_y$) are output from the acceleration sensor unit 16 (Step 101a) to be supplied to the MPU 19. The acceleration signals are signals corresponding to the position of the input apparatus 1 at a point when the power is turned on (hereinafter, referred to as initial position).

There are cases where the initial position is the reference position. However, a position at which the entire amount of the gravity acceleration is detected in the X-axis direction, that is, a position at which the output of the first acceleration sensor 161 is the acceleration value corresponding to the gravity acceleration and the output of the second acceleration sensor 162 is 0 is also possible. As a matter of course, as the initial position, a position tilted as shown in FIG. 9B is also possible.

The MPU 19 of the input apparatus 1 obtains the acceleration signals ($a_x$, $a_y$) from the acceleration sensor unit 16 every predetermined number of clocks. Upon obtaining the second acceleration signals ($a_x$, $a_y$) and the subsequent acceleration signals, the MPU 19 performs the following calculation to remove the gravitational effect. Specifically, as in Equations (1) and (2) below, the MPU 19 subtracts gravity acceleration components (first $a_x(=a_{refx})$ and $a_y(=a_{refy})$) detected last time in the X- and Y-axis directions from the currently-obtained acceleration values $a_x$ and $a_y$, respectively, to thereby generate a first correction acceleration value $a_{corx}$ and a second correction acceleration value $a_{cory}$ (Step 102a).

$$a_{corx} = a_x - a_{refx} \quad (1)$$

$$a_{cory} = a_y - a_{refy} \quad (2)$$

Hereinafter, $a_{refx}$ and $a_{refy}$ will be referred to as reference acceleration value on the X axis and reference acceleration value on the Y axis (first reference acceleration value and second reference acceleration value), respectively. $a_{refx}$ and $a_{refy}$ used in the first calculation of Step 102a since turning on the power are acceleration signals $a_x$ and $a_y$ detected right after the power is turned on.

As shown in Equations (3) and (4), the MPU 19 calculates a first velocity value $V_x$ and a second velocity value $V_y$ by respectively adding the first and second correction acceleration values $a_{corx}$ and $a_{cory}$, that is, by an integration operation (Step 115).

$$V_x(t)=V_x(t-1)+a_{corx} \quad (3)$$

$$V_y(t)=V_y(t-1)+a_{cory} \quad (4)$$

$V_x(t)$ and $V_y(t)$ represent the currently-obtained velocity values and $V_x(t-1)$ and $V_y(t-1)$ represent previous velocity values.

Meanwhile, as described above, upon turning on the power of the input apparatus 1, biaxial angular velocity signals (first and second angular velocity values ($\omega_\psi$ and $\omega_\theta$)) are output from the angular velocity sensor unit 15 (Step 101*b*) to be supplied to the MPU 19. Upon obtainment, the MPU 19 calculates the angular acceleration values (first angular acceleration value $\Delta\omega_\psi$ and second angular acceleration value $\Delta\omega_\theta$) by a derivation operation (Step 102*b*).

The MPU 19 judges whether absolute values $|\Delta\omega_\psi|$ and $|\Delta\omega_\theta|$ of $\Delta\omega_\psi$ and $\Delta\omega_\theta$ above, respectively, are smaller than a threshold value Th1 (Steps 103 and 106). When $|\Delta\omega_\psi| \geq Th1$, the MPU 19 uses the first reference acceleration value $a_{refx}$ as it is and does not update it (Step 104). Similarly, when $|\Delta\omega_\theta| \geq Th1$, the MPU 19 uses the second reference acceleration value $a_{refy}$ as it is and does not update it (Step 107).

A value close to 0 is set as the threshold value Th1. The threshold value Th1 takes into account the angular velocity values that are detected due to an apparatus shake by the user, a DC offset, or the like even when the user is consciously holding the input apparatus 1 still. Thus, the pointer 2 is prevented from being moved during display due to an apparatus shake or a DC offset in the case where the user is consciously holding the input apparatus 1 still.

Reasons for performing the processing as described above are as follows.

Figure 12:
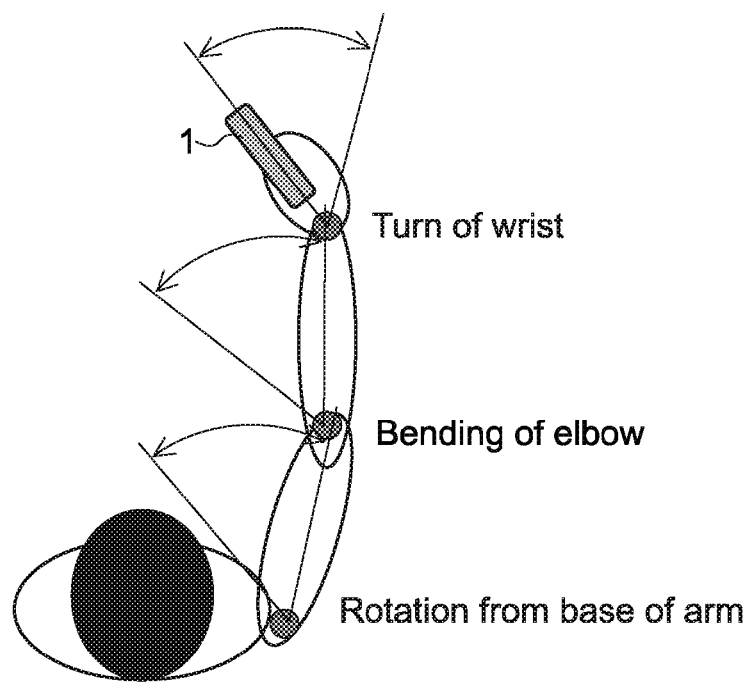
FIG. 12 A top view of the user operating the input apparatus.

FIG. 12 is a top view of the user operating the input apparatus 1. When the user operates the input apparatus 1 naturally, the operation is made by at least one of a rotation from a base of an arm, bending of an elbow, and a turn of a wrist. Therefore, generation of the acceleration leads to generation of the angular acceleration. Specifically, the acceleration is assumed to be subservient to the angular acceleration generated in the same direction as the acceleration. Therefore, by the MPU 19 monitoring the absolute value of the first angular acceleration value $|\Delta\omega_\psi|$, it is possible to judge whether to update the first reference acceleration value $a_{refx}$ in the same direction, and judge whether to eventually correct the first correction acceleration value $a_{corx}$ from Equation (1). The same holds true for the absolute value of the second angular acceleration value $|\Delta\omega_\theta|$.

More specifically, when the absolute value of the first angular acceleration value $|\Delta\omega_\psi|$ is equal to or larger than the threshold value Th1, the MPU 19 judges that the input apparatus 1 is moving in the yaw direction. In this case, the MPU 19 does not update the first reference acceleration value $a_{refx}$ and consequently does not correct the first correction acceleration value $a_{corx}$ and continues on with the integration operation of Equation (3) based on $a_{corx}$.

Further, when the absolute value of the second angular acceleration value $||\Delta\omega_\theta|$ is equal to or larger than the threshold value Th1, the MPU 19 judges that the input apparatus 1 is moving in the pitch direction. In this case, the MPU 19 does not update the second reference acceleration value $a_{refy}$ and consequently does not correct the second correction acceleration value $a_{cory}$, and continues on with the integration operation of Equation (4) based on $a_{cory}$.

Meanwhile, when the absolute value of the first angular acceleration value $|\Delta\omega_\psi|$ is smaller than the threshold value Th1 in Step 103, the MPU 19 judges that the input apparatus 1 is not moved in the yaw direction. In this case, the MPU 19 updates the first reference acceleration value $a_{refx}$ to the currently-obtained (latest) detection value $a_x$, to thereby correct the first correction acceleration value $a_{corx}$ using Equation (1) (Step 105). The latest detection value $a_x$ is, in other words, a detection value obtained while the input apparatus 1 is held almost still, thus being a component value by the gravity acceleration.

Similarly, when the absolute value of the second angular acceleration value $|\Delta\omega_\theta|$ is smaller than the threshold value Th1 in Step 106, the MPU 19 judges that the input apparatus 1 is not moved in the pitch direction. In this case, the MPU 19 updates the second reference acceleration value $a_{refy}$ to the currently-obtained (latest) detection value $a_y$, to thereby correct the second correction acceleration value $a_{cory}$ using Equation (2) (Step 108).

It should be noted that in this embodiment, the threshold values in both the yaw direction and the pitch direction have been set to the same value Th1. However, different threshold values may be used for those directions.

In the descriptions above, the angular acceleration values $\Delta\omega_\psi$ and $\Delta\psi_\theta$ have been monitored, but the MPU 19 can also monitor the angular velocity values $\omega_\psi$ and $\omega^\theta$ to correct the velocity values calculated in Equations (3) and (4). Based on the same idea as that of FIG. 12, assuming that generation of the velocity leads to generation of the angular velocity, it can be assumed that the velocity is subservient to the angular velocity in the same direction as the velocity.

Specifically, when the absolute value of the first angular velocity value $|\omega_\psi|$ is equal to or larger than a threshold value Th2 (NO in Step 109), the MPU 19 judges that the input apparatus 1 is moved in the yaw direction. In this case, the MPU 19 does not correct the first velocity value $V_x$ (Step 110). The same holds true for the absolute value of the second angular velocity value $|\omega_\theta|$ (NO in Step 112, and Step 1113).

The threshold value Th2 also only needs to be set in the same manner as the threshold value Th1.

On the other hand, when the absolute value of the first angular velocity value $|\omega_\psi|$ is smaller than the threshold value Th2 (YES in Step 109), the MPU 19 judges that the input apparatus 1 is not moved in the yaw direction. In this case, the MPU 19 corrects the first velocity value $V_x$ so as to reset it to 0, for example (Step 111). The same holds true for the absolute value of the second angular velocity value $|\omega_\theta|$ (YES in Step 112, and Step 114).

The MPU 19 outputs the velocity values $V_x$ and $V_y$ in both directions as described above, and the transmitting device 21 outputs to the control apparatus 40 the input information on the velocity values (Step 1116).

The MPU 35 of the control apparatus 40 is input with the velocity values $V_x$ and $V_y$ as the input information (Step 117). The MPU 35 generates coordinate values X and Y of the pointer 2 shown in Equations (5) and (6) below, that correspond to the velocity values $V_x$ and $V_y$ (Step 118). The display control section 42 controls display so as to move the pointer 2 to a position of the coordinate values X and Y on the screen 3 (Step 1119).

$$X(t)=X(t-1)+V_x \quad (5)$$

$$Y(t)=Y(t-1)+V_y \quad (6)$$

As described above, the reference acceleration values $a_{refx}$ and $a_{refy}$ are updated and the correction acceleration values $a_{corx}$ and $a_{cory}$ are corrected when the input apparatus 1 is held almost still, with the result that the gravitational effect with respect to the acceleration sensor unit 16 can be suppressed. In addition, because the correction acceleration values $a_{corx}$ and $a_{cory}$ are corrected using Equations (1) and (2) upon update of the reference acceleration values $a_{refx}$ and $a_{refy}$, a DC level is also corrected, thereby solving the problem regarding the DC offset. Further, because the velocity values are corrected so as to be reset to 0 when the input apparatus 1 is held almost still, integration errors can also be suppressed. When an integration error is generated, a phenomenon in which the pointer 2 moves on the screen 3 irrespective of the fact that the user has stopped moving the input apparatus 1 occurs.

Figure 13:
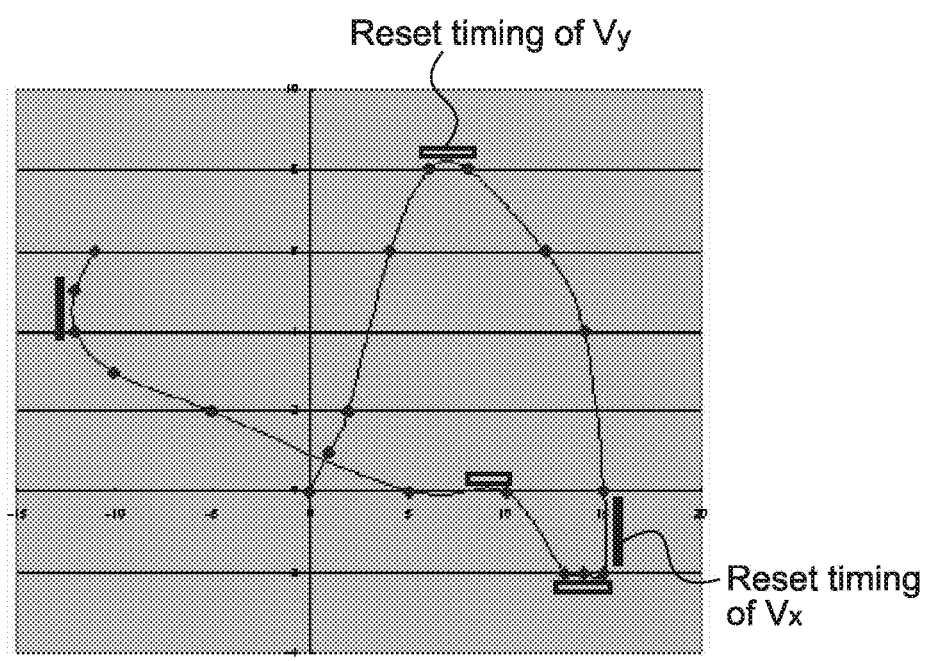
FIG. 13 A diagram showing an example of a trajectory of the input apparatus seen from a plane formed by an X axis and a Y axis.

Moreover, in this embodiment, because the first reference acceleration value $a_{refx}$ and the second reference acceleration value $a_{refy}$ are updated individually, when even one of the angular acceleration values in the yaw direction and the pitch direction becomes smaller than the threshold value, a correction thereof is performed. Therefore, it is possible to update the first reference acceleration value $a_{refx}$ or the second reference acceleration value $a_{refy}$ with a time interval short enough for practical use. The same holds true for the individual corrections of the first velocity value $V_x$ and the second velocity value $V_y$. FIG. 13 is an explanatory diagram to help understand the above description.

FIG. 13 shows a trajectory of the input apparatus 1 seen from a plane formed by the X axis and the Y axis. $V_x$ is reset to 0 if the angular velocity value $\omega_\psi$ in the yaw direction is substantially 0 (smaller than the threshold value Th2). $V_y$ is reset to 0 if the angular velocity value $\omega_\theta$ in the pitch direction is substantially 0 (smaller than the threshold value Th2).

Figure 14:
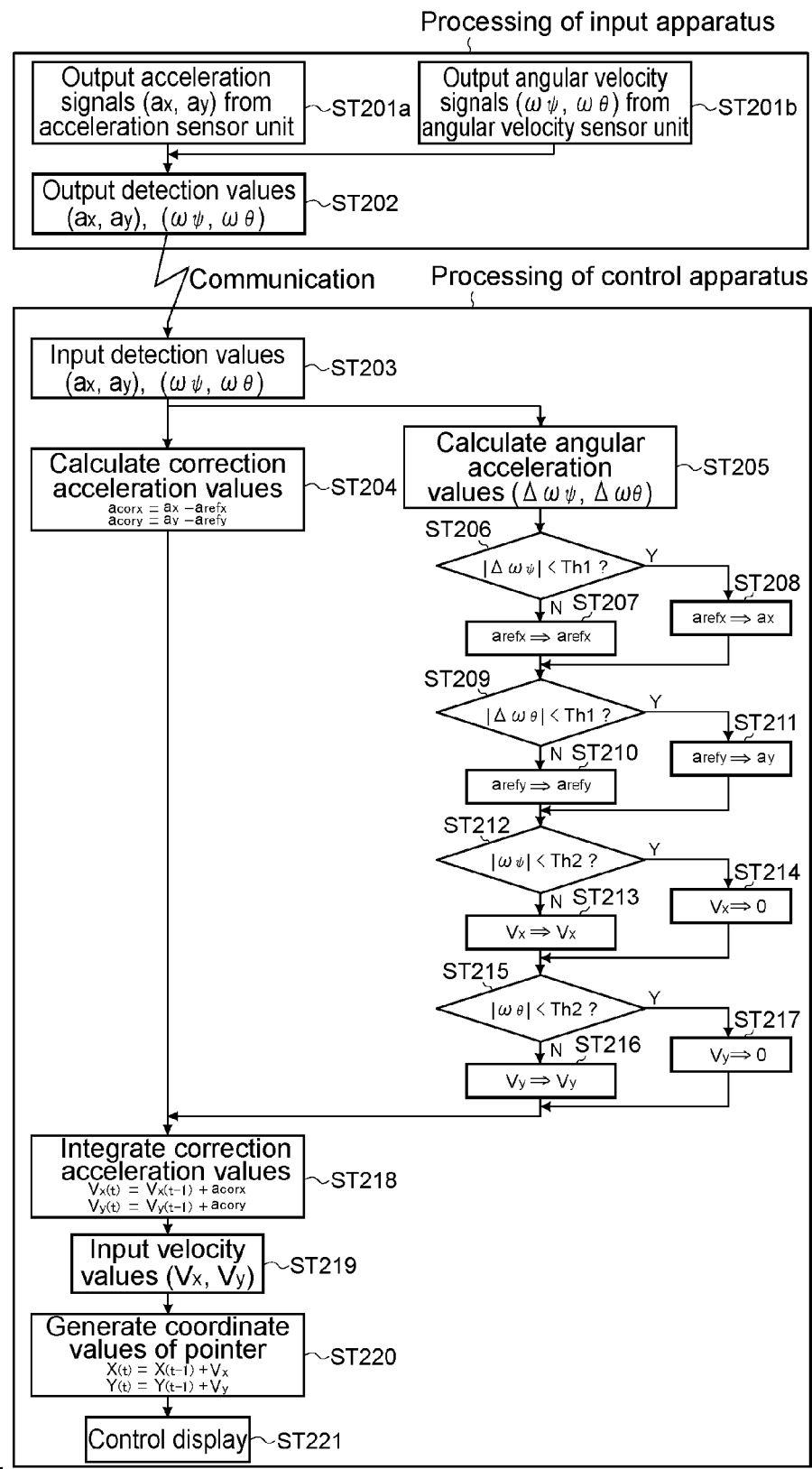
FIG. 14 A flowchart showing another embodiment described above.

FIG. 14 is a flowchart showing another embodiment described above. In the flowchart, the input apparatus 1 outputs, as the input information, to the control apparatus 40, the biaxial acceleration signals and biaxial angular velocity signals output from the sensor unit 17. The MPU 35 of the control apparatus 40 executes Steps 102a and 102b to 115 shown in FIG. 11 in Steps 204 to 218. Because details thereof are the same as that of FIG. 11, descriptions thereof will be omitted.

Figure 15:
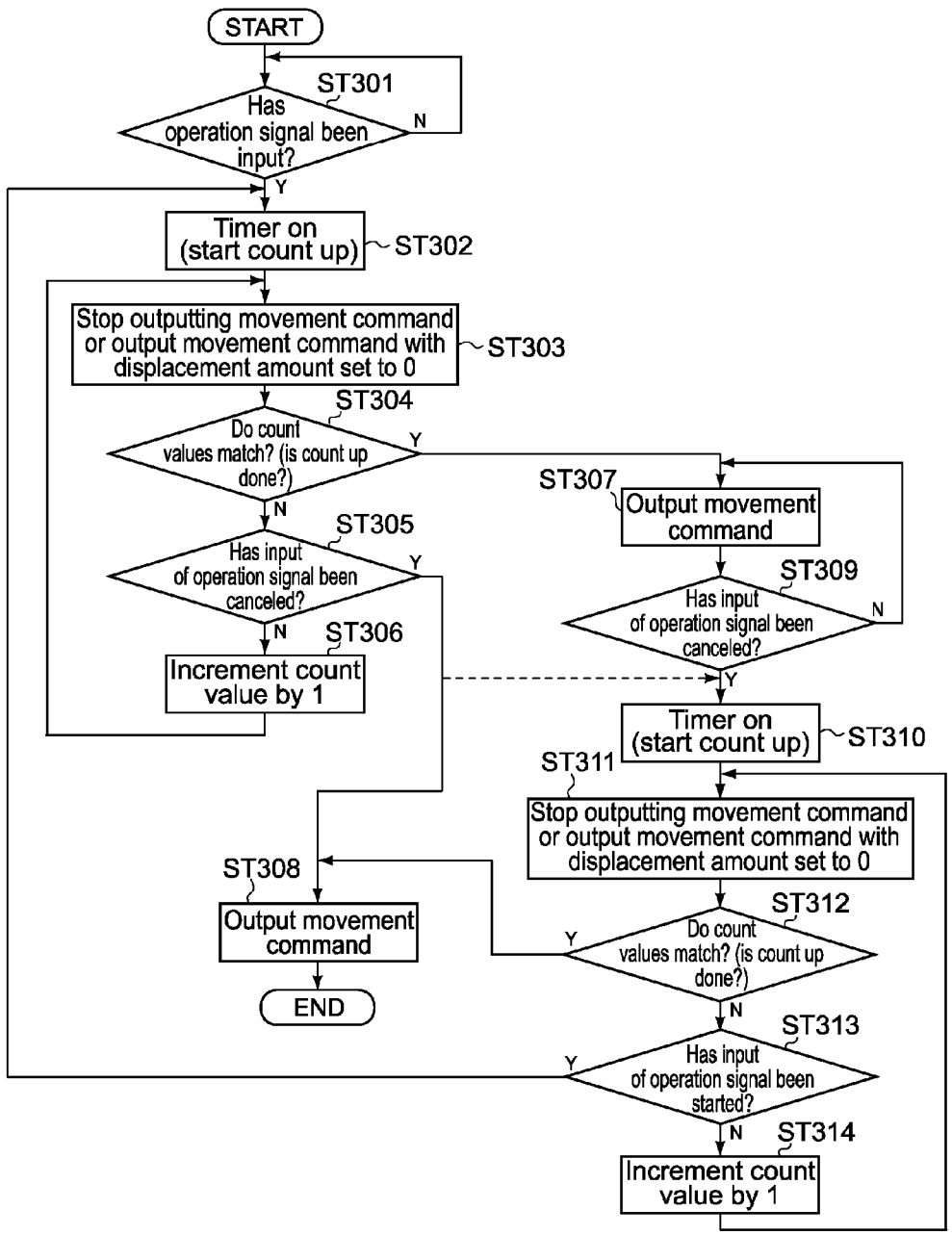
FIG. 15 A flowchart showing an operation performed when the user operates an operation section of the input apparatus.

Next, an embodiment regarding an operation carried out when the user operates the operation section 23 of the input apparatus 1 will be described. FIG. 15 is a flowchart showing the operation. FIG. 15 will be described while taking as an example a case where, by the button 11 out of the operation section 23 being operated, the input apparatus 1 generates operation commands of a click, double click, drag, and the like that correspond to a mouse of a PC, for example.

Figure 16:
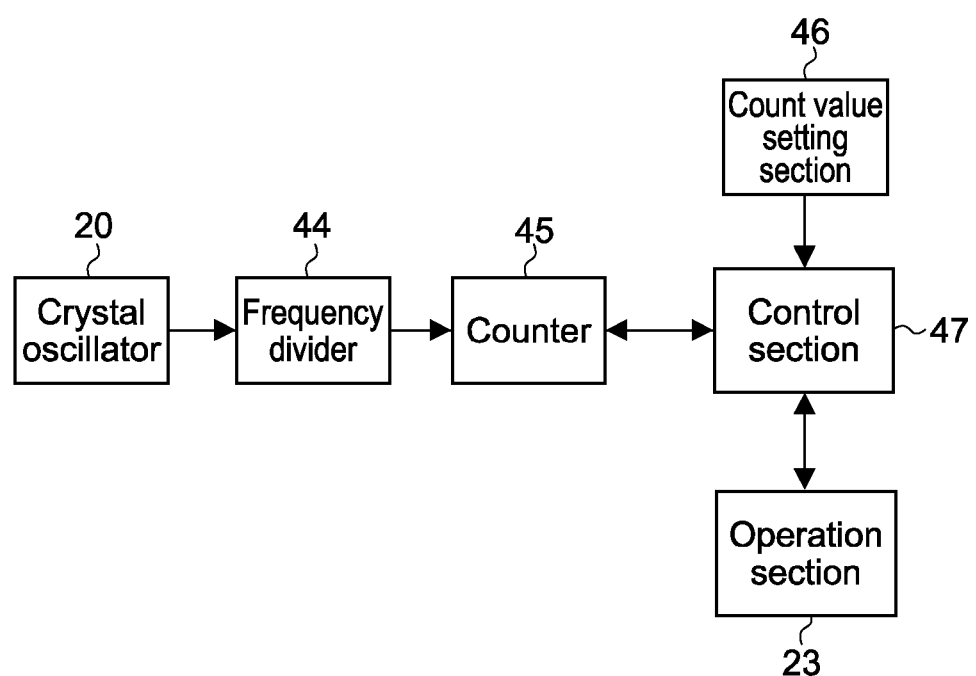
FIG. 16 A functional block diagram of the input apparatus for realizing the operation shown in FIG. 15.

FIG. 16 is a functional block diagram of the input apparatus 1 for realizing the operation shown in FIG. 15. A frequency divider 44 generates clock pulses of a predetermined frequency based on the pulses supplied from the crystal oscillator 20. A counter 45 counts the clock pulses generated by the frequency divider 44. A count value setting section 46 stores a predetermined number of count values that have been set, for example. A control section 47 compares the count value supplied from the counter and the count value supplied from the count value setting section 46, and executes processing to be described later based on a result of the comparison.

Blocks of the frequency divider 44, the counter 45, the count value setting section 46, the control section 47, and the like are included in the MPU 19, for example.

There are, for example, two types of count values set by the count value setting section 46. One is a count value corresponding to a time period during which the MPU 19 stops the generation or transmission of the movement command for moving the pointer 2 on the screen 3 since the pressing of the button 11 by the user, that is, since the start of the input of the operation signal (post-input regulation time).

The other is a count value corresponding to a time period during which the MPU 19 stops the generation or transmission of the movement command since the release of the button 11 pressed by the user, that is, since the cancel of the input of the operation signal (post-cancel regulation time). Hereinafter, the count value corresponding to the post-cancel regulation time will be referred to as first count value, and the count value corresponding to the post-input regulation time will be referred to as second count value.

The post-cancel regulation time and the post-input regulation time may be the same or may be different. Typically, the post-cancel regulation time and the post-input regulation time are 0.2 sec, but are not limited thereto. It is also possible to allow the user to customize at least one of the post-cancel regulation time and the post-input regulation time. For realizing such customization by the user, the input apparatus 1 may be provided with, for example, a DIP switch or a variable resistor. Further, it is also possible to allow the user to perform customization by operating a GUI on the screen 3 using the input apparatus 1. As described above, by allowing the post-cancel regulation time or the post-input regulation time to be customized, the user can arbitrarily set the post-cancel regulation time or the post-input regulation time that matches his/her own operational feeling.

Instead of stopping the generation or transmission of the movement command, the MPU 19 may output a signal of a movement command with the displacement amount of the pointer 2 on the screen 3 set to 0, that is, a movement command whose velocity values $(V_x(t), V_y(t))$ are reset to (0, 0).

It should be noted that generally in a PC, the operation command is often executed with the cancel of the input of the operation signal input by the user via a button of a mouse, that is, the release of the pressed button as a trigger.

As shown in FIG. 15, when the user presses the button 11 (YES in Step 301), the control section 47 turns on a timer (Step 302) to start the count up by the counter 45. The MPU 19 then stops outputting the movement command (Step 303). Alternatively, the MPU 19 continues outputting the movement command with the displacement amount of the pointer 2 set to 0 during the post-input regulation time.

The control section 47 compares the second count value set by the count value setting section 46 with the count value supplied from the counter 45 (Step 304). In other words, if both count values match, the post-input regulation time is ended, so the control section 47 stops the timer. If both count values do not match, the control section 47 keeps the timer operating and advances to the next Step 305. In Step 305, the MPU 19 monitors whether the pressed button 11 has been released, that is, whether the input of the operation signal has been canceled. When the pressed button 11 is not released, the MPU 19 increments the count value by 1 (Step 306) and returns to Step 303.

As described above, the MPU 19 stops the generation or transmission of the movement command while the timer is being operated, that is, until the count value supplied from the counter 45 matches the second count value. Alternatively, the MPU 19 may continue outputting the movement command with the displacement amount of the pointer 2 on the screen 3 set to 0 during the post-input regulation time as described above. By such processing, the movement of the pointer 2 on the screen 3 is regulated even when the casing 10 is moved when the user inputs an operation signal via the button 11 and the movement thereof is detected by the sensor unit 17. Therefore, operations of the pointer 2, the icon 4, and the like unintended by the user can be prevented from being made.

When the timer is ended (YES in Step 304), the MPU 19 generates or transmits the movement command (Step 307). In this case, the pointer 2 moves on the screen 3 in accordance with the movement of the input apparatus 1. Step 307 is a state where the input of the operation signal is not yet canceled, that is, a state where the user is moving the input apparatus 1 while maintaining a state where the button 11 is pressed.

In the case where the input of the operation signal is canceled even when the timer is being operated (YES in Step 305), the MPU 19 generates or transmits the movement command as in Step 307 (Step 308).

From the state of Step 307, the MPU 19 monitors whether the pressed button 11 has been released, that is, whether the input of the operation signal has been canceled (Step 309). When canceled, the control section 47 turns on the timer again (Step 310) and starts the count up by the counter 45. The MPU 19 then stops outputting the movement command (Step 311). Alternatively, the MPU 19 continues outputting, during the post-cancel regulation time, the movement command with the displacement amount of the pointer 2 set to 0.

When the first count value set by the count value setting section 46 and the count value supplied from the counter 45 match (YES in Step 312), the control section 47 ends the timer to end the post-cancel regulation time. Upon end of the post-cancel regulation time, the MPU 19 outputs the movement command (Step 308) to move the pointer 2. By such processing, the movement of the pointer 2 on the screen 3 is regulated even when the casing 10 is moved when the user presses the button 11 and releases it, and the movement thereof is detected by the sensor unit 17. Therefore, operations of the pointer 2, the icon 4, and the like unintended by the user can be prevented from being made.

When the timer is not yet ended (NO in Step 312), that is, the count values do not match, the MPU 19 keeps the timer operated and advances to the next Step 313. In Step 313, the MPU 19 monitors whether the released button 11 has been pressed again, that is, whether the input of the operation signal has been started again. When the button 11 is not pressed, the MPU 19 increments the count value by 1 (Step 314) and returns to Step 311.

When the input of the operation signal is started even while the timer is being operated (YES in Step 313), the MPU 19 returns to Step 302 and starts the timer. Accordingly, the user can control the pointer 2 or the icon 4 without feeling uncomfortable.

Here, in FIG. 15, after the input of the operation signal is canceled in Step 305, the control section 47 may restart the timer by resetting the timer of Step 304 and advance to the processes of Step 310 and after as indicated by the broken line. Accordingly, the user can control the pointer 2 or the icon 4 without feeling uncomfortable.

The processing shown in FIG. 15 may be executed by the control apparatus 40 as in the case of FIG. 14. In this case, the control apparatus 40 receives the acceleration signals and the angular velocity signals transmitted from the input apparatus 1 (reception means), and receives the operation signal input via the operation section. Then, the control apparatus 40 generates a first control signal corresponding to the displacement amount of the pointer 2, the first control signal corresponding to those detection signals, and a second control signal corresponding to the operation signal input by the user via the operation section 23. In actuality, the first control signal generated by the control apparatus 40 is a control signal that is based on the coordinate information of the pointer 2. Moreover, the second control signal generated by the control apparatus 40 is a control signal for executing various types of predetermined processing corresponding to the operation signals of the operation section 23 of the input apparatus 1 (processing means).

In the above embodiments, the displacement amount of the pointer 2 has been controlled based on the detection signals of the acceleration sensor unit 16, and the detection signals of the angular velocity sensor unit 15 have played an auxiliary role. However, the displacement amount of the pointer 2 may be controlled based on the detection signals of the angular velocity sensor unit 15.

In this case, for example, the input apparatus 1 or the control apparatus 40 can obtain the displacement amounts of a yaw angle and a pitch angle per unit time, that is, every predetermined clocks. For example, the MPU 35 of the control apparatus 40 generates coordinate values of the pointer 2 on the screen 3 that correspond to the obtained displacement amounts of the yaw angle and the pitch angle per unit time. The display control section 42 controls display so as to move the pointer 2 on the screen 3. The displacement amount of the yaw angle corresponds to the displacement amount of the pointer 2 on the X axis, and the displacement amount of the pitch angle corresponds to the displacement amount of the pointer 2 on the Y axis.

In this case, the MPU 35 only needs to obtain the displacement amounts of the pointer 2 on the screen 3 per unit time that correspond to the displacement amounts of the yaw angle and the pitch angle per unit time by a calculation or by a correspondence table stored in the ROM 37 in advance.

Next, an input apparatus according to another embodiment will be described.

Figure 17:
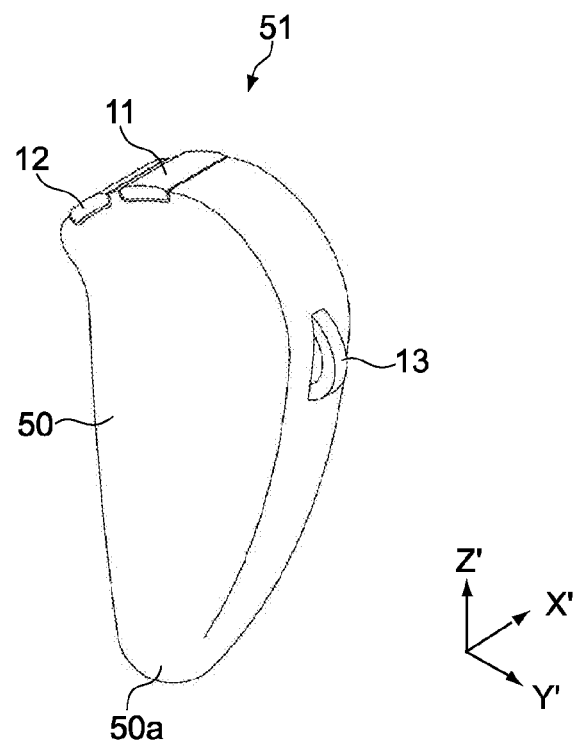
FIG. 17 A perspective diagram showing an input apparatus according to another embodiment of the present invention.
Figure 18:
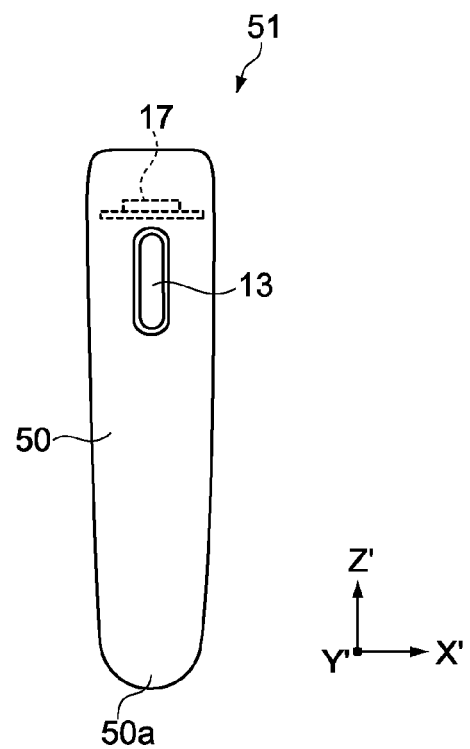
FIG. 18 A side view of the input apparatus shown in FIG. 17 seen from a rotary button side.

FIG. 17 is a perspective diagram showing an input apparatus 51. FIG. 18 is a side view of the input apparatus 51 seen from the wheel button 13 side. In the following, descriptions on components, functions, and the like similar to those of the input apparatus 1 according to the embodiment shown in FIG. 2 and the like will be simplified or omitted, and points different therefrom will mainly be described.

A casing 50 of the input apparatus 51 includes a partial sphere or partial quadric surface 50a at a predetermined position on a surface of the casing 50. Hereinafter, the partial sphere or quadric surface (50a) will be referred to as "lower curved surface" (50a) for convenience.

The lower curved surface 50a is formed at a position almost opposite to the buttons 11 and 12, that is, a position where, when a user holds the input apparatus 51, a pinky is located closer to the lower curved surface 50a than other fingers. Alternatively, in a case where, in the casing 50 elongated in one direction (Z'-axis direction), the sensor unit 17 is provided on a positive side of the Z' axis with respect to a longitudinal center of the casing 50 in the Z'-axis direction, the lower curved surface 50a is provided on a negative side of the Z' axis.

Typically, the partial sphere is substantially a hemisphere, but does not necessarily have to be a hemisphere. The quadric surface is a curved surface obtained by expanding a 2-dimensional conic curve (quadric curve) into a 3-dimensional conic curve. Examples of the quadric surface include an ellipsoid surface, an ellipsoid paraboloid surface, and a hyperbolic surface.

Figure 19:
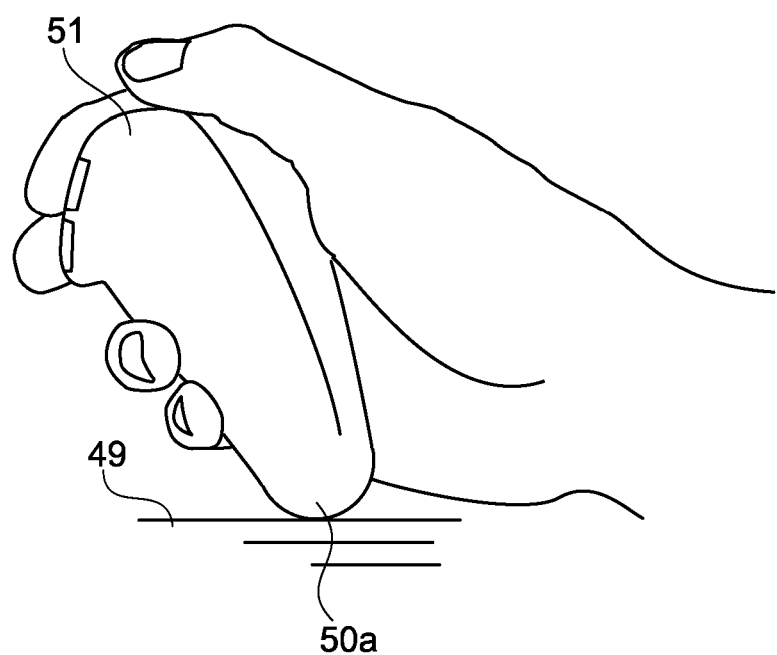
FIG. 19 A diagram showing a state where the user operates the input apparatus while a lower curved surface thereof is in contact with a knee of the user.

With the configuration of the casing 50 of the input apparatus 51 as described above, a user can easily operate the input apparatus 51 while causing the lower curved surface 50a of the input apparatus 51 as a fulcrum to abut on an abutment target object 49 such as a table, a chair, a floor, or a knee or thigh of a user. That is, even in the state where the lower curved surface 50a of the input apparatus 51 is abutted on the abutment target object 49, the user can easily tilt the input apparatus 51 in diverse angles, thereby enabling delicate operations such as placing the pointer on the icon. FIG. 19 is a diagram showing the state where the user operates the input apparatus 51 while causing the lower curved surface 50*a* to abut on the knee.

Alternatively, in this embodiment, erroneous operations due to a shake of a hand, which cannot be suppressed by an apparatus shake correction circuit, can be prevented from occurring, and the user is free from fatigue that is caused when the user operates the input apparatus 51 in the air.

Figure 20:
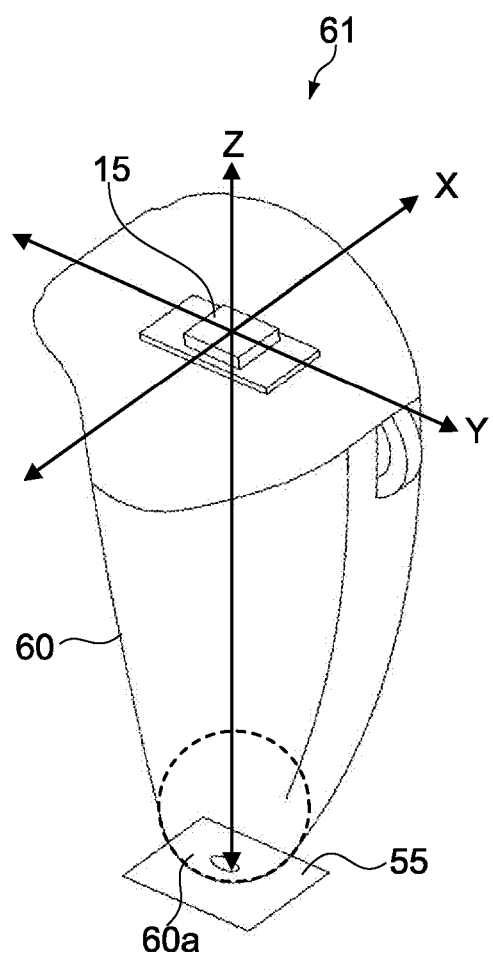
FIG. 20 A perspective diagram showing an input apparatus according to still another embodiment of the present invention.

FIG. 20 is a perspective diagram of an input apparatus according to still another embodiment of the present invention.

A casing 60 of an input apparatus 61 includes, similar to the input apparatus 51 shown in FIGS. 17 and 18, a lower curved surface 60*a* constituted of a partial sphere. A plane perpendicular to a maximum length direction (Z'-axis direction) of the casing 60 of the input apparatus 61 and is in contact with the lower curved surface 60*a* (hereinafter, referred to as "lower end plane 55" for convenience) is substantially parallel to a plane formed by the X axis and the Y axis (see FIG. 8) as detection axes of the angular velocity sensor unit 15 (X-Y plane).

With the structure of the input apparatus 61 as described above, in a case where an operation is made by the user while the lower curved surface 60*a* is abutted on the lower end plane 55, angular velocities applied to the input apparatus 61 are input to the angular velocity sensor unit 15 as they are. Thus, an amount of calculation required to obtain detection values from the detection signals from the angular velocity sensor unit 15 can be reduced.

Figure 21:
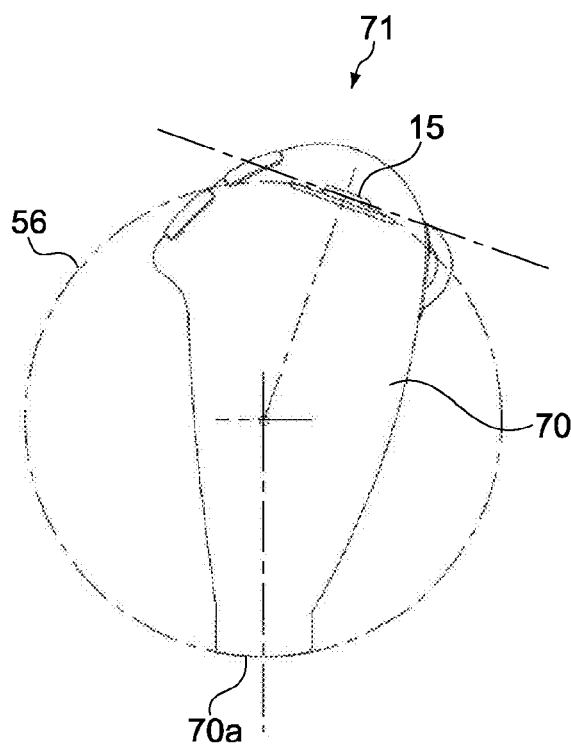
FIG. 21 A front view showing an input apparatus according to yet another embodiment of the present invention.
Figure 22:
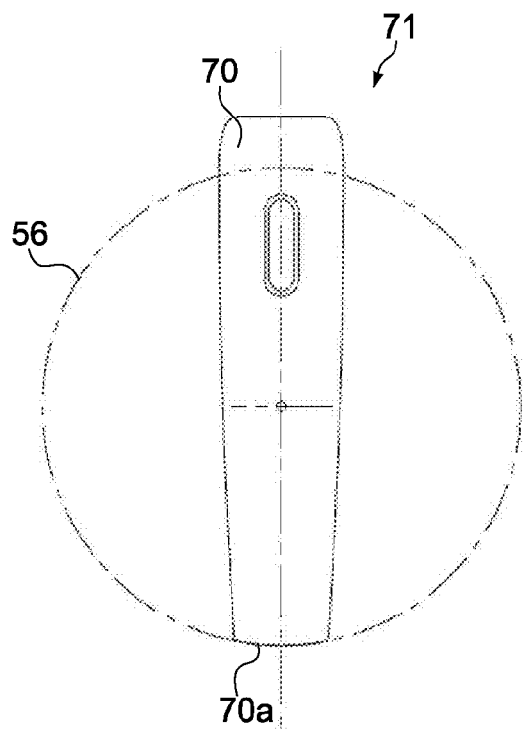
FIG. 22 A side view showing the input apparatus shown in FIG. 21.

FIG. 21 is a front view showing an input apparatus according to yet another embodiment of the present invention. FIG. 22 is a side view showing the input apparatus.

A lower curved surface 70*a* of a casing 70 of an input apparatus 71 is, for example, a partial sphere. The lower curved surface 70*a* is set with a larger curvature radius than the lower curved surfaces 50*a* and 60*a* of the input apparatuses 51 and 61 shown in FIGS. 17 and 20. The angular velocity sensor unit 15 is provided at a position at which a straight line contained in the X-Y plane formed by the X axis and the Y axis as the detection axes of the angular velocity sensor unit 15 corresponds to a tangent line of a virtually-drawn circle 56 that passes the partial sphere when seen from the X- and Y-axis directions. As long as the conditions as described above are satisfied, the angular velocity sensor unit 15 may be arranged in the casing 70 such that the X-Y plane of the angular velocity sensor unit 15 is tilted with respect to a longitudinal direction of the input apparatus 71 (see FIG. 21).

Accordingly, because a direction of the vector of the angular velocity generated when the user operates the input apparatus 71 while abutting the lower curved surface 70*a* thereof on the abutment target object 49 and the detection direction of the angular velocity sensor unit 15 match, a linear input is thus enabled.

Figure 23:
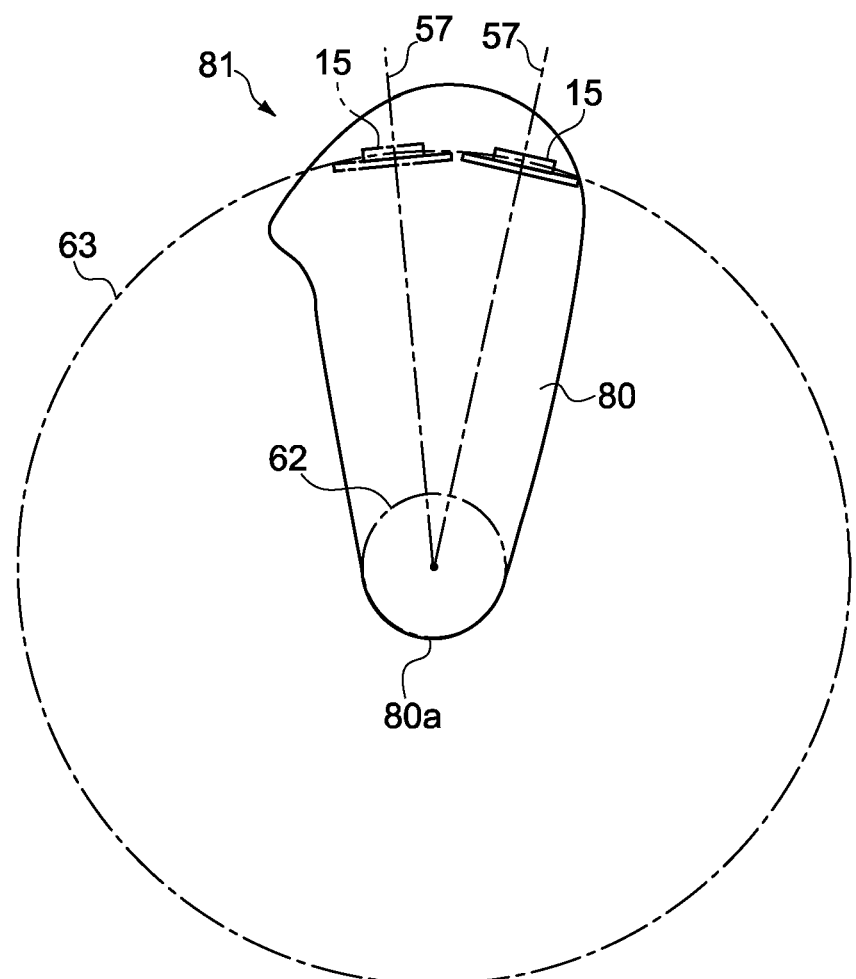
FIG. 23 A front view of an input apparatus according to still another embodiment of the present invention.

FIG. 23 is a front view of an input apparatus according to still another embodiment of the present invention.

A sphere as a lower curved surface 80*a* of a casing 80 of an input apparatus 81 has a curvature radius the same as or close to that shown in FIG. 20. Regarding the angular velocity sensor unit 15, a virtual straight line that passes an intersection of the X axis and the Y axis, which is a center point of the angular velocity sensor unit 15, and is orthogonal to the X axis and the Y axis passes a center point 0 of a first sphere 62 including the lower curved surface 80*a*. With the structure as described above, the first sphere 62 including the lower curved surface 80*a* and a second sphere 63 in which the straight line contained in the X-Y plane of the angular velocity sensor unit 15 becomes a tangent line are arranged concentrically. Therefore, the input apparatus 81 bears the same effect as the input apparatus 71 shown in FIG. 21.

It should be noted that the input apparatus 51, 61, 71, or 81 including the partial sphere or the partial quadric surface described above does not necessarily need to be operated by the user while the lower curved surface 50*a*, 60*a*, 70*a*, or 80*a* thereof is abutted against the abutment target object 49, and may of course be operated in air.

Next, an input apparatus according to still another embodiment will be described. In this embodiment, descriptions on components, functions, and the like similar to those of the input apparatus 1 above will be simplified or omitted, and points different therefrom will mainly be described.

Figure 24:
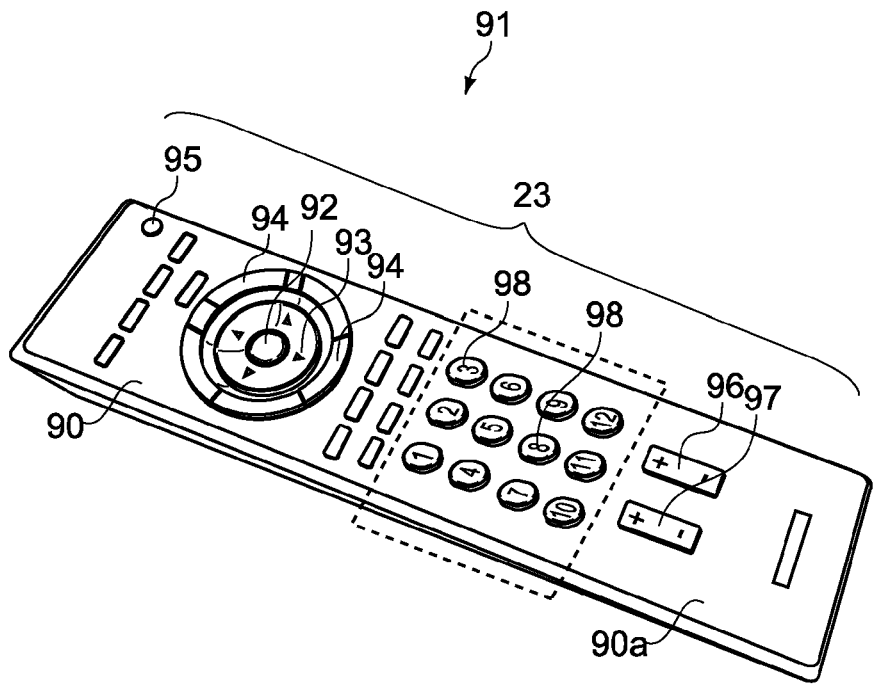
FIG. 24 A perspective diagram showing an input apparatus according to still another embodiment of the present invention.
Figure 25:
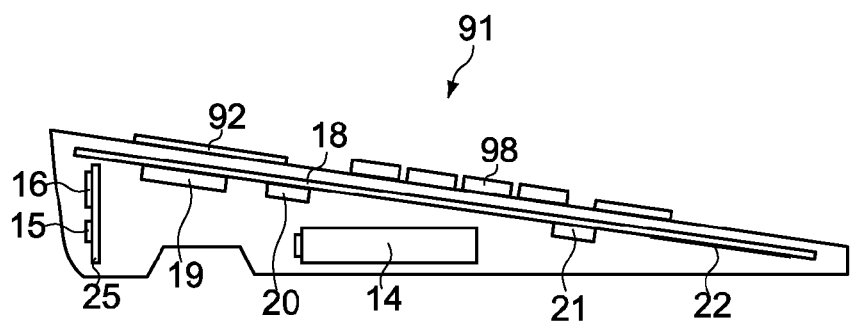
FIG. 25 A side view showing an internal structure of the input apparatus shown in FIG. 24.

FIG. 24 is a perspective diagram showing the input apparatus according to this embodiment. FIG. 25 is a side view showing an internal structure of the input apparatus according to this embodiment.

As shown in FIG. 24, an input apparatus 91 includes a casing 90, and the casing 90 is of a size that the user is capable of holding. The operation section 23 is provided on an upper surface 90*a* of the casing 90. The operation section 23 includes a determination button 92, a direction input button 93 disposed so as to surround the determination button 92, and a plurality of surrounding buttons 94 disposed around the direction input button 93. The determination button 92 has, for example, the function as a right button of a mouse. Any one of the surrounding buttons 94 may have the function as a left button of a mouse. Moreover, the operation section 23 includes a power input button 95 for the screen 3, a TV channel switch button 96, a volume button 97, and various other buttons used in a TV remote controller.

In addition to those buttons, the input apparatus 91 is provided with, as the operation section 23, a plurality of code buttons 98 capable of inputting codes that include at least one of a letter, a number, and a symbol. Each of the code buttons 98 is capable of inputting letters of hiragana, katakana, alphabets, and the like, numbers such as numerals, symbols such as figures, and other codes.

As shown in FIG. 25, the main substrate 18, the circuit board 25, and the batteries 14 are incorporated inside the casing 90 of the input apparatus 91. The MPU 19, the crystal oscillator 20, the transmitting device 21, and the antenna 22 are mounted on the main substrate 18. The angular velocity sensor unit 15 and the acceleration sensor unit 16 are mounted on the circuit board 25.

Figure 26:
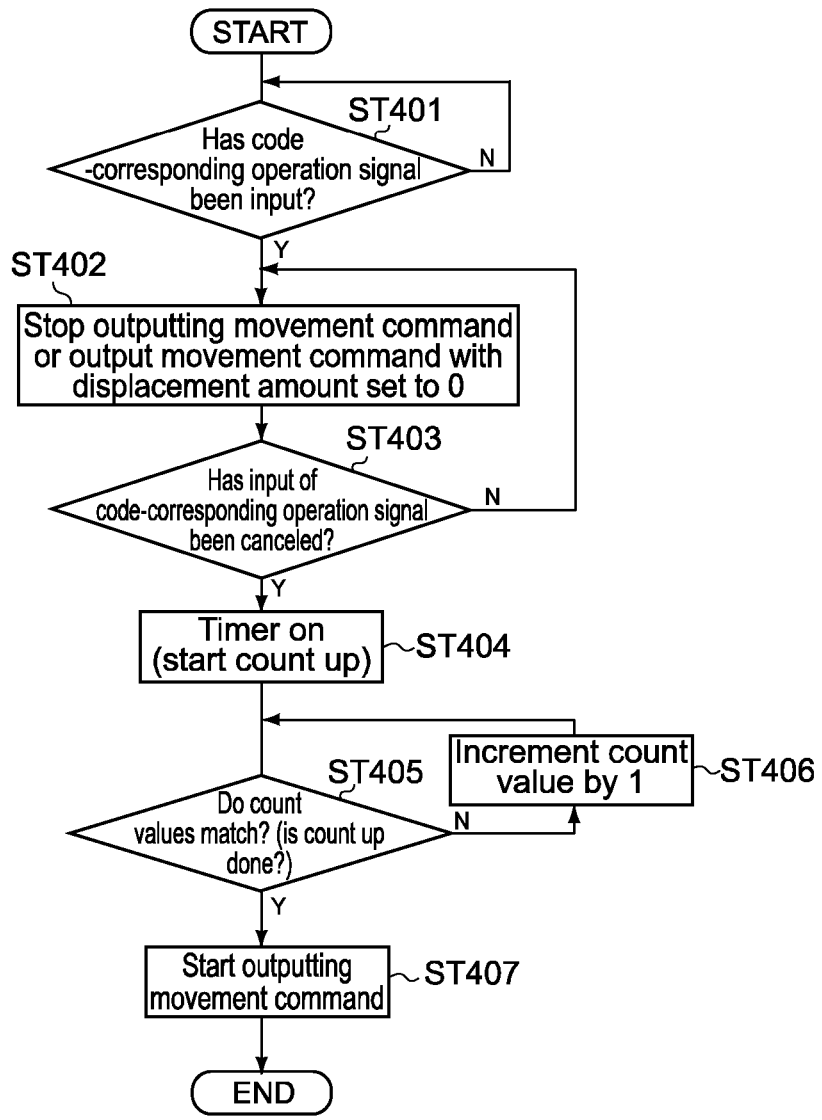
FIG. 26 A flowchart showing an operation of the input apparatus shown in FIG. 24.

Next, an operation of the input apparatus 91 will be described. FIG. 26 is a flowchart showing the operation of the input apparatus 91. Descriptions of FIG. 26 will be given on a case where the code button 98 is operated.

In a state where the code button 98 is not pressed by the user and a code-corresponding operation signal is thus not input (NO in Step 401), the MPU 19 is outputting the movement command (signal containing information on velocity values). Therefore, when the user holds the input apparatus 91 and moves the input apparatus 91, the pointer 2 moves on the screen 3 in accordance with that movement. Here, the velocity values are typically calculated by the method shown in FIG. 11 above. Accordingly, the movement of the pointer 2 on the screen 3 can be made a natural movement that matches an intuitional operation of the user. However, the velocity values do not necessarily need to be calculated by the method shown in FIG. 11, and may be calculated by simply integrating the acceleration values, for example. Alternatively, the velocity values calculated by other methods may be used.

When the code button 98 is pressed by the user, an output of the code-corresponding operation signal that corresponds to the code of a letter, numeral, and the like allocated to the pressed code button 98 from a switch (not shown) is started, for example. The code-corresponding operation signal is input to the MPU 19 (YES in Step 401). Upon start of the input of the code-corresponding operation signal (YES in Step 401), the MPU 19 stops outputting the movement command (Step 402) or starts outputting the movement command with the displacement amounts ($V_x(t)$, $V_y(t)$) set to (0, 0,).

Further, upon start of the input of the code-corresponding operation signal, the MPU 19 outputs information on the code-corresponding operation signal via the transmitting device 21. Upon input of the code-corresponding operation signal, the control apparatus 40 controls display of the screen 3 so that the code such as a letter or a numeral corresponding to the code-corresponding operation signal is displayed on the screen 3.

Upon stop of the output of the movement command, the MPU 19 of the input apparatus 91 judges whether the input of the code-corresponding operation signal has been canceled (Step 403). When the pressing of the code button 98 pressed by the user is released, the input of the code-corresponding operation signal to the MPU 19 is canceled (YES in Step 403). Then, the MPU 19 turns on the timer and starts to count up the post-cancel regulation time (Step 404).

As described above, the post-cancel regulation time is typically 0.2 sec, but is not limited thereto, and may be 0.2 sec or more or 0.2 sec or less. It is also possible for the post-cancel regulation time to be customized by the user. For realizing the customization by the user, the input apparatus 91 may be provided with, for example, a DIP switch or a variable resistor. Moreover, the user may be allowed to perform customization by operating the GUI on the screen 3 using the input apparatus 91. As described above, by allowing the post-cancel regulation time to be customized, the user can arbitrarily set the post-cancel regulation time that matches his/her own operational feeling.

Upon turning on the timer, the MPU 19 (control section 47 (see FIG. 16)) compares the first count value stored in the count value setting section 46 and the count value supplied from the counter 45 (Step 405). When the first count value and the count value from the counter 45 are different, the MPU 19 increments the count value by 1 (Step 406) and returns to Step 405.

When the first count value and the count value from the counter 45 match (YES in Step 405), that is, when the post-cancel regulation time has passed since the cancel of the input of the code-corresponding operation signal, the MPU 19 starts outputting the movement command (Step 407). It should be noted that when the input of the code-corresponding operation signal is started again before the elapse of the post-cancel regulation time since the cancel of the input of the code-corresponding operation signal, the MPU 19 may return to Step 401 to execute the processes of Step 401 and after.

By the processing shown in FIG. 26, because the movement of the pointer 2 is regulated while the user is pressing the code button 98, the pointer 2 is prevented from making any moves unintended by the user. Moreover, because, when the user releases the pressing of the code button 98, the movement of the pointer is regulated during the post-cancel regulation time since the release of the pressing, the pointer 2 is prevented from making any moves unintended by the user even after the release of the pressing of the button 98.

In this embodiment, descriptions have been given on the case where the code button 98 is pressed. However, the present invention is not limited thereto, and processing similar to that of FIG. 26 may be executed when other operation section 23 included in the input apparatus 91 is pressed. For example, processing similar to that of FIG. 26 may be executed when the direction input button 93, the TV channel switch button 96, the volume button 97, or the like is pressed. Alternatively, processing similar to that of FIG. 26 may be executed when various operation buttons 29 or the power switch 28 included in the input apparatus 1 shown in FIG. 6 or the like is pressed. It should be noted that the processing shown in FIG. 15 above may be executed when the determination button 92 included in the input apparatus 91 according to this embodiment is pressed.

Next, another embodiment regarding the operation of the input apparatus will be described.

This embodiment is different from the above embodiments in the point that the post-cancel regulation time described above is controlled variably. Therefore, that point will mainly be described. It should be noted that a case where the button 11 of the input apparatus 1 shown in FIGS. 2, 3, and the like is pressed will be described.

Figure 27:
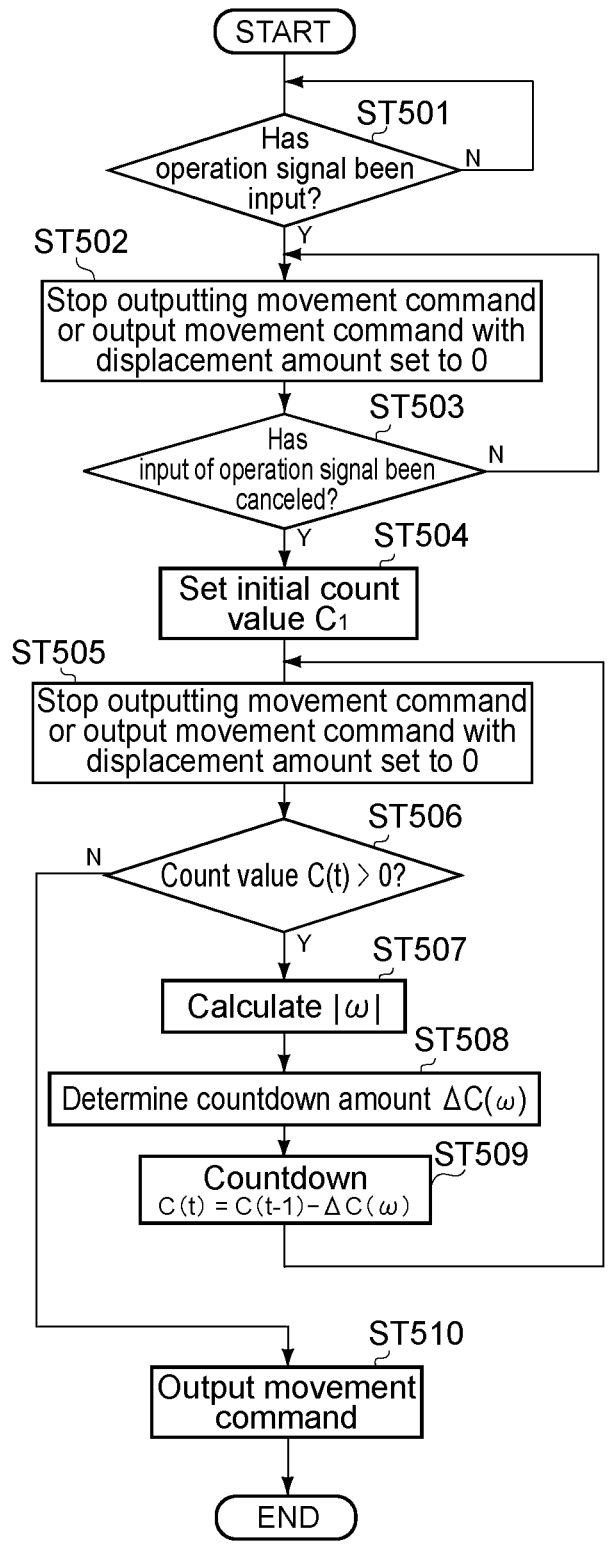
FIG. 27 A flowchart showing an operation of an input apparatus according to still another embodiment of the present invention.

FIG. 27 is a flowchart showing the operation of the input apparatus 1 according to this embodiment.

In the state where the user is not pressing the button 11, the operation signal is not input to the MPU 19 (NO in Step 501), and the input apparatus 1 is outputting the movement command. Therefore, when the user moves the input apparatus 1 using a rotation of a wrist or an elbow, for example, the pointer 2 moves on the screen 3 in accordance with the movement of the input apparatus 1.

When the button 11 is pressed by the user, an operation signal is output from a switch (not shown), for example, and is input to the MPU 19 (YES in Step 501). Then, the MPU 19 stops outputting the movement command or outputs the movement command with the displacement amount set to 0 (Step 502). In other words, when the input of the operation signal is started, the MPU 19 controls the output of the movement command so that the pointer 2 is stopped on the screen 3 (output control means).

Next, the MPU 19 judges whether the input of the operation signal has been canceled (Step 503). When the input of the operation signal is not canceled, the MPU 19 returns to Step 502 again and maintains the state where the output of the movement command is stopped or outputs the movement command with the displacement amount set to 0. Accordingly, because the movement of the pointer is regulated from the start of the pressing of the button 11 by the user to the release of the pressing, the pointer 2 is prevented from making any moves unintended by the user.

When the user releases the pressing of the button 11 and the input of the operation signal is thus canceled (YES in Step 503), the MPU 19 (control section 47) sets an initial count value $C_1$ to the counter 45 shown in FIG. 16, for example (Step 504). Here, the initial count value $C_1$ is a value to be an initial value for the countdown to be described later. The countdown of a count value $C(t)$ is started from the initial count value $C_1$. As will be shown in Step 509 to be described later, the countdown of the count value $C(t)$ is subtraction of a function value $\Delta C(\omega)$ of the angular velocity of the input apparatus 1 from the count value $C(t)$. Accordingly, the count value $C(t)$ decreases along with the countdown. The time when the count value $C(t)$ becomes 0 or less and the countdown is ended corresponds to the post-cancel regulation time described with reference to FIG. 15 above.

Upon setting the initial count value $C_1$, the MPU 19 maintains the state where the output of the movement command is stopped or outputs the movement command with the displacement amount set to 0 (Step 505). Accordingly, because the stopped state of the pointer is maintained even after the cancel of the input of the operation signal, it is possible to prevent the pointer 2 from moving from the icon 4 before the command issue due to the movement of the input apparatus 1 when the user releases the pressing of the button 11, for example.

Next, the MPU 19 judges whether the count value C(t) is larger than 0 (Step 506). When the count value C(t) is larger than 0, the MPU 19 obtains the biaxial angular velocity values ($\omega_\psi$, $\omega_\theta$) output from the angular velocity sensor unit 15. The MPU 19 calculates a square mean of the biaxial angular velocity values ($\omega_\psi$, $\omega_\theta$) to obtain an absolute value of the angular velocity values $|\omega|$ (Step 507). Alternatively, in Step 507, a larger one of an absolute value $|\omega_\psi|$ of the first angular velocity value $\omega_\psi$ and an absolute value $|\omega_\theta|$ of the second angular velocity value $\omega_\theta$ may be used as a representative value, instead of the absolute value of the angular velocity values $|\omega|$.

Upon calculating the absolute value of the angular velocity values $|\omega|$, the MPU 19 determines a countdown amount $\Delta C(\omega)$ corresponding to the magnitude of the absolute value of the angular velocity values $|\omega|$ (Step 508). The countdown amount $\Delta C(\omega)$ is a value that increases as the absolute value of the angular velocity values $|\omega|$ increases. Details on a relationship between the countdown amount $\Delta C(\omega)$ and the absolute value of the angular velocity values $|\omega|$ will be given later.

Upon determining the countdown amount $\Delta C(\omega)$, the MPU 19 subtracts the countdown amount $\Delta C(\omega)$ from the previous count value C(t−1) and calculates a new count value C(t), to thus execute countdown (Step 509). Upon calculating the new count value C(t), the MPU 19 maintains the stopped state of the movement command (Step 505) and judges whether the new count value C(t) is larger than 0 (Step 506). In other words, the MPU 19 repeats the processes shown in Steps 505 to 509 until the count value C(t) becomes 0 or less (time control means).

When the count value C(t) has become 0 or less (NO in Step 506), the MPU 19 starts outputting the movement command (Step 510). The time when the count value C(t) becomes a value of 0 or less corresponds to the post-cancel regulation time since the cancel of the input of the operation signal. It should be noted that when the button 11 is pressed and the input of the operation signal is started again before the count value C(t) becomes 0 or less, that is, before the elapse of the post-cancel regulation time, the MPU 19 may return to Step 501 and execute the processes of Step 501 and after.

By the processing shown in FIG. 27, the post-cancel regulation time is controlled such that the post-cancel regulation time is shortened as the absolute value of the angular velocity values $|\omega|$ increases. Accordingly, when the user swings the input apparatus 1 immediately after clicking the button 11 so as to start the movement of the pointer 2, the movement of the pointer 2 is started readily. Accordingly, since the user can shift to the pointing operation smoothly after the operation to the button 11, an operational feeling is improved.

Next, the relationship between the absolute value of the angular velocity values $|\omega|$ and the countdown amount $\Delta C(\omega)$ will be described.

FIGS. 28A to 28D are diagrams each showing an example of the relationship between the absolute value of the angular velocity values $|\omega|$ and the countdown amount $\Delta C(\omega)$. As shown in FIGS. 28A to 28D, the countdown amount $\Delta C(\omega)$ increases as the absolute value of the angular velocity values $|\omega|$ increases. The countdown amount $\Delta C(\omega)$ may be obtained by a calculation based on the absolute value of the angular velocities $|\omega|$, or may be obtained by a lookup table.

Figure 28A:
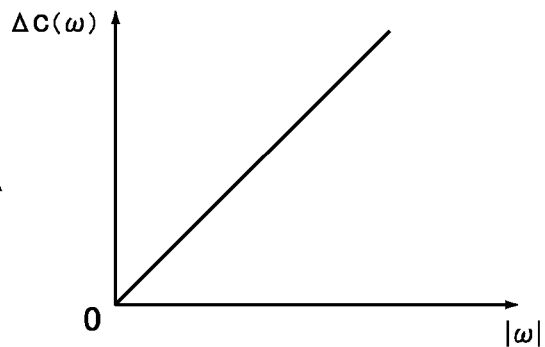
FIG. 28 Diagrams showing examples of a relationship between an absolute value of angular velocity values |ω| and a countdown amount ΔC(ω).

FIG. 28A is a diagram showing an example of a case where the countdown amount $\Delta C(\omega)$ increases by a linear function along with the increase of the absolute value of the angular velocity values $|\omega|$. The countdown amount $\Delta C(\omega)$ may increase by a quadratic function along with the increase of the absolute value of the angular velocity values $|\omega|$, may increase by a multi-degree function, or may alternatively be increased by an exponent function. Further, the countdown amount $\Delta C(\omega)$ may be set to be constant (maximum value) when the absolute value of the angular velocities $|\omega|$ is a predetermined value or more, and the countdown amount $\Delta C(\omega)$ may be set to be constant (minimum value) when the absolute value of the angular velocity values $|\omega|$ is smaller than the predetermined value.

Figure 28B:
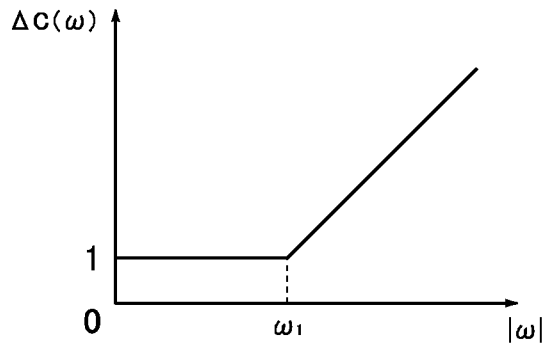

In the example shown in FIG. 28B, the countdown amount $\Delta C(\omega)$ is set to be constant when the absolute value of the angular velocity values $|\omega|$ is smaller than a predetermined threshold value $\omega_1$. Accordingly, the magnitude of the absolute value of the angular velocity values $|\omega|$ does not affect the post-cancel regulation time when the absolute value of the angular velocity values $|\omega|$ is smaller than the threshold value $\omega_1$. It should be noted that when the absolute value of the angular velocity values $|\omega|$ is smaller than the threshold value, the countdown amount $\Delta C(\omega)$ is not 0, but is, for example, 1. Accordingly, the post-cancel regulation time can be prevented from being continued endlessly without any progress in the countdown. When the absolute value of the angular velocity values $|\omega|$ is equal to or larger than the threshold value $\omega_1$, the countdown amount $\Delta C(\omega)$ increases by a linear function. The countdown amount $\Delta C(\omega)$ may increase by a quadratic function, a multi-degree function, or an exponent function along with the increase of the absolute value of the angular velocity values $|\omega|$. Moreover, when the absolute value of the angular velocities $|\omega|$ is a predetermined value or more, the countdown amount $\Delta C(\omega)$ may be set to be constant (maximum value). The predetermined threshold value $\omega_1$ of the absolute value of the angular velocity values is set appropriately in consideration of the relationship among the post-cancel regulation time, the countdown amount $\Delta C(\omega)$, and the absolute value of the angular velocity values $|\omega|$.

Figure 28C:
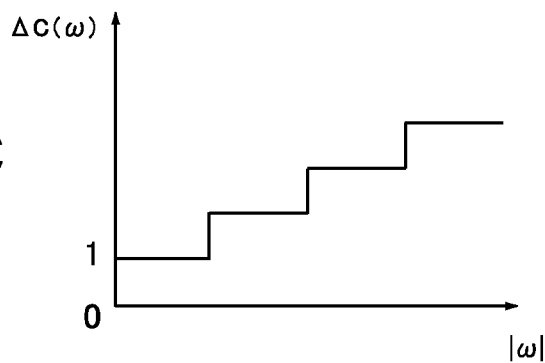

FIG. 28C is a diagram showing an example of a case where the countdown amount $\Delta C(\omega)$ increases by multiple steps along with the increase of the absolute value of the angular velocity values $|\omega|$. The number of the steps is not particularly limited.

Figure 28D:
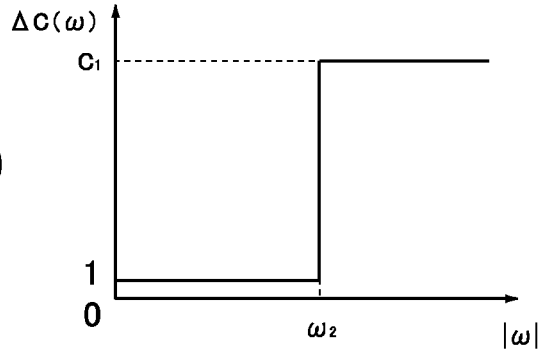

FIG. 28D is a diagram showing an example of a case where the countdown amount $\Delta C(\omega)$ increases by two steps along with the increase of the absolute value of the angular velocity values $|\omega|$. When the absolute value of the angular velocity values $|\omega|$ is smaller than a predetermined threshold value $\omega_2$, the countdown amount $\Delta C(\omega)$ is set to be constant like, for example, 1. On the other hand, when the absolute value of the angular velocity values $|\omega|$ is equal to or larger than the predetermined threshold value $\omega_2$, the countdown amount $\Delta C(\omega)$ is set to the initial count value $C_1$. Alternatively, the countdown amount $\Delta C(\omega)$ is set to a value equal to or larger than the initial count value $C_1$. Accordingly, the post-cancel regulation time can be ended when the absolute value of the angular velocity values $|\omega|$ is equal to or larger than the predetermined threshold value $\omega_2$. The predetermined threshold value $\omega_2$ is set appropriately in consideration of the relationship among the post-cancel regulation time, the countdown amount $\Delta C(\omega)$, and the absolute value of the angular velocity values $|\omega|$.

The descriptions of FIGS. 27 and 28 have been given on the case where the post-cancel regulation time is shortened as the angular velocity values increase. However, the present invention is not limited thereto, and the post-cancel regulation time may be shortened as the velocity values increase. Moreover, the post-cancel regulation time may be shortened as the acceleration values output from the acceleration sensor unit 16 increase. In addition, angular acceleration values, values of angular acceleration change rates, and values of acceleration change rates, for example, may be used. Absolute values of those values that correspond to the movement of the casing 10 may also be used. The same holds true also for the post-input regulation time to be described later.

The descriptions of this embodiment have been given on the case where the button 11 of the input apparatus 1 is pressed. However, the processing shown in FIG. 27 may be executed when the button 12 of the input apparatus 1 is pressed. The configuration of the casing of the input apparatus may be any of those of the casings 50 to 80 shown in FIGS. 17 to 23. Alternatively, the processing shown in FIG. 27 may be executed when the determination button 92 of the input apparatus 91 shown in FIGS. 24 and 25 is pressed. The same holds true also for embodiments to be described later regarding the operation of the input apparatus.

The processing shown in FIG. 27 may be mainly executed by the control apparatus 40 as in the case of FIG. 14. In this case, the control apparatus 40 receives, via the antenna 39, the information on the angular velocity values ($\omega_\psi$, $\omega_\theta$), information on the acceleration values ($a_x$, $a_y$), and the operation signal output from the input apparatus 1 (or input apparatuses 51 to 91). The MPU 35 of the control apparatus 40 executes the processes shown in Steps 203 to 218, for example, to calculate the velocity values. The MPU 35 generates a first control signal corresponding to the velocity values, and the display control section 42 controls display so that the pointer 2 moves on the screen at a velocity corresponding to the velocity values. Upon receiving the operation signal, the MPU 35 of the control apparatus 40 generates a second control signal corresponding to the operation signal and executes various types of processing.

Further, the MPU 35 controls the output of the first control signal so that, until the input of the operation signal is canceled since the start of the input of the operation signal, the pointer 2 is stopped on the screen 3. When judged that the input of the operation signal has been canceled, the MPU 35 executes the processes of Steps 504 to 510 shown in FIG. 27 and variably controls the post-cancel regulation time. Various modifications described with reference to FIGS. 27 and 28 can be applied to the processing of the control apparatus 40.

It should be noted that embodiments to be described later regarding the operation of the input apparatus 1 may also be executed mainly by the control apparatus 40.

Next, still another embodiment regarding the operation of the input apparatus 1 will be described.

Figure 29:
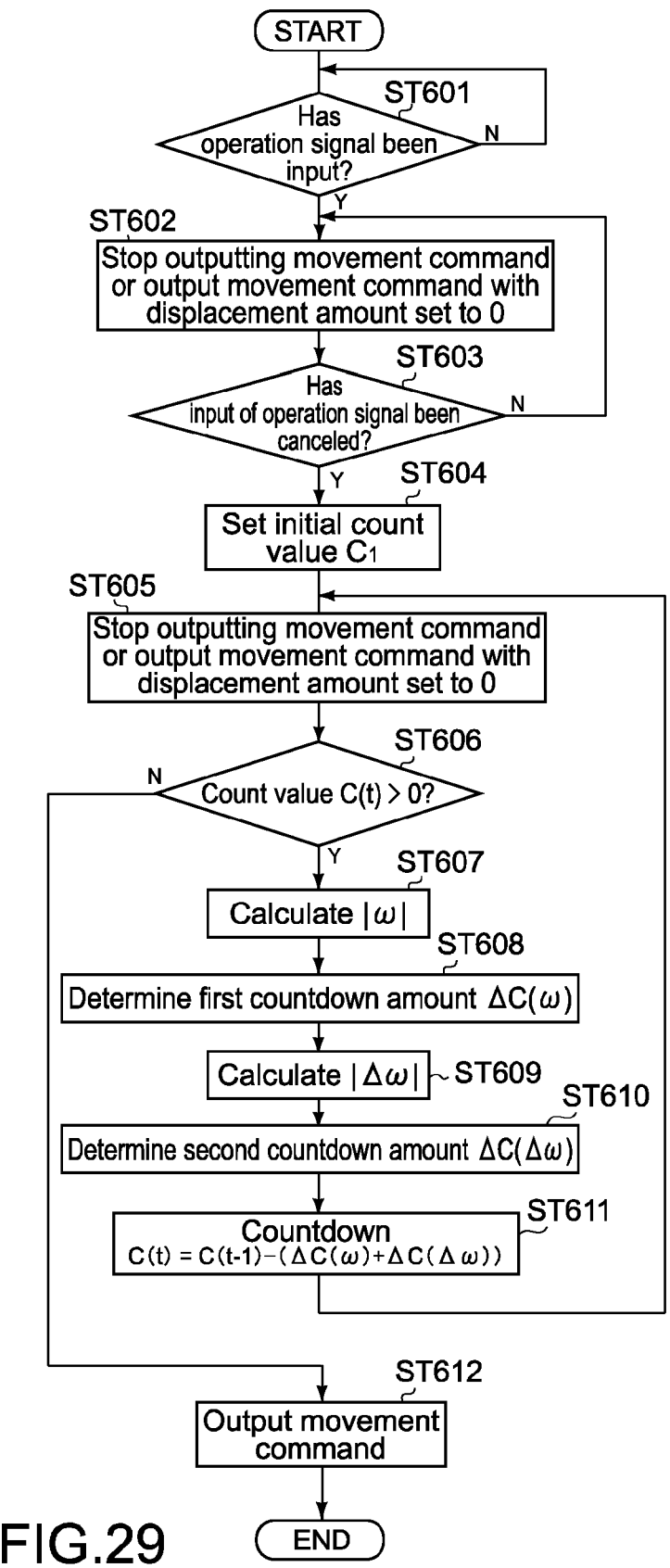
FIG. 29 A flowchart showing an operation of an input apparatus according to still another embodiment.

FIG. 29 is a flowchart showing an operation of the input apparatus according to this embodiment. The input apparatus 1 of this embodiment is different from that of the embodiment shown in FIG. 27 above in the point that the post-cancel regulation time is controlled variably in relation to not only the angular velocity values but also the angular acceleration values. Therefore, that point will mainly be described. It should be noted that the countdown amount related to the angular velocity values will be described as a first countdown amount $\Delta C(\omega)$, and the countdown amount related to the angular acceleration values will be described as a second countdown amount $\Delta C(\Delta\omega)$.

As shown in FIG. 29, in Steps 601 to 608, processes similar to those of Steps 501 to 508 of FIG. 27 are executed. Upon determining the first countdown amount $\Delta C(\omega)$ corresponding to the absolute value of the angular velocity values $|\omega|$ (Step 608), the MPU 19 calculates biaxial angular acceleration values ($\Delta\omega_\psi$, $\Delta\omega_\theta$) by deriving the biaxial angular velocity values ($\omega_\psi$, $\omega_\theta$). The MPU 19 calculates a square mean of the biaxial angular acceleration values ($\Delta\omega_\psi$, $\Delta\omega_\theta$) to obtain an absolute value of the angular acceleration values $|\Delta\omega|$ (Step 609). Alternatively, in Step 609, a larger one of an absolute value of the first angular acceleration value $|\Delta\omega_\psi|$ and an absolute value of the second angular acceleration value $|\Delta\omega_\theta|$ may be used as a representative value instead of the absolute value of the angular acceleration values $|\Delta\omega|$.

Upon calculating the absolute value of the angular acceleration values $|\Delta\omega|$, the MPU 19 determines the second countdown amount $\Delta C(\Delta\omega)$ corresponding to the magnitude of the absolute value of the angular acceleration values $|\Delta\omega|$ (Step 610). The second countdown amount $\Delta C(\Delta\omega)$ is a value that increases as the absolute value of the angular acceleration values $|\Delta\omega|$ increases. The relationship between the absolute value of the angular accelerations $|\Delta\omega|$ and the second countdown amount $\Delta C(\Delta\omega)$ is, for example, the relationships shown in FIG. 28 above. In this case, the absolute value of the angular velocity values $|\omega|$ represented on the abscissa axis in FIGS. 28A to 28D only needs to be switched to the absolute value of the angular acceleration values $|\Delta\omega|$.

Upon determining the second countdown amount $\Delta C(\Delta\omega)$, the MPU 19 subtracts the first countdown amount $\Delta C(\omega)$ and the second countdown amount $\Delta C(\Delta\omega)$ from the previous count value $C(t-1)$ to calculate a new count value $C(t)$ (Step 611). Hereinafter, the MPU 19 repeats the processes of Steps 605 to 611 until the count value $C(t)$ becomes 0 or less. Then, when the count value $C(t)$ has become 0 or less (NO in Step 606), the MPU 19 starts outputting the movement command (Step 612).

By the processing shown in FIG. 29, because the post-cancel regulation time is controlled variably in accordance with not only the angular velocity values but also the angular acceleration values, the post-cancel regulation time can be shortened appropriately.

Although the first countdown amount $\Delta C(\omega)$ and the second countdown amount $\Delta C(\Delta\omega)$ are determined individually in this embodiment, it is also possible for one countdown amount $\Delta C(\omega, \Delta\omega)$ corresponding to the angular velocity values and the angular acceleration values to be determined by a lookup table, for example.

In this embodiment, descriptions have been given on the case where the post-cancel regulation time is controlled variably in accordance with the angular velocity values and the angular acceleration values. However, the present invention is not limited thereto, and the post-cancel regulation time may be controlled variably in accordance with the velocity values and the acceleration values. Alternatively, the post-cancel regulation time may also be controlled variably by a combination of two among the angular velocity values, the angular acceleration values, the velocity values, the acceleration values, and other values corresponding to the movement of the casing 10.

Although descriptions have been given on the case where the post-cancel regulation time is controlled variably in accordance with two different movement signals in this embodiment, the post-cancel regulation time may also be controlled variably in accordance with three or more different movement signals.

Next, still another embodiment regarding the operation of the input apparatus will be described.

For example, there are cases where the user who is not good at performing delicate operations on the pointer causes a large apparatus shake, in the case of which the user wishes for the pointer to be stopped for a longer time period after the release of the pressing of the button 11. Thus, in this embodiment, a first regulation time is controlled so that the first regulation time is prolonged as a signal within a frequency range that corresponds to the apparatus shake out of the signals of the angular velocity values increases. Therefore, that point will mainly be described.

Figure 30:
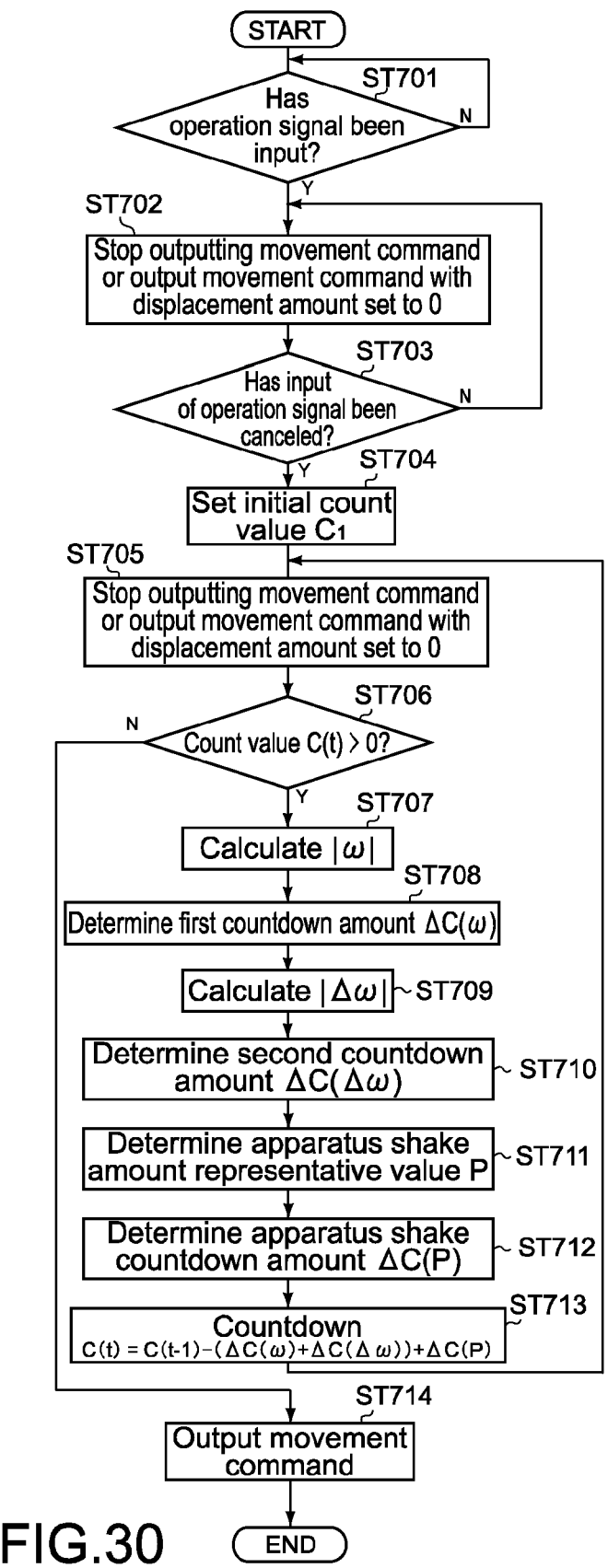
FIG. 30 A flowchart showing an operation of an input apparatus according to still another embodiment.

FIG. 30 is a flowchart showing an operation of the input apparatus 1 according to this embodiment.

As shown in FIG. 30, in Steps 701 to 710, processes similar to those of Steps 601 to 610 of FIG. 29 are executed. Upon calculating the second countdown amount $\Delta C(\Delta\omega)$ corresponding to the absolute value of the angular acceleration values $|\Delta\omega|$ (Step 710), the MPU 19 frequency-analyzes the biaxial angular velocity values $(\omega_\psi, \omega_\theta)$. The MPU 19 detects a peak value within a frequency range corresponding to an apparatus shake (e.g., 1 to 20 Hz) out of the signals of the angular velocity values $(\omega_\psi, \omega_\theta)$. The MPU 19 calculates a mean value of the peak values of the biaxial angular velocity values, and determines an apparatus shake amount representative value P (Step 711). Alternatively, a larger one of the two peak values may be used as the apparatus shake amount representative value P.

Alternatively, in Step 711, the apparatus shake amount representative value P may be determined using the absolute value of the angular velocity values $|\omega|$ obtained after passage through a band-pass filter or a highpass filter instead of the frequency analysis.

Upon determining the apparatus shake amount representative value P, the MPU 19 determines an apparatus shake countdown amount $\Delta C(P)$ corresponding to the apparatus shake amount representative value P (Step 712). The apparatus shake countdown amount $\Delta C(P)$ is a value that increases as the apparatus shake amount representative value P increases. The apparatus shake countdown amount $\Delta C(P)$ may increase by a linear function, multi-degree function, or exponent function along with the increase of the apparatus shake amount representative value P. Furthermore, the apparatus shake countdown amount $\Delta C(P)$ may increase by two steps or multiple steps along with the increase of the apparatus shake amount representative value P.

Upon determining the apparatus shake countdown amount $\Delta C(P)$, the MPU 19 subtracts the first countdown amount $\Delta C(\omega)$ and the second countdown amount $\Delta C(\Delta\omega)$ from the previous count value C(t−1), and adds the apparatus shake countdown amount $\Delta C(P)$, to thus calculate a new count value C(t) (Step 713). Hereinafter, the MPU 19 repeats the processes of Steps 705 to 713 until the count value C(t) becomes 0 or less. Then, when the count value C(t) has become 0 or less (NO in Step 706), the MPU 19 starts outputting the movement command (Step 714).

By the processing shown in FIG. 30, the post-cancel regulation time is controlled such that the post-cancel regulation time is prolonged as the apparatus shake becomes larger. Accordingly, even the user who causes a large apparatus shake can easily perform the pointing operations, thus improving an operational feeling.

A limitation shown in Equation (7) below may be imposed on the apparatus shake countdown amount $\Delta C(P)$ determined in Step 712.

$$\Delta C(P) \leq \Delta C(\omega) + \Delta C(\Delta\omega) - 1 \quad (7)$$

In other words, a limitation may be imposed on the apparatus shake countdown amount $\Delta C(P)$ so that even at maximum, a value smaller by 1 than a sum of the first countdown amount and the second countdown amount is not exceeded. Accordingly, the post-cancel regulation time can be prevented from being continued endlessly without any progress in the countdown shown in Step 713, in the case where the apparatus shake is large.

Although the first countdown amount $\Delta C(\omega)$, the second countdown amount $\Delta C(\Delta\omega)$, and the apparatus shake countdown amount $\Delta C(P)$ are determined individually in this embodiment, one countdown amount $\Delta C(\omega, \Delta\omega, P)$ may be determined by a lookup table, for example.

In this embodiment, descriptions have been given on the case where the count of the post-cancel regulation time is executed using signals of two different physical amounts (angular velocity values and angular acceleration values) and a signal of the apparatus shake amount. However, the present invention is not limited thereto, and the count of the post-cancel regulation time may be executed using signals of one physical amount (e.g., angular velocity values) and the apparatus shake amount signal. Alternatively, it is also possible to execute the count of the post-cancel regulation time using only the apparatus shake amount signal.

Next, another embodiment regarding the operation of the input apparatus will be described.

In the above embodiments shown in FIGS. 27 to 30 above, descriptions have been given on the case where the movement of the pointer is regulated from the start of the pressing of the button 11 by the user to the release of the pressing of the button 11. On the other hand, this embodiment is different from the processing shown in FIGS. 27 to 30 in the point that the movement of the pointer is regulated during the post-input regulation time since the start of the pressing of the button 11 (to put it the other way around, after an elapse of the post-input regulation time, the pointer moves even when the button 11 is pressed). Moreover, when compared with the processing shown in FIG. 15 above, this embodiment is different from the processing shown in FIG. 15 in the point that the post-cancel regulation time is variable. In descriptions of this embodiment, points different from that of the processing shown in FIGS. 27 and 15 will mainly be described.

Figure 31:
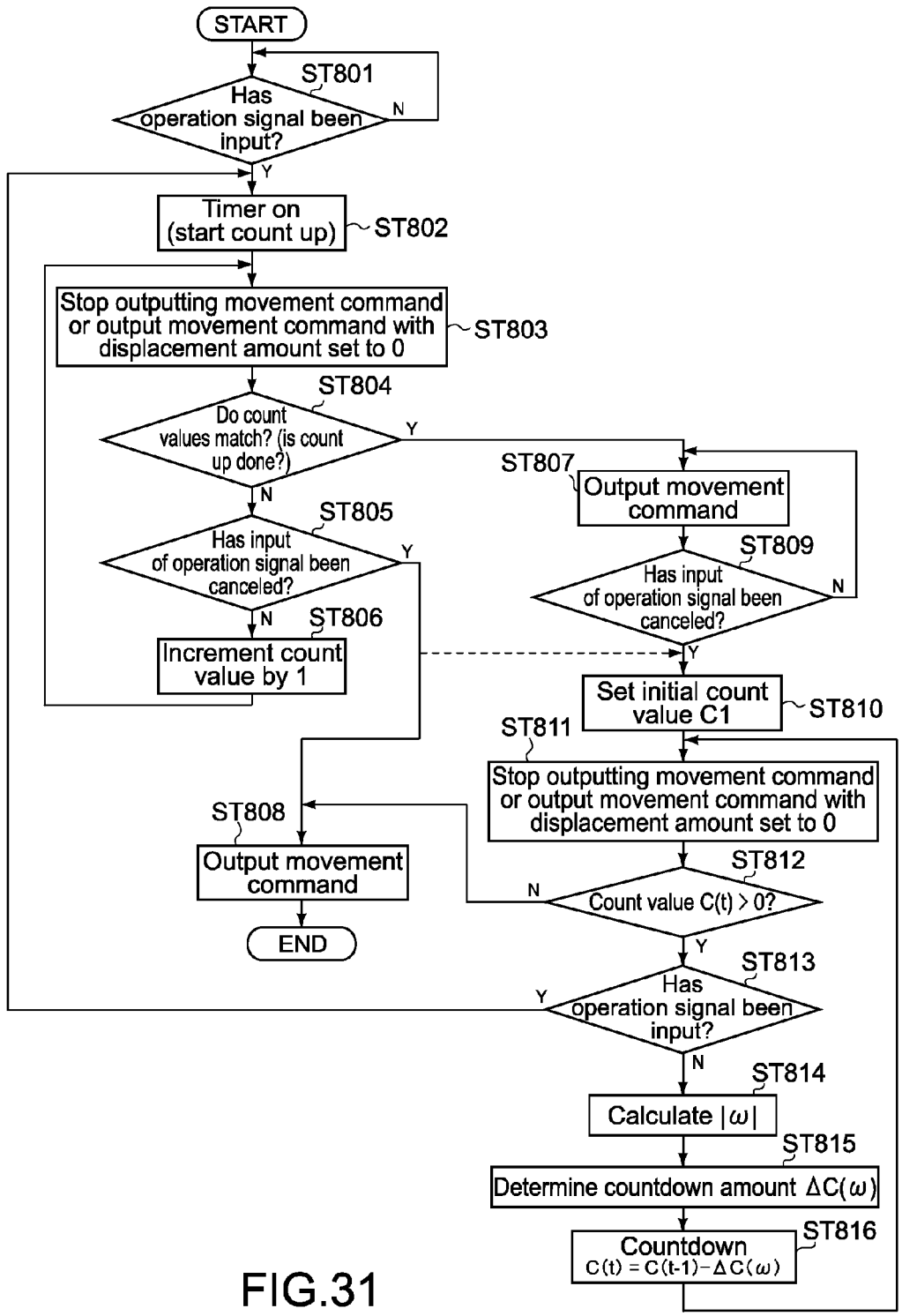
FIG. 31 A flowchart showing an operation of an input apparatus according to still another embodiment.

FIG. 31 is a flowchart showing an operation of the input apparatus according to this embodiment.

In Steps 801 to 806 of FIG. 31, processes similar to those of Steps 301 to 306 shown in FIG. 15 are executed. In other words, during the post-input regulation time since the pressing of the button 11 by the user and the input of the operation signal to the MPU 19, the output of the movement command is controlled so that the movement of the pointer 2 is stopped on the screen 3.

When the count values match in Step 804 (YES in Step 804), the MPU 19 starts outputting the movement command (Step 807). In other words, when the post-input regulation time has elapsed without the pressing of the button 11 being released since the pressing of the button 11 by the user (see NO in Step 805), the MPU 19 starts outputting the movement command. In this case, a drag operation is displayed on the screen 3, for example, and the pointer 2 and the icon 4 move on the screen 3.

Here, for realizing the drag operation, the input apparatus 1 only needs to output a pressing code while the button 11 is being pressed, for example. The MPU 35 of the control apparatus 40 displays the drag operation on the screen 3 when the pressing code and the movement command are input at the same time.

Upon outputting the movement command, the MPU 19 of the input apparatus 1 judges whether the input of the operation signal has been canceled (Step 809). When the pressing of the button 11 is released by the user and the input of the operation signal is canceled (YES in Step 809), the MPU 19 sets the initial count value $C_1$ to the counter 45 (Step 810).

Then, the MPU 19 stops outputting the movement command or starts outputting the movement command with the displacement amount set to 0 (Step 811). It should be noted that when the input of the operation signal is canceled in Step 809, the MPU 19 stops outputting the pressing code.

Upon cancel of the input of the pressing code and the movement command from the input apparatus 1, the MPU 35 of the control apparatus 40 ends the display of the drag operation on the screen 3 and executes display of drop.

Upon stop of the output of the movement command (Step 811), in Steps 812 to 816 thereafter, processes similar to those of Steps 506 to 509 shown in FIG. 27 are executed. In other words, the countdown of the count value C(t) is executed by the countdown amount $\Delta C(\omega)$ corresponding to the magnitude of the absolute value of the angular velocity values $|\omega|$, and when the count value C(t) has become 0 or less (NO in Step 812), the output of the movement command is started (Step 808).

Accordingly, the pointer 2 and the icon 4 are prevented from moving during drop, and when attempting to start moving the pointer 2 immediately after dropping the icon 4, the user can readily start moving the pointer.

It should be noted that when the button 11 is pressed by the user and the input of the operation signal is started during the variably-controlled post-cancel regulation time (YES in Step 813), the process returns to Step 802, and the movement of the pointer is regulated during the post-input regulation time (fixed) since the input of the operation signal.

Here, when the input of the operation signal is canceled before the elapse of the post-input regulation time since the input of the operation signal in Step 805 (YES in Step 805), the MPU 19 may execute the processes of Step 810 and after as indicated by the broken line. Accordingly, for example, the pointer 2 can be prevented from moving from the icon 4 by the click operation, and when the user wishes to start moving the pointer 2 immediately after the click operation, the movement of the pointer 2 can be started readily.

Moreover, in Steps 814 to 816, the processes of Steps 607 to 611 shown in FIG. 29 may be executed. Accordingly, the post-cancel regulation time can be shortened appropriately. Alternatively, in Steps 814 to 816, the processes of Steps 707 to 713 shown in FIG. 30 may be executed. Accordingly, even the user who causes a large apparatus shake can easily perform a pointing operation, for example.

Next, still another embodiment regarding the operation of the input apparatus will be described.

Since this embodiment is different from the embodiment shown in FIG. 31 above in the point that not only the post-cancel regulation time but also the post-input regulation time is controlled variably, that point will mainly be described. It should be noted that values as initial values for countdowns of the post-cancel regulation time and the post-input regulation time will be described as a first initial count value $C_1$ and a second initial count value $C_2$, respectively.

Figure 32:
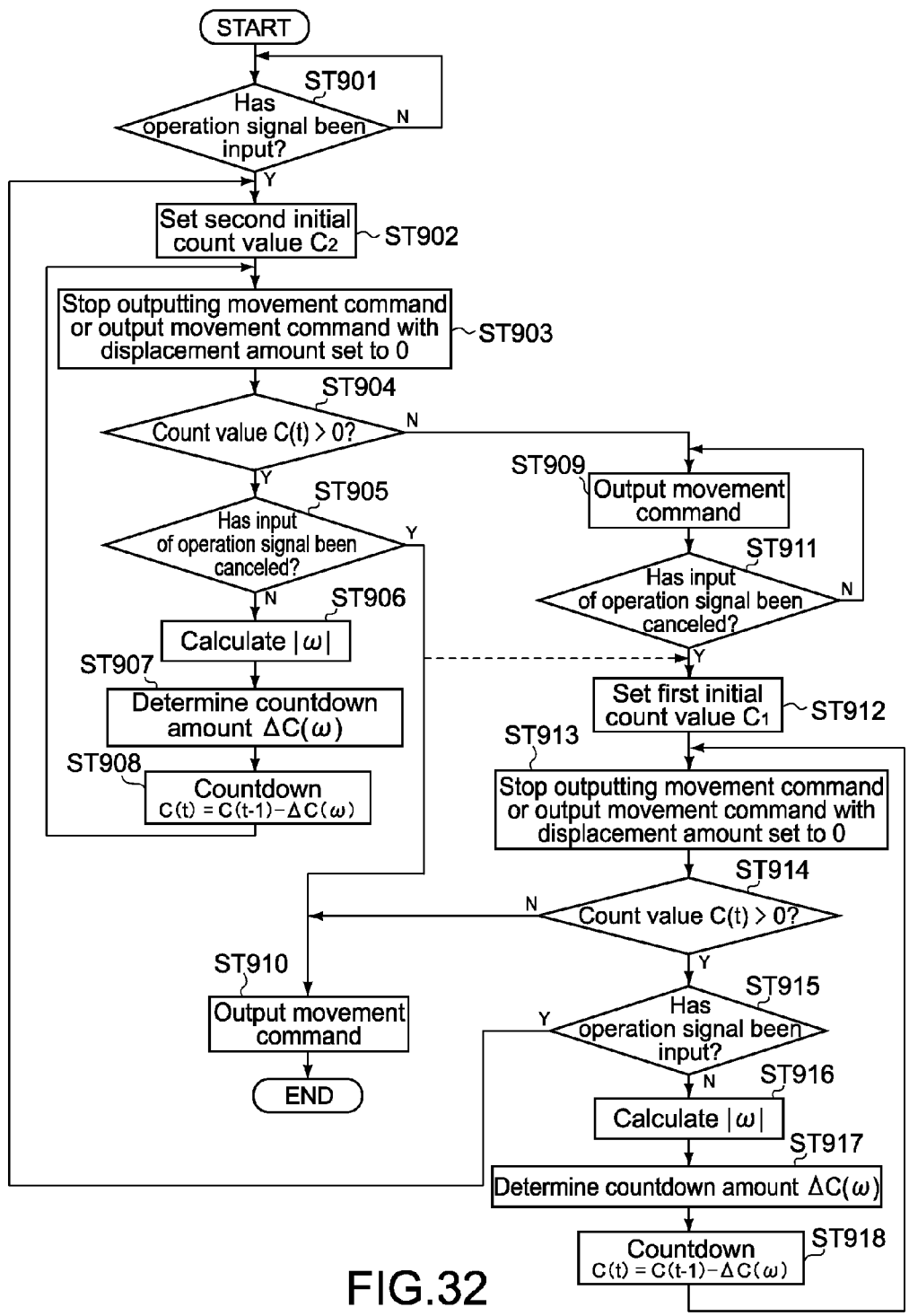
FIG. 32 A flowchart showing an operation of an input apparatus according to still another embodiment.

FIG. 32 is a flowchart showing an operation of the input apparatus according to this embodiment.

When the button 11 is pressed by the user, an operation signal is input to the MPU 19 (YES in Step 901). Upon input of the operation signal, the MPU 19 sets the second initial count value $C_2$ to the counter 45. The countdown of the count value C(t) is started from the second initial count value $C_2$, and the time when the count value C(t) becomes 0 or less corresponds to the post-input regulation time.

Here, the second initial count value $C_2$ typically is a value larger than the first initial count value $C_1$. For example, the second initial count value $C_2$ is twice the first initial count value $C_1$. This is because, in his/her mind, the user wants the time period during which the pointer 2 is stopped since the start of the pressing of the button 11 (post-input regulation time) to be longer than the time period during which the pointer 2 is stopped since the release of the pressing (post-cancel regulation time). For example, because, when the user starts pressing the button 11 to start a click operation, he/she has in mind a wish to positively perform the click operation, the post-input regulation time needs to be long to some extent. On the other hand, because, when the user releases the pressing of the button 11 to end the click operation, he/she has in mind a wish to immediately start the movement of the pointer, the post-cancel regulation time needs to be short to some extent.

In this regard, in this embodiment, the second initial count value $C_2$ is set to have a larger value than the first initial count value $C_1$ like twice the first initial count value $C_1$, for example. As long as the second initial count value $C_2$ has a larger value than the first initial count value $C_1$, it may be other than twice. Alternatively, a case where the second initial count value $C_2$ and the first initial count value $C_1$ are the same is also conceivable. Accordingly, the program can be lightened.

Upon setting the second initial count value $C_2$, the MPU 19 stops outputting the movement command or starts outputting the movement command with the displacement amount set to 0 (Step 903). Accordingly, the pointer 2 can be prevented from moving on the screen 3 due to the movement of the input apparatus 1 at the start of the pressing of the button 11.

Next, the MPU 19 judges whether the count value C(t) is larger than 0 (Step 904), and when larger than 0, judges whether the input of the operation signal has been canceled (Step 905). When the input of the operation signal is not canceled, the countdown amount $\Delta C(\omega)$ corresponding to the magnitude of the absolute value of the angular velocity values $|\omega|$ is determined (see FIG. 28) and countdown is executed (Steps 906 to 908). Hereinafter, the MPU 19 repeats the processes shown in Steps 903 to 908 until the count value C(t) becomes 0 or less. Accordingly, the post-input regulation time is controlled variably in accordance with the magnitude of the absolute value of the angular velocity values $|\omega|$.

Here, when the pressing of the button 11 is released and the input of the operation signal is canceled within the variably-controlled post-input regulation time in Step 905 (YES in Step 905), the output of the movement command is started (Step 910). Alternatively, as indicated by the broken line, it is also possible that, after the count value C(t) is reset and the first initial count value $C_1$ is newly set (Step 912), the movement of the pointer is regulated during the post-cancel regulation time (variable) since the cancel of the input of the operation signal.

When the input of the operation signal is not canceled (see NO in Step 905) and the count value C(t) becomes 0 or less (NO in Step 904), the output of the movement command is started (Step 909). In other words, when the post-input regulation time has elapsed since the start of the pressing of the button 11 without the pressing being released, the output of the movement command is started. In this case, a drag operation is started on the screen 3.

Specifically, in this embodiment, the post-input regulation time is a time period during which the pointer 2 is stopped on the screen 3 since the start of the pressing of the button 11, and is a time period from the start of the pressing of the button 11 to the start of the drag. The post-input regulation time is controlled so as to be shortened as the absolute value of the angular velocity values increases. Accordingly, when the user swings the input apparatus 1 immediately after pressing the button 11 to execute the drag operation, the drag operation can be readily started on the screen 3.

Upon starting the output of the movement command (Step 909), the MPU 19 executes processes similar to those of Steps 809 to 816 shown in FIG. 31 in Steps 911 to 918 thereafter, thus bearing the same operational effect as the embodiment shown in FIG. 31. It should be noted that when the pressing of the button 11 is started and the input of the operation signal is started within the variably-controlled post-cancel regulation time in Step 915, the count value C(t) is reset and the second initial count value $C_2$ is set to the counter 45 (Step 902). Then, the MPU 19 executes the processes of Step 903 and after.

In Steps 906 to 908, processes similar to those of Steps 607 to 611 shown in FIG. 29 may be executed. Accordingly, the post-input regulation time can be shortened appropriately. Alternatively, in Steps 906 to 908, processes similar to those of Steps 707 to 713 shown in FIG. 30 may be executed. Accordingly, even the user who causes a large apparatus shake can easily perform a pointing operation, for example.

Next, another embodiment regarding the relationship between the second initial count value and the first initial count value will be described.

In the above embodiment, descriptions have been given on the case where the second initial count value $C_2$ is larger than the first initial count value $C_1$. On the other hand, in this embodiment, the second initial count value $C_2$ is smaller than the first initial count value $C_1$. Therefore, that point will mainly be described.

Figure 33A:
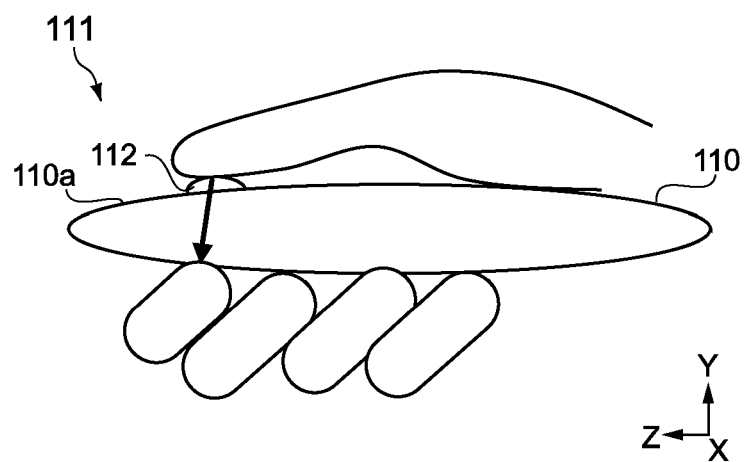
FIG. 33 Diagrams showing a state where the user carries out an operation of pressing a button of an input apparatus according to still another embodiment.
Figure 33B:
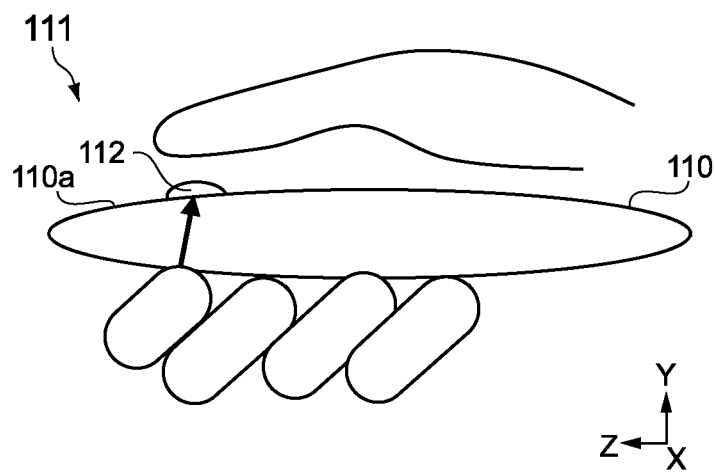
Figure 34:
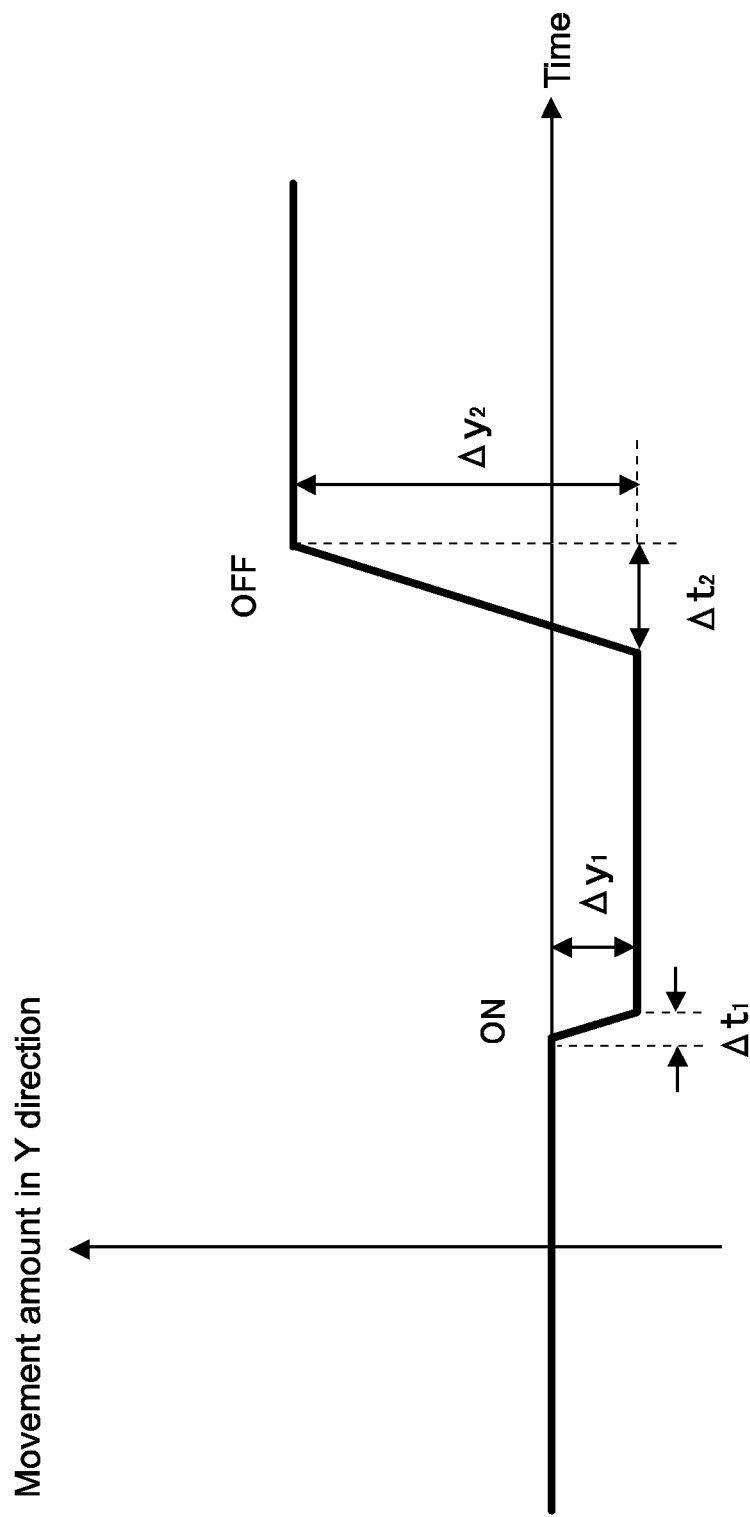
FIG. 34 A diagram showing an example on a movement amount (shake amount) in a Y-axis direction when the pressing operation is made to the button.

FIG. 33 are diagrams showing a state where the user is carrying out a pressing operation to a button of an input apparatus according to this embodiment. FIG. 33A is a diagram showing a state where the button is pressed, and FIG. 33B is a diagram showing a state where the pressing of the button is released. Moreover, FIG. 34 is a diagram showing an example on a movement amount (shake amount) in the Y-axis direction when the pressing operation is made to the button.

As shown in FIG. 33, an input apparatus 111 according to this embodiment includes a button 112 on an upper surface 110a of a casing 110.

As shown in FIG. 33A, when the user presses the button 112 with a thumb, the input apparatus 111 tries to move downward by a force from the thumb. However, because the user can support the input apparatus 111 with an index finger, the movement amount (shake amount) of the input apparatus 111 in the Y-axis direction is relatively small. In this case, as shown in FIG. 34, for example, the movement amount in the Y-axis direction becomes $\Delta y_1$, and a time period during which the shake is caused becomes $\Delta t_1$.

On the other hand, as shown in FIG. 33B, when the user releases the pressing of the button 112, the force from the thumb is released and a force from the index finger is applied to the input apparatus 111. In this case, because the thumb is detached from the input apparatus 111 and thus cannot support the force from the index finger, the input apparatus 111 moves relatively largely. As shown in FIG. 34, for example, the movement amount in the Y-axis direction becomes $\Delta y_2$, and a time period during which the shake is caused becomes $\Delta t_2$.

As described above, the time $\Delta t_2$ during which the shake is caused when the pressing is released is longer than the time $\Delta t_1$ during which the shake is caused at the start of the pressing. Therefore, in the input apparatus 111 according to this embodiment, the second initial count value $C_2$ is set to be smaller than the first initial count value $C_1$, and the post-input regulation time is adjusted to be shorter than the post-cancel regulation time. Accordingly, erroneous movements of the pointer can be prevented appropriately.

In the descriptions of FIGS. 27 to 34, the point where the post-cancel regulation time is controlled variably has mainly been described. In embodiments hereinafter, a point where the post-input regulation time is controlled variably will mainly be described.

Figure 35:
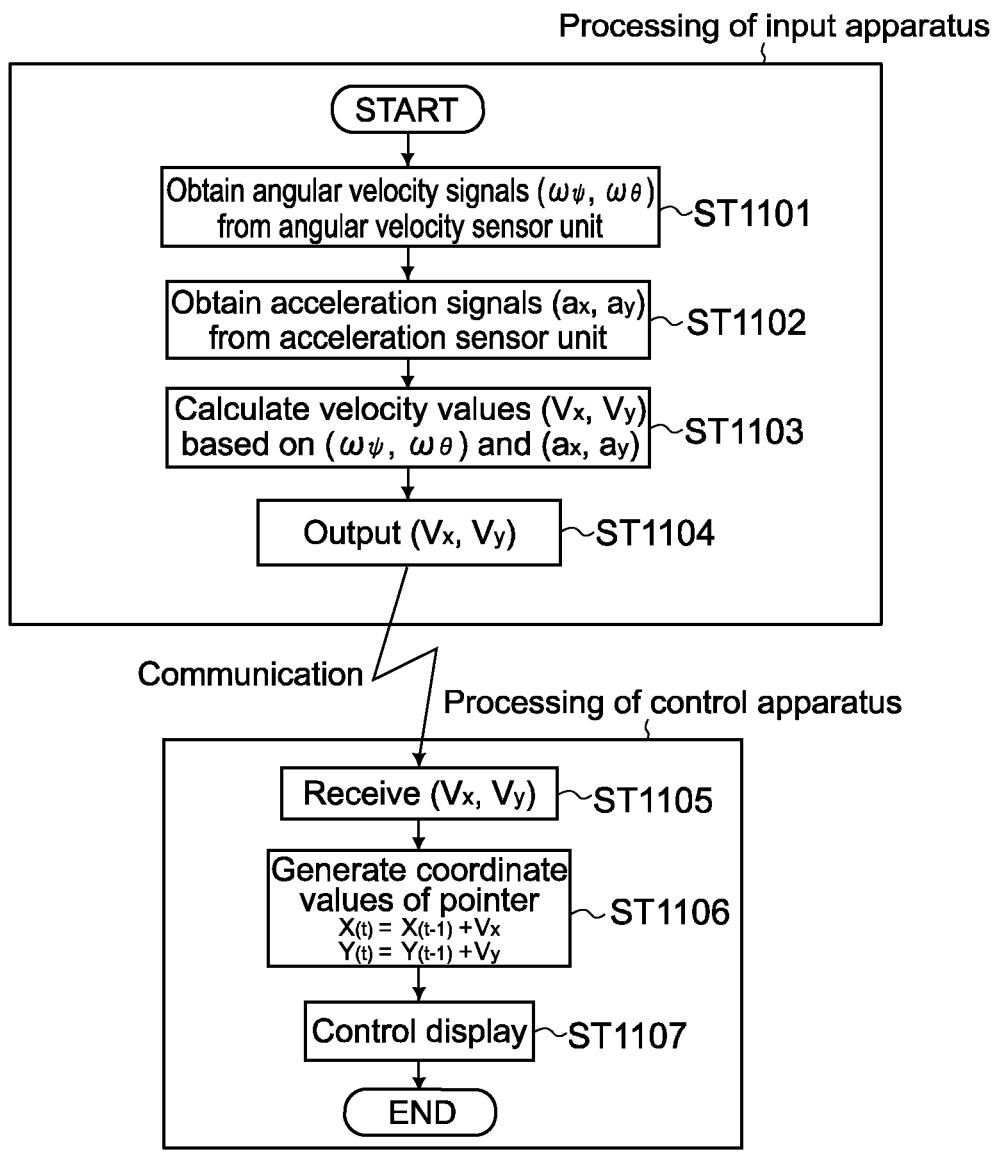
FIG. 35 A flowchart showing an operation of the control system when the operation section is not operated.
Figure 36:
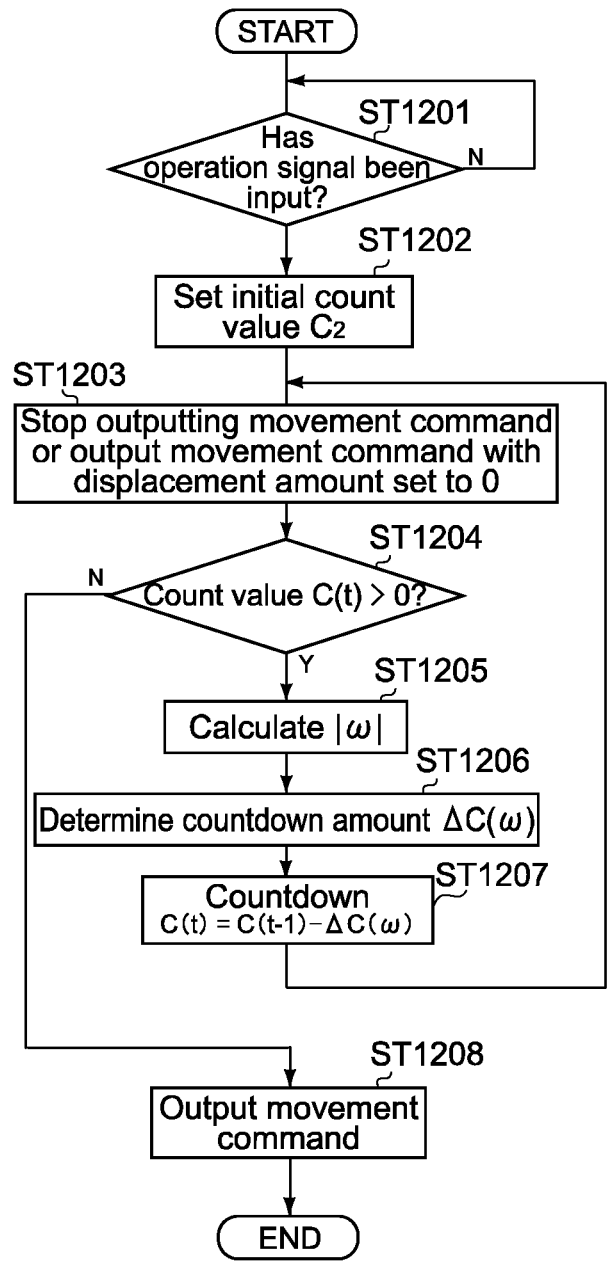
FIG. 36 A flowchart showing an operation of the input apparatus when the operation section is operated.

FIG. 35 is a diagram showing an operation of the control system 100 according to this embodiment, and FIG. 36 is a diagram showing an operation of the input apparatus 1 according to this embodiment.

First, descriptions will be given on an operation of the control system 100 when the operation section 23 provided on the input apparatus 1 is not operated by the user. FIG. 35 is a flowchart showing the operation when the operation section 23 is not operated.

As shown in FIG. 35, when the power is input to the input apparatus 1 by the pressing of the power switch 28 by the user, for example, biaxial angular velocity signals are output from the angular velocity sensor unit. The first angular velocity value $\omega_\psi$ and the second angular velocity value $\omega_\theta$ obtained by the angular velocity signals are input to the MPU 19 (Step 1101).

Further, when the power of the input apparatus 1 is turned on, biaxial acceleration signals are output from the acceleration sensor unit 16. The MPU 19 is input with the first acceleration value $a_x$ and the second acceleration value $a_y$ obtained by the biaxial acceleration signals (Step 1102). The signals of the acceleration values are signals corresponding to the position (initial position) of the input apparatus 1 at the point the power is turned on. Typically, the MPU 19 carries out Steps 1101 and 1102 in sync for each of predetermined clock cycles. However, the MPU 19 may execute Step 1102 after executing Step 1101, or execute Step 1101 after executing Step 1102. The same holds true in FIGS. 10, 14, 40, 42 (e.g., Steps 1701 and 1702), and 43 (e.g., Steps 1801 and 1802).

Based on the acceleration values ($a_x$, $a_y$) and the angular velocity values ($\omega_\psi$, $\omega_\theta$), the MPU 19 calculates the velocity values (first velocity value $V_x$ and second velocity value $V_y$) by a predetermined calculation (Step 1103). At this point, at least the sensor unit 17, or the MPU 19 and the sensor unit 17 function(s) as a movement signal output means for outputting a movement signal corresponding to the movement of the casing 10.

As described above, in this embodiment, instead of calculating the velocity values ($V_x$, $V_y$) by simply integrating the acceleration values ($a_x$, $a_y$), the velocity values ($V_x$, $V_y$) are calculated based on the acceleration values ($a_x$, $a_y$) and the angular velocity values ($\omega_\psi$, $\omega_\theta$). Accordingly, an operational feeling of the input apparatus 1 that matches an intuitional operation of the user can be obtained, and the movement of the pointer 2 on the screen 3 also matches the movement of the input apparatus 1 accurately. However, the velocity values ($V_x$, $V_y$) do not always have to be obtained based on the acceleration values ($a_x$, $a_y$) and the angular velocity values ($\omega_\psi$, $\omega_\theta$), and the velocity values ($V_x$, $V_y$) may be calculated by simply integrating the acceleration values ($a_x$, $a_y$).

The MPU 19 transmits the information on the calculated velocity values ($V_x$, $V_y$) to the control apparatus 40 as a movement command via the transmitting device 21 and the antenna 22 (Step 1104).

The MPU 35 of the control apparatus 40 receives the information on the velocity values ($V_x$, $V_y$) via the antenna 39 and the receiver device 38 (Step 1105). In this case, the input apparatus 1 transmits the velocity values ($V_x$, $V_y$) every predetermined clocks, that is, every time a predetermined time passes, and the control apparatus 40 receives the velocity values every predetermined number of clocks.

Upon receiving the velocity values, the MPU 35 of the control apparatus 40 adds the velocity values to the coordinate values by Equations (1) and (2) above to generate new coordinate values (X(t), Y(t)) (Step 1106). By generating the coordinate values, the display control section 42 controls display so that the pointer 2 moves on the screen 3 (Step 11107).

Next, an operation of the input apparatus 1 carried out when the operation section 23 is operated by the user will be described. FIG. 36 is a flowchart showing the operation of the input apparatus 1 carried out when the operation section 23 is operated. In the figure, a case where the user operates the button 11 out of the operation section 23 will be described.

In the state where the button 11 is not pressed by the user and the operation signal is thus not input (NO in Step 1201), the MPU 19 is outputting the movement command (signal containing information on velocity values). Therefore, when the user holds the input apparatus 1 and moves the input apparatus 1, the pointer 2 moves on the screen 3 in accordance with that movement. Here, the velocity values are typically calculated by the method shown in FIG. 35. Accordingly, the movement of the pointer 2 on the screen 3 can be made a natural movement that matches the intuitional operation of the user.

When the button 11 is pressed by the user, an operation signal is output from a switch (not shown), for example, and input to the MPU 19 (YES in Step 1201). Upon input of the operation signal, the MPU 19 sets the initial count value $C_2$ to the counter (Step 1202).

Upon setting the initial count value $C_2$, the MPU 19 stops outputting the movement command or outputs the movement command with the displacement amount set to 0 (Step 1203). In other words, when the input of the operation signal is started, the MPU 19 controls the output of the movement command so that the pointer 2 is stopped on the screen 3 (output control means).

Upon stopping the output of the movement command, the MPU 19 judges whether the count value C(t) is larger than 0 (Step 1204). When the count value C(t) is larger than 0, the MPU 19 obtains the biaxial angular velocity values ($\omega_\psi$, $\omega_\theta$) output from the angular velocity sensor unit 15. The MPU 19 calculates a square mean of the biaxial angular velocity values ($\omega_\psi$, $\omega_\theta$) to obtain the absolute value of the angular velocity values $|\omega|$ (Step 1205). Alternatively, in Step 1205, a larger one of the absolute value $|\omega_\psi|$ of the first angular velocity value $\omega_\psi$ and the absolute value $|\omega_\theta|$ of the second angular velocity value $\omega_\theta$ may be used as a representative value instead of the absolute value of the angular velocity values $|\omega|$.

Upon calculating the absolute value of the angular velocity values $|\omega|$, the MPU 19 determines the countdown amount $\Delta C(\omega)$ corresponding to the magnitude of the absolute value of the angular velocity values $|\omega|$ (Step 1206). The countdown amount $\Delta C(\omega)$ is a value that increases as the absolute value of the angular velocity values $|\omega|$ increases. As a relationship between the countdown amount $\Delta C(\omega)$ and the absolute value of the angular velocity values $|\omega|$, there are, for example, the relationships shown in FIG. 28 above.

Upon determining the countdown amount $\Delta C(\omega)$, the MPU 19 subtracts the countdown amount $\Delta C(\omega)$ from the previous count value C(t−1) and calculates a new count value C(t), to thus execute the countdown (Step 1207). Upon calculating the new count value C(t), the MPU 19 maintains the stopped state of the movement command (Step 1203) and judges whether the new count value C(t) is larger than 0 (Step 1204). In other words, the MPU 19 repeats the processes of Steps 1203 to 1207 until the count value C(t) becomes 0 or less (time control means).

When the count value C(t) has become 0 or less (NO in Step 1204), the MPU 19 starts outputting the movement command (Step 1208). In other words, the movement of the pointer on the screen 3 is regulated from the start of the input of the operation signal until the count value C(t) becomes a value of 0 or less.

When the button 11 is pressed again and the input of the operation signal is started again before the count value C(t) becomes 0 or less (before elapse of post-input regulation time) in Step 1204, the MPU 19 may return to Step 1201 and execute the processes of Step 1201 and after.

By the processing shown in FIG. 36, the movement of the pointer is regulated during the post-input regulation time since the start of the pressing of the button 11 by the user. Accordingly, the pointer 2 can be prevented from, when the user operates the button 11, moving on the screen 3 due to the movement of the input apparatus 1 by a force applied to the input apparatus 1. Furthermore, in this embodiment, the post-input regulation time is controlled such that the post-input regulation time is shortened as the absolute value of the angular velocity values $|\omega|$ increases. Accordingly, when the user swings the input apparatus 1 immediately after clicking the button 11 so as to start moving the pointer 2, for example, the movement of the pointer 2 is started readily. Thus, the user can shift to the pointing operation smoothly after the operation to the button 11, thus improving an operational feeling.

In the descriptions of this embodiment, the case where the button 11 of the input apparatus 1 is pressed has been described. However, the present invention is not limited thereto, and the processing shown in FIG. 36 may be executed when at least one of the buttons 12 and 13, various operation buttons 29, and the power switch 28 provided to the input apparatus 1 is pressed. The same holds true also for other embodiments.

The processing shown in FIGS. 35 and 36 may be executed mainly by the control apparatus 40. In this case, the control apparatus 40 receives via the antenna 39 the information on the angular velocity values ($\omega_\psi$, $\omega_\theta$), the information on the acceleration values ($a_x$, $a_y$), and the operation signal that have been output from the input apparatus 1. The MPU 35 of the control apparatus 40 calculates the velocity values based on the angular velocity values ($\omega_\psi$, $\omega_\theta$) and the acceleration values ($a_x$, $a_y$). The MPU 35 generates the first control signal corresponding to the velocity values, and the display control section 42 controls display so that the pointer 2 moves on the screen at a velocity corresponding to the velocity values. Upon receiving the operation signal, the MPU 35 of the control apparatus 40 generates the second control signal corresponding to the operation signal and executes various types of processing.

When judged that the input of the operation signal has been canceled, the MPU 35 executes the processes of Steps 1202 to 1207 shown in FIG. 36, and variably controls the post-input regulation time.

Next, still another embodiment regarding the operation carried out when the operation section 23 is operated will be described.

Figure 37:
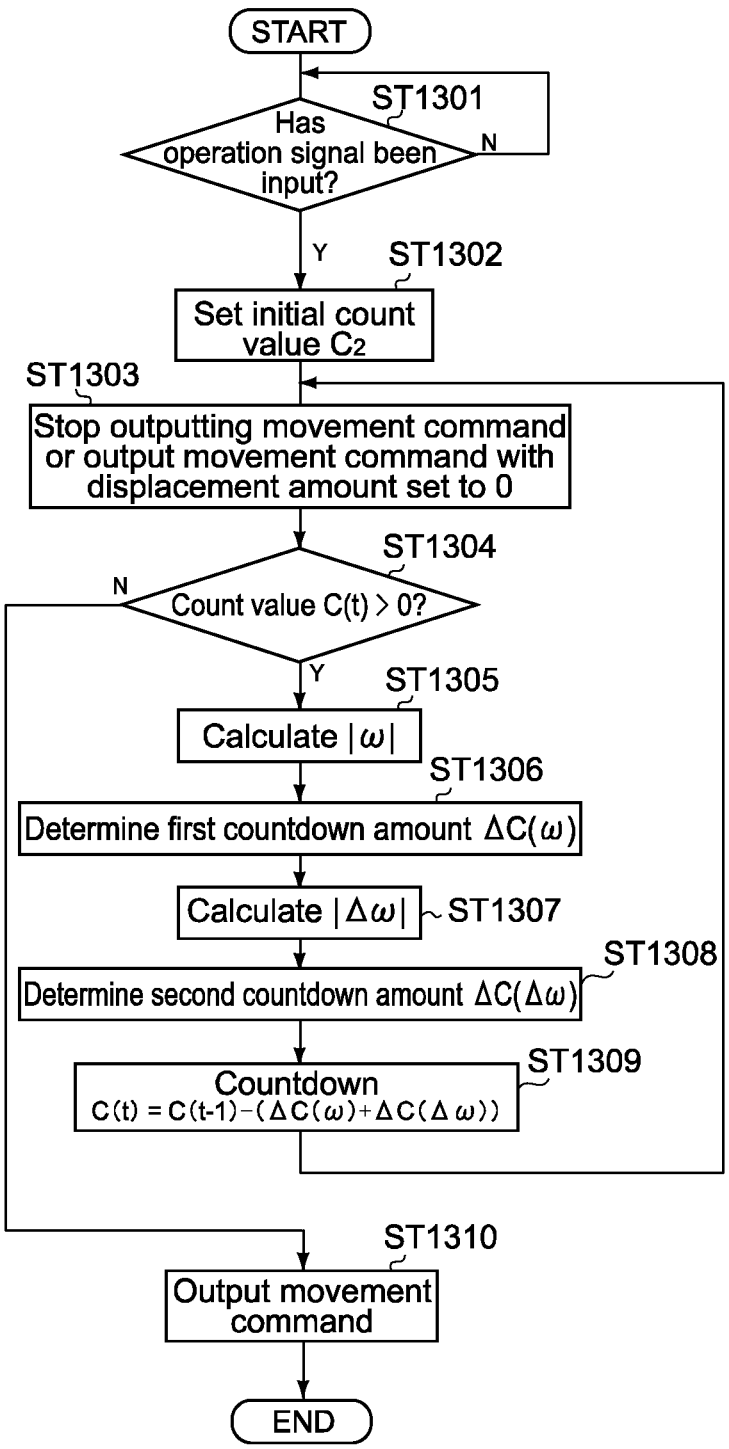
FIG. 37 A flowchart showing an operation of an input apparatus according to still another embodiment.

FIG. 37 is a flowchart showing an operation of the input apparatus according to this embodiment. The input apparatus 1 according to this embodiment is different from that of the embodiment shown in FIG. 36 above in the point that the post-input regulation time is controlled variably in relation to not only the angular velocity values but also the angular acceleration values. Therefore, that point will mainly be described.

As shown in FIG. 37, in Steps 1301 to 1306, processes similar to those of Steps 1201 to 1206 of FIG. 36 are executed. Upon determining the first countdown amount $\Delta C(\omega)$ corresponding to the absolute value of the angular velocity values $|\omega|$ (Step 1306), the MPU 19 calculates the biaxial angular acceleration values ($\Delta \omega_\psi$, $\Delta \omega_\theta$) by respectively deriving the biaxial angular velocity values ($\omega_\theta$, $\omega_\theta$). The MPU 19 calculates a square mean of the biaxial angular acceleration values ($\Delta \omega_\psi$, $\Delta \omega_\theta$) to obtain the absolute value of the angular acceleration values $|\Delta \omega|$ (Step 1307). Alternatively, in Step 1307, a larger one of the absolute value of the first angular acceleration value $|\Delta \omega_\psi|$ and the absolute value of the second angular acceleration value $|\Delta \omega_\theta|$ may be used as a representative value instead of the absolute value of the angular acceleration values $|\Delta \omega|$.

Upon calculating the absolute value of the angular acceleration values $|\Delta \omega|$, the MPU 19 determines the second countdown amount $\Delta C(\Delta \omega)$ corresponding to the magnitude of the absolute value of the angular acceleration values $|\Delta \omega|$ (Step 1308). The second countdown amount $\Delta C(\Delta \omega)$ is a value that increases as the absolute value of the angular acceleration values $|\Delta \omega|$ increases. As a relationship between the absolute value of the angular accelerations $|\Delta \omega|$ and the second countdown amount $\Delta C(\Delta \omega)$, there are, for example, the relationships shown in FIG. 28 above.

Upon determining the second countdown amount $\Delta C(\Delta \omega)$, the MPU 19 subtracts the first countdown amount $\Delta C(\omega)$ and the second countdown amount $\Delta C(\Delta \omega)$ from the previous count value C(t-1), to thus calculate a new count value C(t) (Step 1309). Hereinafter, the MPU 19 repeats the processes of Steps 1303 to 1309 until the count value C(t) becomes 0 or less. Then, when the count value C(t) has become 0 or less (NO in Step 1304), the MPU 19 starts outputting the movement command (1310).

By the processing shown in FIG. 37, because the post-input regulation time is controlled variably in accordance with not only the angular velocity values but also the angular acceleration values, the post-input regulation time can be shortened appropriately.

Although the first countdown amount $\Delta C(\omega)$ and the second countdown amount $\Delta C(\Delta \omega)$ are determined individually in this embodiment, it is also possible for one countdown amount $\Delta C(\omega, \Delta \omega)$ corresponding to the angular velocity values and the angular acceleration values to be determined by a lookup table, for example.

In this embodiment, descriptions have been given on the case where the post-input regulation time is controlled variably in accordance with the angular velocity values and the angular acceleration values. However, the present invention is not limited thereto, and the post-input regulation time may be controlled variably in accordance with the velocity values and the acceleration values. Alternatively, the post-input regulation time may be controlled variably by a combination of two among the angular velocity values, the angular acceleration values, the velocity values, the acceleration values, and other values corresponding to the movement of the casing 10.

Although descriptions have been given on the case where the post-input regulation time is controlled variably in accordance with the signals of two different physical amounts in this embodiment, the post-input regulation time may also be controlled variably in accordance with signals of three or more different physical amounts.

Next, still another embodiment regarding the operation carried out when the operation section 23 is operated will be described.

For example, there are cases where the user who is not good at performing delicate operations on the pointer causes a large apparatus shake, in the case of which the user wishes for the pointer to be stopped for a longer time period after the pressing of the button 11. Thus, in this embodiment, the post-input regulation time is controlled so that the post-input regulation time is prolonged as a signal within a frequency range that corresponds to the apparatus shake out of the signals of the angular velocity values increases. Therefore, that point will mainly be described.

Figure 38:
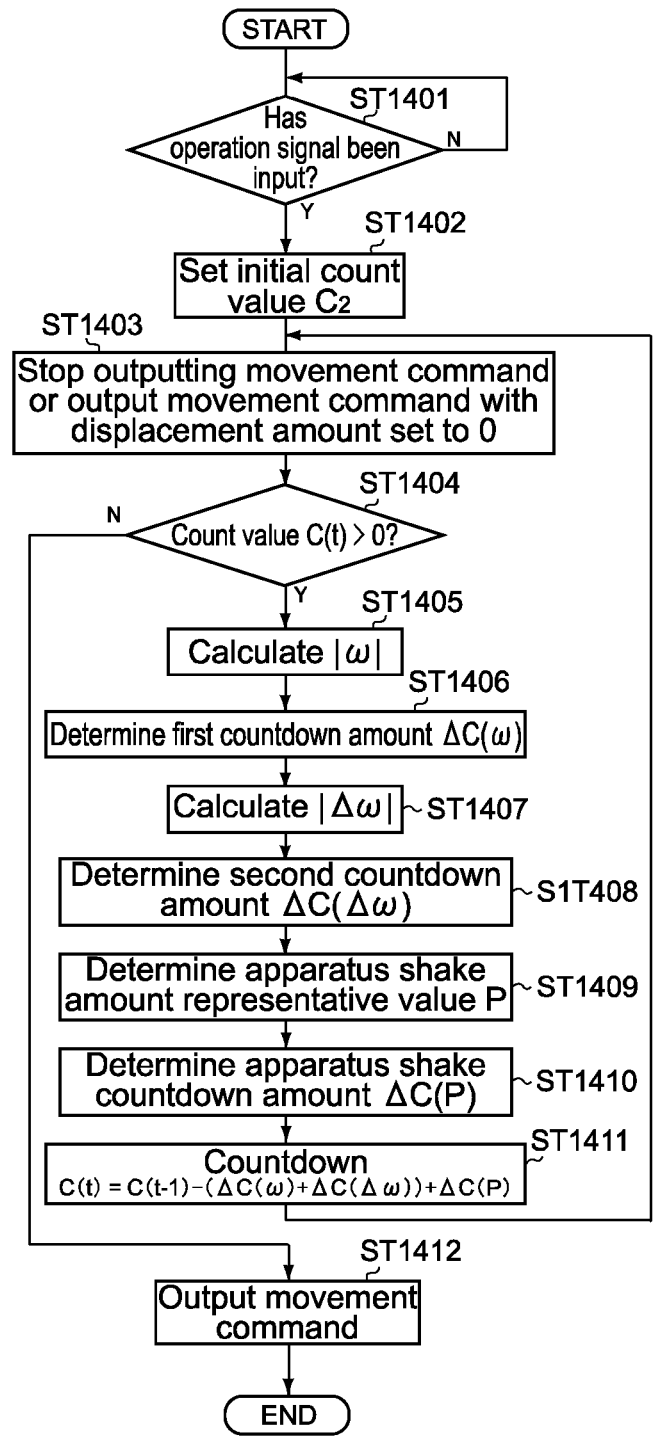
FIG. 38 A flowchart showing an operation of an input apparatus according to still another embodiment.

FIG. 38 is a flowchart showing an operation of the input apparatus 1 according to this embodiment.

As shown in FIG. 38, in Steps 1401 to 1408, processes similar to those of Steps 1301 to 1308 of FIG. 37 are executed. Upon calculating the second countdown amount $\Delta C(\Delta \omega)$ corresponding to the absolute value of the angular acceleration values $|\Delta \omega|$ (Step 1408), the MPU 19 frequency-analyzes the biaxial angular velocity values ($\omega_\psi$, $\omega_\theta$). The MPU 19 detects a peak value within a frequency range corresponding to an apparatus shake (e.g., 1 to 20 Hz) out of the signals of the angular velocity values ($\omega_\psi$, $\omega_\theta$). The MPU 19 calculates a mean value of the peak values of the biaxial angular velocity values, and determines an apparatus shake amount representative value P (Step 1409). Alternatively, a larger one of the two peak values may be used as the apparatus shake amount representative value P.

Alternatively, in Step 1409, the apparatus shake amount representative value P may be determined using the absolute value of the angular velocity values $|\omega|$ obtained after passage through a band-pass filter or a highpass filter instead of the frequency analysis.

Upon determining the apparatus shake amount representative value P, the MPU 19 determines an apparatus shake countdown amount $\Delta C(P)$ corresponding to the apparatus shake amount representative value P (Step 1410). The apparatus shake countdown amount $\Delta C(P)$ is a value that increases as the apparatus shake amount representative value P increases. The apparatus shake countdown amount $\Delta C(P)$ may increase by a linear function, multi-degree function, or exponent function along with the increase of the apparatus shake amount representative value P. Alternatively, the apparatus shake countdown amount $\Delta C(P)$ may increase by two steps or multiple steps along with the increase of the apparatus shake amount representative value P.

Upon determining the apparatus shake countdown amount $\Delta C(P)$, the MPU 19 subtracts the first countdown amount $\Delta C(\omega)$ and the second countdown amount $\Delta C(\Delta \omega)$ from the previous count value C(t-1) and adds the apparatus shake countdown amount $\Delta C(P)$, to thus calculate a new count value C(t) (Step 1411). Hereinafter, the MPU 19 repeats the processes of Steps 1403 to 1411 until the count value C(t) becomes 0 or less. Then, when the count value C(t) has become 0 or less (NO in Step 1404), the MPU 19 starts outputting the movement command (Step 1412).

By the processing shown in FIG. 38, the post-input regulation time is controlled such that the post-input regulation time is prolonged as the apparatus shake becomes larger. Accordingly, even the user who causes a large apparatus shake can easily perform the pointing operation, thus improving an operational feeling.

A limitation shown in Equation (3) above may be imposed on the apparatus shake countdown amount $\Delta C(P)$ determined in Step 1410.

In other words, a limitation may be imposed on the apparatus shake countdown amount ΔC(P) so that even at maximum, a value smaller by 1 than a sum of the first countdown amount and the second countdown amount is not exceeded. Accordingly, the post-input regulation time can be prevented from being continued endlessly without any progress in the countdown shown in Step 1411, in the case where the apparatus shake is large.

Although the first countdown amount ΔC(ω), the second countdown amount ΔC(Δω), and the apparatus shake countdown amount ΔC(P) are determined individually in this embodiment, one countdown amount ΔC(ω, Δω, P) may be determined by a lookup table, for example.

In this embodiment, descriptions have been given on the case where the count of the post-input regulation time is executed using signals of two different physical amounts (angular velocity values and angular acceleration values) and a signal of the apparatus shake amount. However, the present invention is not limited thereto, and the count of the post-input regulation time may be executed using signals of one physical amount (e.g., angular velocity values) and the apparatus shake amount signal. Alternatively, it is also possible to execute the count of the post-input regulation time using only the apparatus shake amount signal.

Next, still another embodiment regarding the operation carried out when the operation section 23 is operated will be described.

In the embodiments shown in FIGS. 36 to 38, descriptions have been given on the case where the movement of the pointer 2 is regulated during the post-input regulation time since the start of the pressing of the button 11 by the user. On the other hand, in this embodiment, even when the user releases the pressing of the button 11, the movement of the pointer 2 is regulated during a predetermined time period since the release of the pressing. Therefore, that point will mainly be described. It should be noted that in this embodiment, the post-cancel regulation time is fixed.

Figure 39:
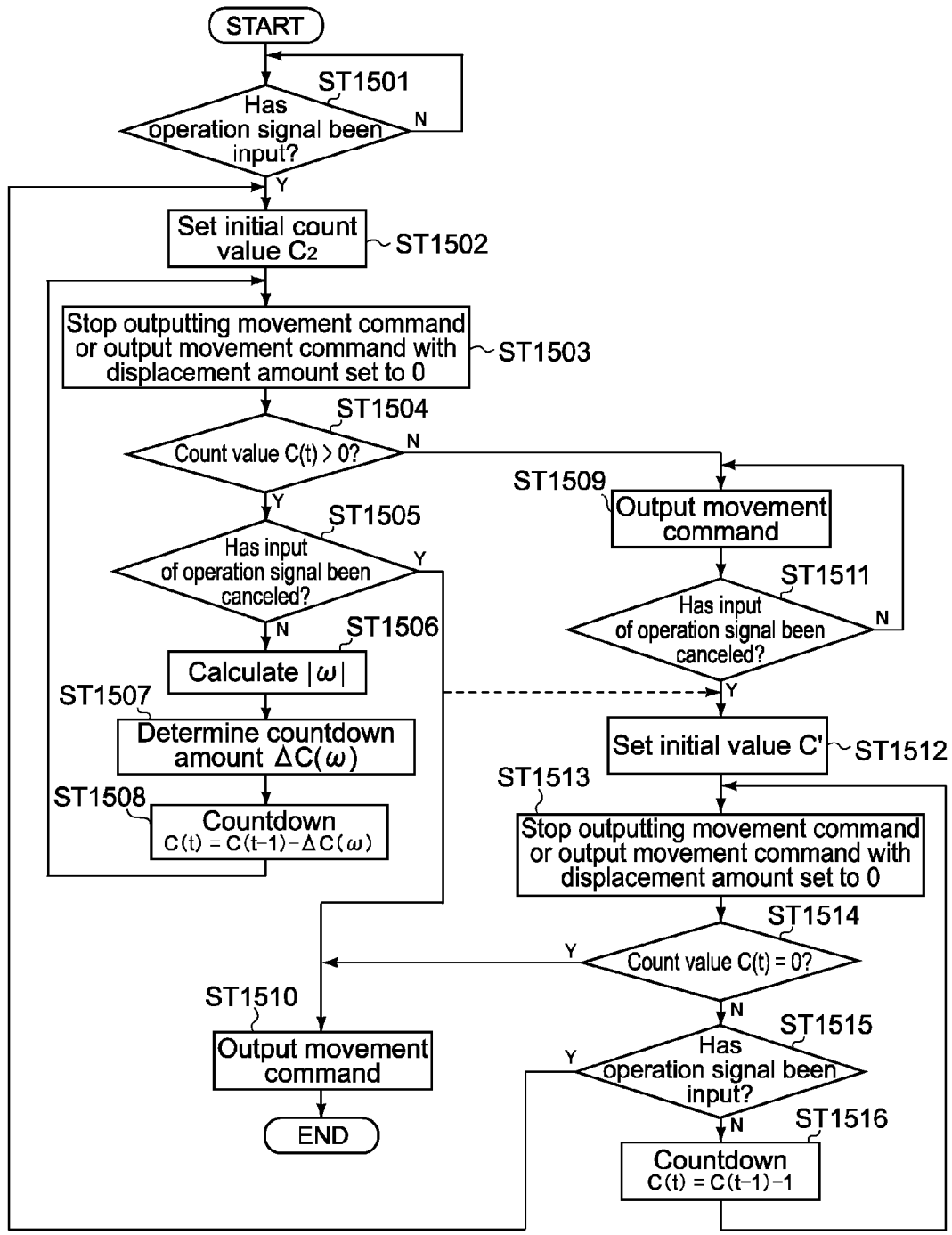
FIG. 39 A flowchart showing an operation of an input apparatus according to still another embodiment.

FIG. 39 is a flowchart showing an operation of the input apparatus according to this embodiment.

When the button 11 is pressed by the user, an operation signal is input to the MPU 19 (YES in Step 1501). Upon input of the operation signal, the MPU 19 sets the initial count value $C_2$ to the counter (Step 1502). The countdown of the count value C(t) is started from the initial count value $C_2$, and the time when the count value C(t) becomes 0 or less corresponds to the post-input regulation time.

Upon setting the initial count value $C_2$, the MPU 19 stops outputting the movement command or starts outputting the movement command with the displacement amount set to 0 (Step 1503). Accordingly, the pointer 2 is prevented from moving on the screen 3 due to the movement of the input apparatus 1 at the start of the pressing of the button 11.

Next, the MPU 19 judges whether the count value C(t) is larger than 0 (Step 1504), and when larger than 0, judges whether the input of the operation signal has been canceled (Step 1505). When the input of the operation signal is not canceled, the countdown amount ΔC(ω) corresponding to the magnitude of the absolute value of the angular velocity values |ω| is determined (see FIG. 28), and the countdown is executed (Steps 1506 to 1508). Hereinafter, the MPU 19 repeats the processes of Steps 1503 to 1508 until the count value C(t) becomes 0 or less. Accordingly, the post-input regulation time is controlled variably in accordance with the magnitude of the absolute value of the angular velocity values |ω|.

When the input of the operation signal is not canceled (see NO in Step 1505) and the count value C(t) becomes 0 or less (NO in Step 1504), the output of the movement command is started (Step 1509). In other words, the output of the movement command is started when the post-input regulation time has elapsed since the start of the pressing of the button 11, without the pressing being released. In this case, a drag operation is displayed on the screen 3, for example, and the pointer 2 and the icon 4 move on the screen 3.

Here, for realizing the drag operation, the input apparatus 1 only needs to output a pressing code while the button 11 is pressed, for example. The MPU 35 of the control apparatus 40 displays the drag operation on the screen 3 when the pressing code and the movement command are input at the same time.

Specifically, in this embodiment, the post-input regulation time is a time period during which the pointer 2 is stopped on the screen 3 since the start of the pressing of the button 11, and a time period from the start of the pressing of the button 11 to the start of the drag. The post-input regulation time is controlled so as to be shortened as the absolute value of the angular velocity values increases. Accordingly, when the user swings the input apparatus 1 while maintaining the pressing of the button 11, for example, the drag operation can readily be started on the screen 3. Accordingly, an operational feeling of the user in the pointing operation can be improved.

Upon outputting the movement command, the MPU 19 of the input apparatus 1 judges whether the input of the operation signal has been canceled (Step 1511). When the pressing of the button 11 is released by the user and the input of the operation signal is thus canceled, the MPU 19 sets an initial value C' to the counter (Step 1512). The countdown of the count value C(t) is started from the initial value C', and the time when the count value C(t) becomes 0 or less corresponds to the post-cancel regulation time. The post-cancel regulation time (fixed) typically is 0.2 sec, but may be 0.2 sec or less or 0.2 sec or more.

Upon setting the initial value C' to the counter, the MPU 19 stops outputting the movement command or starts outputting the movement command with the displacement amount set to 0 (Step 1513). It should be noted that when the input of the operation signal is canceled in Step 1511, the MPU 19 stops outputting the pressing code.

Upon cancel of the input of the pressing code and the movement command from the input apparatus 1, the MPU 35 of the control apparatus 40 ends the display of the drag operation on the screen 3 and executes display of drop.

Upon stopping the output of the movement command, the MPU 19 of the input apparatus 1 judges whether the count value C(t) is 0 (Step 1514). When the count value C(t) is not 0, the MPU 19 judges whether an operation signal has been input (Step 1515). When the operation signal is not input, the MPU 19 subtracts 1 from the previous count value C(t−1) and calculates a new count value C(t), to thus execute countdown (Step 1516). Hereinafter, the MPU 19 repeats the processes of Steps 1513 to 1516 until the count value C(t) becomes 0, and maintains the state where the output of the movement command is stopped.

When the count value C(t) has reached 0 (YES in Step 1514), the MPU 19 starts outputting the movement command. In other words, the movement of the pointer on the screen 3 is regulated during a time period from when the user has released the pressing of the button 11 until the count value C(t) reaches 0 (post-cancel regulation time). Accordingly, it is possible to prevent the pointer 2 and the icon from moving on the screen 3 due to the movement of the input apparatus 1 when the user releases the pressing of the button 11, to thus cause a deviation in a drop position.

When the button 11 is pressed by the user and the input of the operation signal is started within the post-cancel regulation time (YES in Step 1515), the process returns to Step 1502, and the movement of the pointer is regulated during the post-input regulation time since the input of the operation signal.

Here, when the input of the operation signal is canceled before the elapse of the post-input regulation time since the input of the operation signal in Step 1505 (YES in Step 1505), the MPU 19 starts outputting the movement command (Step 1510).

Alternatively, when the input of the operation signal is canceled before the elapse of the post-input regulation time since the input of the operation signal (YES in Step 1505), the MPU 19 may execute the processes of Step 1512 and after as indicated by the broken line. In this case, the MPU 19 resets the count value C(t), sets a new initial value C' to the counter, and starts the countdown of the post-cancel regulation time. Accordingly, for example, the pointer 2 is prevented from moving on the screen 3 due to the movement of the input apparatus 1 at the release of the pressing of the button 11 clicked by the user. Therefore, the pointer 2 is prevented from moving from the icon 4 before the command is issued.

It is also possible to execute the processes of Steps 1305 to 1309 shown in FIG. 37 in Steps 1506 to 1508. Accordingly, the post-input regulation time can be shortened appropriately. Alternatively, it is also possible to execute the processes of Steps 1405 to 1411 shown in FIG. 38 in Steps 1506 to 1508. Accordingly, even the user who causes a large apparatus shake can easily perform a pointing operation, for example.

Next, a calculation method of the velocity values ($V_x$, $V_y$) calculated in Step 1103 of FIG. 35 will be described.

Figure 40:
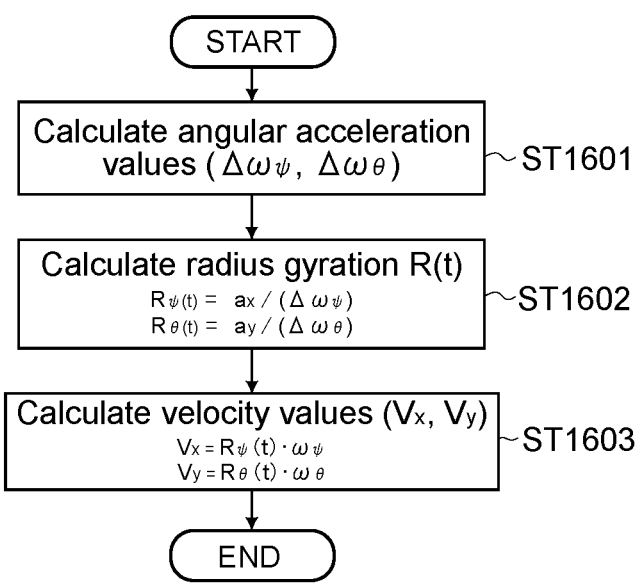
FIG. 40 A flowchart showing a velocity value calculation method.
Figure 41:
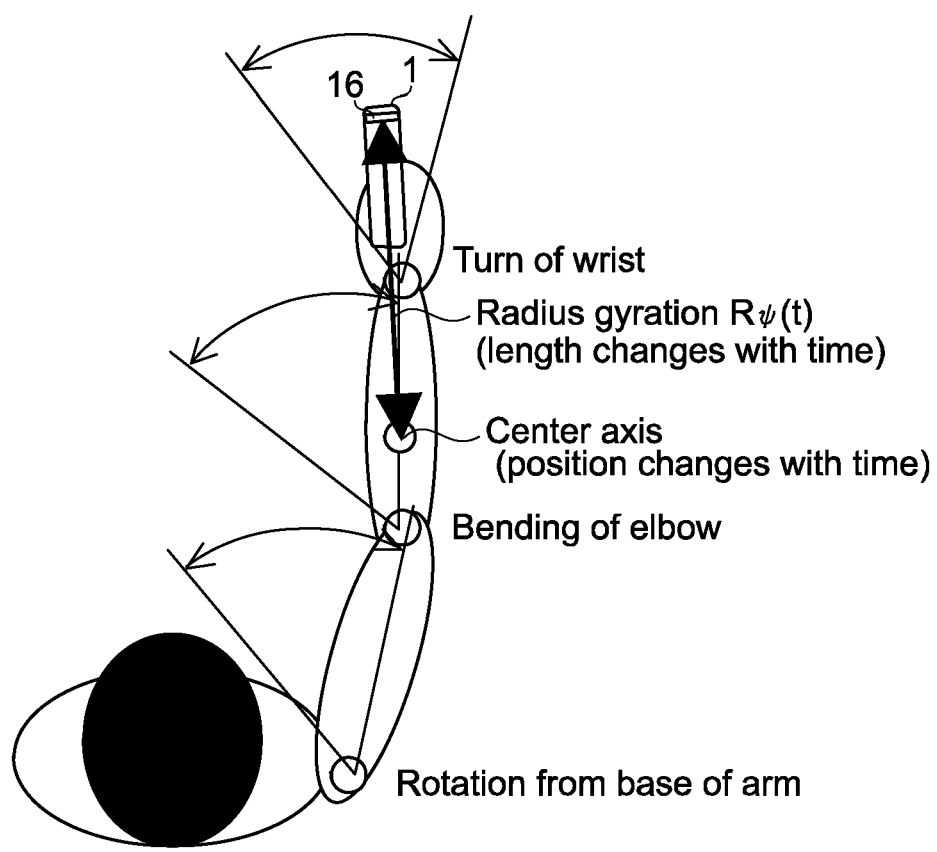
FIG. 41 A diagram for illustrating a basic idea of the velocity value calculation method.

FIG. 40 is a flowchart showing an operation of the input apparatus 1. FIG. 41 is a diagram for illustrating a basic idea of the velocity value calculation method. It should be noted that in descriptions below, the first angular velocity value $\omega_\psi$ and the second angular velocity value $\omega_\theta$ may be referred to as angular velocity value $\omega_\psi$ about the Y axis and angular velocity value $\omega_\theta$ about the X axis, respectively.

FIG. 41 is a top view of the user operating the input apparatus 1 by swinging it in, for example, a lateral direction (yaw direction). As shown in FIG. 41, when the user operates the input apparatus 1 naturally, an operation is made by using at least one of a turn of a wrist, a bending of an elbow, and a rotation from a base of an arm. Therefore, a comparison between the movement of the input apparatus 1 with the rotations of a wrist, elbow, and base of an arm shows that there exist relationships of 1 and 2 below.

1. The angular velocity value $\omega_\psi$ about the Y axis of a portion of the input apparatus 1 at which the acceleration sensor unit 16 is disposed (hereinafter, tip end portion) is a combined value of an angular velocity obtained by the turn of a wrist, an angular velocity obtained by the bending of an elbow, and an angular velocity obtained by the rotation from a base of an arm.

2. The velocity value $V_x$ at the tip end portion of the input apparatus 1 is a combined value obtained by respectively multiplying the angular velocities of the wrist, elbow, and base of an arm by a distance between the wrist and the tip end portion, a distance between the elbow and the tip end portion, and a distance between the base on an arm and the tip end portion.

Here, regarding a rotational movement of the input apparatus 1 in a minute time, the input apparatus 1 can be considered to be rotating about a center axis parallel to the Y axis and whose position changes with time. Assuming that a distance between the center axis whose position changes with time and the tip end portion of the input apparatus 1 is a radius gyration $R_\psi(t)$ about the Y axis, the relationship between the velocity value $V_x$ and the angular velocity value $\omega_\psi$ at the tip end portion of the input apparatus 1 can be expressed by Equation (8) below. In other words, the velocity value $V_x$ becomes a value obtained by multiplying the angular velocity value $\omega_\psi$ about the Y axis by the distance $R_\psi(t)$ between the center axis and the tip end portion. It should be noted that in this embodiment, the acceleration sensor unit 16 and the angular velocity sensor unit 15 are provided integrally on the circuit board 25 of the sensor unit 17. Therefore, the radius gyration R(t) becomes a distance from the center axis to the sensor unit 17. However, when the acceleration sensor unit 16 and the angular velocity sensor unit 15 are provided apart from each other inside the casing 10, the distance from the center axis to the acceleration sensor unit 16 becomes the radius gyration R(t) as described above.

$$V_x = R_\psi(t) * \omega_\psi \tag{8}$$

As shown in Equation (8), the relationship between the velocity value and the angular velocity value at the tip end portion of the input apparatus 1 is a proportional relationship with R(t) as a proportional constant, that is, a correlation.

Equation (4) above is modified to obtain Equation (9).

$$R_\psi(t) = V_x / \omega_\psi \tag{9}$$

The right-hand side of Equation (9) is a velocity dimension. Even when the velocity value and the angular velocity value represented on the right-hand side of Equation (9) are derived to obtain a dimension of the acceleration or acceleration time change rate, the correlation is not lost. Similarly, even when the velocity value and the angular velocity value are integrated to obtain a displacement dimension, the correlation is not lost.

Therefore, with the velocity and the angular velocity represented on the right-hand side of Equation (9) as a dimension of the displacement, acceleration, and acceleration time change rate, Equations (10), (11), and (12) below can be obtained.

$$R_\psi(t) = x/\psi \tag{10}$$

$$R_\psi(t) = a_x / \Delta \omega_\psi \tag{11}$$

$$R_\psi(t) = \Delta a_x / \Delta(\Delta \omega_\psi) \tag{12}$$

Focusing on Equation (11) out of Equations (9), (10), (11), and (12) above, for example, it can be seen that the radius gyration $R_\psi(t)$ can be obtained if the acceleration value $a_x$ and the angular acceleration value $\Delta \omega_\psi$ are known. As described above, the first acceleration sensor 161 detects the acceleration value $a_x$ in the yaw direction, and the first angular velocity sensor 151 detects the angular velocity value $\omega_\psi$ about the Y axis. Therefore, if the angular velocity value $\omega_\psi$ about the Y axis is derived and the angular acceleration value $\Delta \omega_\psi$ about the Y axis is thus calculated, the radius gyration $R_\psi(t)$ about the Y axis can be obtained.

If the radius gyration $R_\psi(t)$ about the Y axis is known, the velocity value $V_x$ of the input apparatus 1 in the X-axis direction can be obtained by multiplying the radius gyration $R_\psi(t)$ by the angular velocity value $\omega_\psi$ about the Y axis detected by the first angular velocity sensor 151 (see Equation (11)). Specifically, a rotational operation amount itself of the user is converted into a linear velocity value in the X-axis direction, thus obtaining a velocity value that matches an intuitional operation of the user. Therefore, because the movement of the pointer 2 is made a natural movement with respect to the movement of the input apparatus 1, operability of the input apparatus for the user is improved.

This velocity value calculation method can also be applied in a case where the user operates the input apparatus 1 by swinging it in the vertical direction (pitch direction).

In FIG. 40, an example where Equation (11) is used will be described. By performing a derivation operation on the angular velocity values ($\omega_\psi$, $\omega_\theta$) from the angular velocity sensor unit 15, the MPU 19 of the input apparatus 1 calculates the angular acceleration values ($\Delta\omega_\psi$, $\Delta\omega_\theta$) (Step 1601).

Using the acceleration values ($a_x$, $a_y$) from the acceleration sensor unit 16 and the angular acceleration values ($\Delta\omega_\psi$, $\Delta\omega_\theta$), the MPU 19 calculates the radius gyrations ($R_\psi(t)$, $R_\theta(t)$) about the Y axis and the X axis using Equations (11) and (13) (Step 1602).

$$R_\psi(t)=a_x/\Delta\omega_\psi \tag{11}$$

$$R_\theta(t)=a_y/\Delta\omega_\theta \tag{13}$$

After the radius gyrations are calculated, the velocity values ($V_x$, $V_y$) are calculated using Equations (8) and (14) (Step 1603).

$$V_x=R_\psi(t)*\omega_\psi \tag{8}$$

$$V_y=R_\theta(t)*\omega_\theta \tag{14}$$

As described above, the rotational operation amounts themselves of the input apparatus 1 by the user are converted into the linear velocity values in the X- and Y-axis directions, resulting in the velocity values that match the intuitional operation of the user.

Further, by using the acceleration values ($a_x$, $a_y$) detected by the acceleration sensor unit 16 as they are, the calculation amount can be reduced, and power consumption of the input apparatus 1 can be reduced.

The MPU 19 only needs to obtain ($a_x$, $a_y$) from the acceleration sensor unit 16 every predetermined clocks, and calculate the velocity values ($V_x$, $V_y$) in sync therewith, for example. Alternatively, the MPU 19 may calculate the velocity values ($V_x$, $V_y$) once every time a plurality of acceleration values ($a_x$, $a_y$) are sampled.

Figure 42:
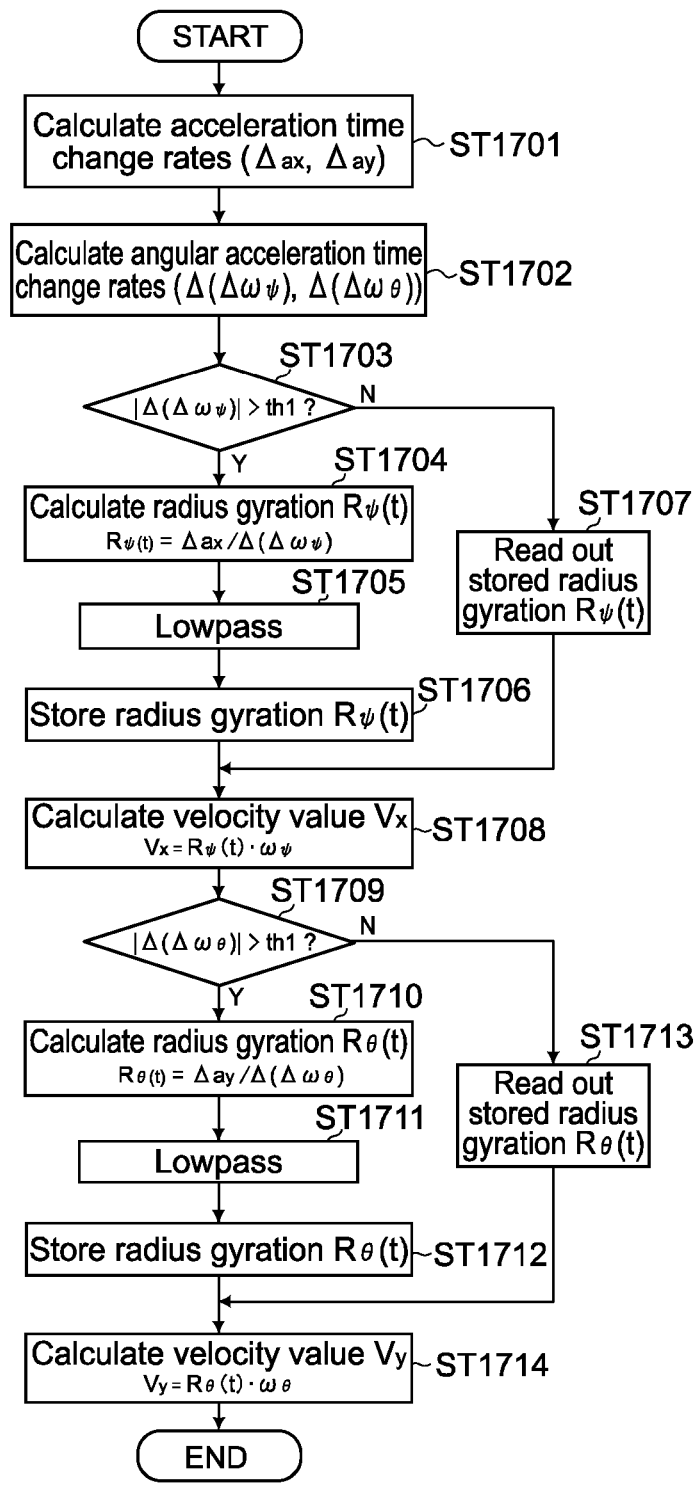
FIG. 42 A flowchart showing an operation of an input apparatus according to still another embodiment.

Next, another embodiment of calculating the velocity values ($V_x$, $V_y$) using the radius gyrations as in FIG. 40 will be described. FIG. 42 is a flowchart showing an operation of the input apparatus 1. FIG. 42 describes an example where Equation (12) above is used.

The MPU 19 of the input apparatus 1 carries out a derivation operation of the acceleration values ($a_x$, $a_y$) from the acceleration sensor unit 16. Accordingly, acceleration time change rates ($\Delta a_x$, $\Delta a_y$) are calculated (Step 1701). Similarly, the MPU 19 carries out a second order derivation operation of the angular velocity values ($\omega_\psi$, $\omega_\theta$) from the angular velocity sensor unit 15 to calculate angular acceleration time change rates ($\Delta(\Delta\omega_\psi)$, $\Delta(\Delta\omega_\theta)$) (Step 1702).

Upon calculating the angular acceleration time change rates, the MPU 19 judges whether an absolute value of the angular acceleration time change rate $|\Delta(\Delta\omega_\psi)|$ about the Y axis exceeds a threshold value th1 (Step 1703). When $|\Delta(\Delta\omega_\psi)|$ above exceeds the threshold value th1, the MPU 19 calculates the radius gyration $R_\psi(t)$ about the Y axis by dividing the acceleration time change rate $\Delta a_x$ in the X-axis direction by the angular acceleration time change rate $\Delta(\Delta\omega_\psi)$ about the Y axis (Step 1704). In other words, a ratio of the acceleration time change rate $\Delta a_x$ in the X-axis direction to the angular acceleration time change rate $\Delta(\Delta\omega_\psi)$ about the Y axis is calculated as the radius gyration $R_\psi(t)$ (Equation (12)). The threshold value th1 of $|\Delta(\Delta\omega_\psi)|$ can be set appropriately.

A signal of the radius gyration $R_\psi(t)$ is passed through a lowpass filter, for example (Step 1705). Information of the radius gyration $R_\psi(t)$ from which noises of a high-frequency range have been removed by the lowpass filter is stored in a memory (Step 1706). The memory updates the signal of the radius gyration $R_\psi(t)$ every predetermined clocks and stores it.

By multiplying the radius gyration $R_\psi(t)$ by the angular velocity value co, about the Y axis, the MPU 19 of the input apparatus 1 calculates the velocity value $V_x$ in the X-axis direction (Step 1708).

On the other hand, when $|\Delta(\Delta\omega_\psi)|$ above is equal to or smaller than the threshold th1, the MPU 19 reads out the radius gyration $R_\psi(t)$ stored in the memory (Step 1707). By multiplying the read-out radius gyration $R_\psi(t)$ by the angular velocity value $\omega_\psi$ about the Y axis, the velocity value $V_x$ in the X-axis direction is calculated (Step 1708).

There are the following two reasons for carrying out the processes of Steps 1701 to 1708.

One is to obtain the radius gyration $R_\psi(t)$ of Equation (12) above to thus obtain a linear velocity that matches the intuitional operation of the user.

Second is to remove the gravitational effect in the process of calculating the velocity values ($V_x$, $V_y$). When the input apparatus 1 is tilted in the roll direction or the pitch direction from its reference position, detection signals different from the actual movement of the input apparatus 1 are inadvertently output due to the gravitational effect. When the input apparatus 1 is tilted in the pitch direction, for example, gravity acceleration component values are output from the acceleration sensor 162. Therefore, when the effect of the gravity acceleration component values is not removed, the movement of the pointer 2 becomes a movement that does not match a sense of the user (see FIGS. 9 and 10).

In this regard, a fact that a time change rate of the gravity acceleration component value generated by the movement of the input apparatus 1 is smaller than the acceleration value time change rate that focuses on a movement inertial component (movement only) of the input apparatus 1 caused by the operation of the user is used. The time change rate of the gravity acceleration component value is a $\frac{1}{10}$ order of a time change rate of the movement inertial component value generated by the operation of the user. The value output from the acceleration sensor unit 16 is a value obtained by combining those two, that is, the signal output from the acceleration sensor unit 16 is a signal obtained by superimposing a low-frequency component value as the gravity acceleration component value on the time change rate of the movement inertial component value generated by the operation of the user.

Therefore, by carrying out the derivation operation on the acceleration values in Step 1701, the acceleration time change rates can be obtained. Accordingly, the time change rate of the gravity acceleration component value is removed. As a result, even in the case where a change in a component force of the gravity acceleration by the tilt of the input apparatus 1 is generated, the radius gyrations can be obtained appropriately, and appropriate velocity values can be calculated from the radius gyrations.

It should be noted that there are cases where, in addition to the gravity acceleration component value, the low-frequency component value contains, for example, a temperature drift of the acceleration sensor unit 16 or a DC offset value.

Moreover, because Equation (12) is used in this embodiment, in Step 1702, a second order derivation is carried out on the angular velocity value $\omega_\psi$, and noises of a high-frequency range are superimposed on the operational value of the angular velocity. Though there is no problem when $|\Delta(\Delta\omega_\psi)|$ is large, when small, S/N deteriorates. When $|\Delta(\Delta\omega_\psi)|$ with S/N deteriorated is used in the calculation of $R_\psi(t)$ in Step 1708, precision of $R_\psi(t)$ and the velocity value $V_x$ deteriorates.

In this regard, in Step 1703, the angular acceleration time change rate $\Delta(\Delta\omega_\psi)$ about the Y axis calculated in Step 1702 is used. When $|\Delta(\Delta\omega_\psi)|$ is equal to or smaller than the threshold value th1, the radius gyration $R_\psi(t)$ previously stored in the memory and that has less noise is read out (Step 1707), and the read-out radius gyration $R_\psi(t)$ is used in calculating the velocity value $V_x$ in Step 1708.

In Steps 1709 to 1714, the MPU 19 calculates the velocity value $V_y$ in the Y-axis direction in the same manner as in the processes of Steps 1703 to 1708 above. In other words, the MPU 19 judges whether the absolute value of the angular time change rate $|\Delta(\Delta\omega_\theta)|$ about the X axis exceeds the threshold th1 (Step 1709), and when exceeding the threshold value th1, calculates the radius gyration $R_\theta(t)$ about the X axis using the angular acceleration time change rate (Step 1710).

A signal of the radius gyration $R_\theta(t)$ is passed through a lowpass filter (Step 1711) and stored in the memory (Step 1712). When equal to or smaller than the threshold value th1, the radius gyration $R_\theta(t)$ stored in the memory is read out (Step 1713), and the velocity value $V_y$ in the pitchy-axis direction is calculated based on the radius gyration $R_\theta(t)$ (Step 1714).

It should be noted that although the same threshold value th1 is used in both the yaw direction and the pitch direction in this embodiment, different threshold values may be used for those directions.

In Step 1703, it is also possible to judge the angular acceleration value $(\Delta\omega_\psi)$ based on the threshold value, instead of $\Delta(\Delta\omega_\psi)$. Also in Step 1709, it is possible to judge the angular acceleration value $(\Delta\omega_\theta)$ based on the threshold value, instead of $\Delta(\Delta\omega_\theta)$. In the flowchart shown in FIG. 42, Equation (12) has been used for calculating the radius gyration R(t). However, because the angular acceleration values $(\Delta\omega_\psi, \Delta\omega_\theta)$ are calculated when using Equation (12), the angular acceleration values $(\Delta\omega_\psi, \Delta\omega_\theta)$ may be judged based on the threshold value.

Figure 43:
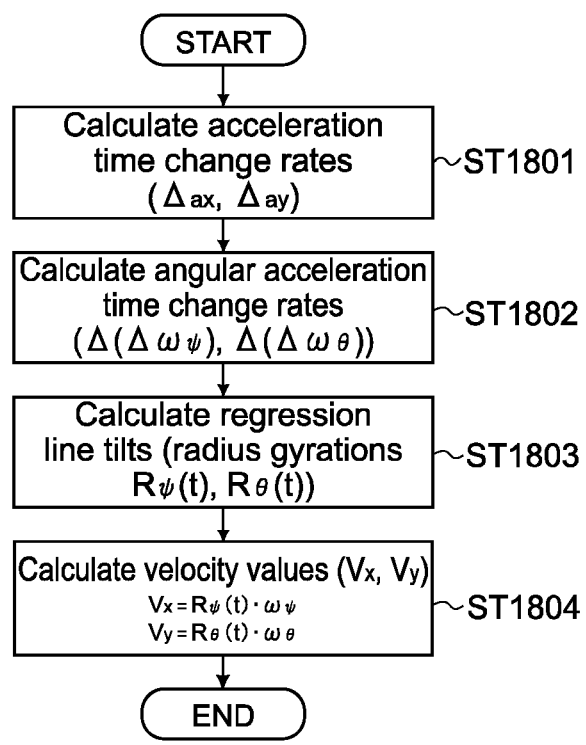
FIG. 43 A flowchart showing an operation of an input apparatus according to still another embodiment.

Next, another embodiment on the calculation method of the radius gyrations $(R_\psi(t), R_\theta(t))$ described in Step 1704 or 1710 will be described. FIG. 43 is a flowchart showing an operation of the input apparatus 1 at that time.

In this embodiment, a tilt of a regression line is used to calculate the radius gyration. As described above, the radius gyration is a ratio of the acceleration change rate to the angular acceleration change rate. For calculating the ratio of the acceleration change rate to the angular acceleration change rate, this embodiment uses the tilt of the regression line.

The MPU 19 subjects the acceleration values $(a_x, a_y)$ and the angular velocity values $(\omega_\psi, \omega_\theta)$ to a first order derivation and second order derivation, and calculates the acceleration change rates $(\Delta a_x, \Delta a_y)$ and the angular acceleration change rates $(\Delta(\Delta\omega_\psi), \Delta(\Delta\omega_\theta))$ (Steps 1801 and 1802). A history of n pairs of acceleration change rates $(\Delta a_x, \Delta a_y)$ and angular acceleration change rates $(\Delta(\Delta\omega_\psi), \Delta(\Delta\omega_\theta))$ are stored in the memory, for example, and regression line tilts (A1, A2) are respectively calculated using Equations (15) and (16) below (Step 1803). The regression line tilts are ratios of the acceleration change rates to the angular acceleration change rates, that is, the radius gyrations $(R_\psi(t), R_\theta(t))$. It should be noted that as a reference, methods of calculating regression line segments (B1, B2) are respectively expressed by Equations (17) and (18) below.

$$A_1 = R_\theta(t) = [\{\Sigma(\Delta(\Delta\omega_{\psi j}))^2\} * \Sigma(\Delta a_{yj})^2 - \{\Sigma\Delta(\Delta_{\psi j}) * \tau\Delta(\Delta\omega_{\psi j}) * \Delta a_{yj}\}] / [n * \Sigma(\Delta(\Delta\omega_{\psi j}))^2 - \{\tau\Delta(\Delta\omega_{\psi j})\}^2] \quad (15)$$

$$A_2 = R_\psi(t) = [\{\Sigma(\Delta(\Delta\omega_{\theta j}))^2 * \Sigma(\Delta a_{xj})^2\} - \{\Sigma\Delta(\Delta\omega_{\theta j}) * \Sigma\Delta(\Delta\omega_{\theta j}) * \Delta a_{xj}\}] / [n * \Sigma(\Delta(\Delta\omega_{\theta j}))^2 - \{\Sigma\Delta(\Delta\omega_{\theta j})\}^2] \quad (16)$$

$$B_1 = [\{n * \Sigma\Delta(\Delta\omega_{\psi j}) * \Delta a_{yj}\} - \{\Sigma\Delta(\Delta\omega_{\psi j}) * \Sigma\Delta a_{yj}\}] / [n * \Sigma(\Delta(\Delta\omega_{\psi j}))^2 - \{\Sigma\Delta(\Delta_{\psi j})\}^2] \quad (17)$$

$$B_2 = [\{n * \Sigma\Delta(\Delta\omega_{\theta j}) * \Delta a_{xj}\} - \{\Sigma\Delta(\Delta\omega_{\theta j}) * \Sigma\Delta a_{xj}\}] / [n * \Sigma(\Delta(\Delta\omega_{\theta j}))^2 - \{\Sigma\Delta(\Delta_{\theta j})\}^2] \quad (18)$$

In Equations (15) to (18) above, n represents a sampling count of the acceleration change rates $(\Delta a_x, \Delta a_y)$ and angular acceleration change rates $\Delta(\Delta\omega_\theta)$ $(\Delta(\Delta\omega_\psi))$. The sampling count n is suitably set so that operational errors are minimized.

Upon calculating the radius gyrations, the velocity values are calculated based on the respective radius gyrations as in Steps 1708 and 1714 of FIG. 42 (Step 1804).

It should be noted that the effect of noises in a high-frequency range may be reduced by making the signals of the radius gyrations or the signals of the velocity values pass through the low-pass filter.

In the embodiment shown in FIG. 43, by calculating the regression line tilt as the radius gyration, it becomes possible to calculate the radius gyrations and velocity values $(V_x, V_y)$ more accurately. Therefore, the movement of the pointer 2 displayed on the screen 3 can be made a natural movement that matches the intuitional operation of the user.

The descriptions above have been given on the method of calculating the regression line tilts in the dimensions of the acceleration change rates and angular acceleration change rates. However, the present invention is not limited thereto, and the regression line tilts may be calculated in dimensions of displacements and angles, velocities and angular velocities, and accelerations and angular accelerations.

Furthermore, the velocity values may be calculated by the processing shown in FIG. 15 above in Step 1103 of FIG. 35. It should be noted that the velocity value calculation method based on the radius gyrations can be applied to any of the embodiments above.

The embodiment of the present invention is not limited to the above embodiments, and various other embodiments are conceivable.

The above embodiments have described about the biaxial acceleration sensor unit and the biaxial angular velocity sensor unit. However, the present invention is not limited thereto, and the input apparatus 1 may include, for example, acceleration sensors of three orthogonal axes and angular velocity sensors of three orthogonal axes, and even with only one of the above, the processing shown in the above embodiments can be realized. Alternatively, an embodiment in which the input apparatus 1 includes a uniaxial acceleration sensor or a uniaxial angular velocity sensor is also conceivable. When provided with the uniaxial acceleration sensor or uniaxial angular velocity sensor, typically a screen in which a plurality of UIs as pointing targets of the pointer 2 displayed on the screen 3 are arranged uniaxially is conceivable.

Alternatively, the input apparatus 1 may include a geomagnetic sensor, an image sensor, and the like instead of the acceleration sensors and the angular velocity sensors.

The input apparatus of the above embodiments transmits the input information to the control apparatus wirelessly. However, the input information may be transmitted by wire.

In the above embodiments, the UI that moves on the screen in accordance with the movement of the input apparatus has been described as a pointer. However, the UI is not limited to the pointer, and a character image or other images may be used instead.

The detection axes of each of the angular velocity sensor unit 15 and the acceleration sensor unit 16 of the sensor unit 17 do not necessarily need to be mutually orthogonal like the X' axis and the Y' axis described above. In this case, the accelerations respectively projected in the mutually-orthogonal axial directions can be obtained by a calculation that uses a trigonometric function. Similarly, the angular velocities about the mutually-orthogonal axes can be obtained by the calculation that uses the trigonometric function.

In the above embodiments, descriptions have been given on the case where, with the pressing of the button 11 or the release of the pressing as a trigger, the movement of the pointer 2 is regulated during at least one of the time periods of the post-input regulation time (fixed, variable) and the post-cancel regulation time (fixed, variable). However, the present invention is not limited thereto, and with the pressing of a scroll button (not shown) provided to the input apparatus 1 or the release of the pressing thereof as a trigger, processing for regulating scroll may be executed on the screen 3 during at least one of the time periods of the post-input regulation time (fixed, variable) and the post-cancel regulation time (fixed, variable). The scroll button is a button having a function of executing scroll on the screen when the button is pressed or the button is not pressed. When the scroll button is pressed (or not pressed), the velocity values above correspond to amounts by which an image is scrolled on the screen 3. For example, when the user swings the input apparatus 1 in the vertical direction while pressing the scroll button, the image is scrolled in the vertical direction on the screen 3 in accordance with that operation. When the input apparatus 1 is swung in the lateral direction, the control apparatus 40 may execute processing of scrolling the image in the lateral direction on the screen 3.

Moreover, with the pressing of a zoom button (not shown) provided to the input apparatus 1 or the release of the pressing thereof as a trigger, processing of regulating zoom may be executed on the screen 3 during at least one of the time periods of the post-input regulation time (fixed, variable) and the post-cancel regulation time (fixed, variable). The zoom button is a button having a function of executing zoom on the screen when the button is pressed or the button is not pressed. When the zoom button is pressed (or not pressed), the velocity values above correspond to amounts by which the image on the screen 3 is zoomed in/out. For example, when the user swings the input apparatus 1 upwards while pressing the zoom button, the image is zoomed in on the screen 3. On the other hand, when the user swings the input apparatus 1 downwards, the image is zoomed out on the screen 3.

It should be noted that a relationship of the operation direction of the input apparatus 1 with a relationship between a scroll direction of an image and zoom in/out of an image can be changed appropriately. Also in modifications to be described later, the processing regarding scroll, zoom, rotation, and other movements of the image on the screen can be applied.

In the descriptions above, during at least one of the time periods of the regulation times (fixed, variable) after the input of the operation signal caused by the pressing of the button 11 of the input apparatus 1 by the user and after the cancel of the operation signal by the release of the pressing, the movement of the pointer 2, the movement of the image on the screen by scroll, the movement of the image on the screen by zoom, the movement of the image on the screen by rotation, and the like are regulated.

However, the movement of the pointer 2, the movement of the screen by scroll, or the movement of the screen by zoom may be regulated during a predetermined time period or a variable time period after an operation command (e.g., determination command) is generated by the input apparatus 1 based on the operation signal generated by the pressing of the button 11 by the user, for example. The operation command is generated when the input of the operation signal is started, after a predetermined time period has elapsed since the input, when the input is canceled, or after a predetermined time period has elapsed since the cancel thereof. This may be executed mainly by the input apparatus 1 or mainly by the control apparatus 40. When executed mainly by the control apparatus 40, the control apparatus 40 receives the operation command and the control command transmitted from the input apparatus 1. The control command is a command containing information based on the movement signals of the input apparatus 1 like information on the velocity values, angular velocity values, and the like. Based on the received control command, the control apparatus 40 generates movement information for moving an image such as the pointer 2. Then, the control apparatus 40 controls the generation of the movement information so that, during the predetermined time period or the variable time period since the reception of the operation command, the movement of the image is stopped. The movement information is velocity information or displacement information of the image such as the pointer 2, and during the predetermined time period (or variable time period), the control apparatus 40 sets the velocity information or the displacement information to 0 or does not output it.

Next, various modifications regarding other operations of the input apparatus 1 will be described. FIG. 44 are diagrams showing the modifications.

The above embodiments have taken the example where the movement of the pointer 2, the movement of the image on the screen by scroll, the movement of the image on the screen by zoom, and the like are "regulated", that is, stopped. However, the modifications to be described hereinbelow show an example where a "sensitivity changes" regarding those movements with respect to the input apparatus 1. Those modifications each show an example where, based on the operation signal generated by the pressing of the button 11 by the user, for example, a control command for changing the sensitivity of the movement of the image such as the pointer with respect to the movement of the input apparatus 1 is generated in temporal relation to a generation timing of the operation command (e.g., determination command). The generation timing of the operation command is as described above.

When the sensitivity of the movement of the image with respect to the movement of the input apparatus 1 changes, the movement of the image becomes slow according to a predetermined timing (i.e., in temporal relation to the generation timing of the operation signal or operation command). Alternatively, when the sensitivity of the movement of the image with respect to the movement of the input apparatus 1 changes, the sensitivity may be changed so that the movement of the image becomes fast according to the predetermined timing.

The meaning of the time period during which the sensitivity of the movement of the image is changed (time period during which the operation command for changing the sensitivity of the movement of the image is generated; hereinafter, referred to as sensitivity change period) being in temporal relation to the generation timing of the operational information is that, as in the above embodiments, for example, the sensitivity is changed during a predetermined time period since the start of the input of the operation signal or the cancel of the input thereof.

On the other hand, the sensitivity change period being in temporal relation to the generation timing of the operation command means various ways such as a constant or variable time period right after or right before the operation command, or a constant or variable time period containing a pulse width of the operation command, as will be described in the modifications of FIG. 44.

For changing the sensitivity of the movement of an image such as the pointer 2, typical is a method that involves multiplying a parameter for determining the movement of the pointer 2, such as velocities, angular velocities, accelerations, and angular accelerations, by a weighting factor or a weighting function for making the movement slow.

FIG. 44 are diagrams for illustrating those modifications. In descriptions of FIG. 44, a case where the button 11 is pressed by the user will be described unless stated otherwise. Moreover, arrows shown in FIG. 44 indicate a time period during which the movement of the pointer 2 (or scroll, zoom, etc.) is regulated or a time period during which a first sensitivity with a certain level of sensitivity of the movement is changed to a second sensitivity of a certain level different therefrom (sensitivity change period described above). For regulating the movement of the pointer 2, the input apparatus 1 may stop transmitting the velocity values or transmit the velocity values with the displacement amount set to 0. On the other hand, arrows with dashed lines indicate that the regulation time of the movement of the pointer 2 and the like (or scroll, zoom, etc.) is variable, or the sensitivity change period is variable. Further, arrows with broken lines indicate that a start point of the time period during which the movement of the pointer 2 (or scroll, zoom, etc.) is regulated can be changed appropriately.

(First Modification)

FIG. 44A is a timing chart showing an operation of the input apparatus 1 according to a first modification. FIG. 44A shows a state where, after the input of the operation signal, the operation signal is output until the input of the operation signal is canceled. When the user presses the button 11, an operation signal from a switch is input to the MPU 19. Upon input of the operation signal, the MPU 19 stops outputting the velocity values until the user releases the pressing of the button 11 and the input of the operation signal from the switch is canceled (see arrow with solid line). Accordingly, the pointer 2 can be prevented from moving on the screen due to the movement of the casing 10 by an operation caused at the start of the pressing of the button 11. Here, instead of stopping the transmission of the velocity values from immediately after the input of the operation signal, it is also possible for the MPU 19 to stop outputting the velocity values after an elapse of a minute time (e.g., 0.05 sec) (see arrow with broken line). The same operational effect can be obtained as long as it is a minute time.

When the pressing of the button 11 is released by the user and the input of the operation signal is thus canceled, the MPU 19 starts the countdown of the count value C(t) and variably controls the post-cancel regulation time.

Brief descriptions have heretofore been given. However, since points other than the point where the movement of the pointer is regulated after an elapse of a minute time since the start of the input of the operation signal (arrow with broken line) are the same as those of FIG. 27 above, details on the operation will be omitted. It should be noted that the operational effect is also the same as that of FIG. 27.

This embodiment has described the case where the button 11 is pressed, but it is also possible to execute the processing shown in FIG. 44A when the scroll button or zoom button is pressed.

Hereinafter, an operation thereof will be described.

The user executes the scroll operation on the screen 3 by swinging the input apparatus 1 in a state where the scroll button is not pressed. By pressing the scroll button, the user can regulate the scroll operation. Then, the pressing of the scroll button is released again, and the scroll operation is executed on the screen 3. When the user releases the pressing of the scroll button again to start the scroll operation on the screen, the scroll operation is regulated on the screen during the post-cancel regulation time. Accordingly, scroll operations unintended by the user can be prevented from being made on the screen due to the movement of the casing caused when the pressing of the scroll button is released. Moreover, because the post-cancel regulation time is controlled variably in accordance with the angular velocity values and the like, scroll can readily be started when wishing to readily execute the scroll, and even the user who causes a large apparatus shake can readily perform the scroll operation. It should be noted that though descriptions have been given on the scroll operation, the same operational effect as scroll can also be obtained in zoom.

(Second Modification)

FIG. 44B is a timing chart showing an operation of the input apparatus according to a second modification. In this and subsequent embodiments, descriptions will be given while referring to the timing chart of FIG. 44A on the output of the operation signal caused by the pressing of the button.

FIG. 44B shows an output waveform of a determination command (type of operation command) output when the button 11 is pressed. As shown in FIGS. 44A and 44B, the determination command is output as a rectangular short-term pulse at the start of the input of the operation signal. In this embodiment, with the input of the operation signal (pressing of the button 11) as a trigger, the MPU 19 outputs a determination command, and starts counting the post-input regulation time with the output of the determination command as a trigger. Upon start of the count of the post-input regulation time, the MPU 19 variably controls the post-input regulation time in accordance with the movement signal of the angular velocities and the like. It should be noted that a drag operation may be executed on the screen 3 when the post-input regulation time has elapsed and the input of the operation signal is not yet canceled.

In this embodiment, the rectangular pulse-like waveform has been described to be the determination command. However, the present invention is not limited thereto, and the rectangular pulse-like waveform may be an operation command other than the determination command. The operation command varies depending on a type of the button operated. The same holds true in embodiments to be described later.

(Third Modification)

FIG. 44C is a timing chart showing an operation of the input apparatus according to a third modification. In this embodiment, instead of issuing a determination command immediately after the input of the operation signal (pressing of the button 11), the determination command is output after an elapse of an arbitrary time period since the input of the operation signal. With the output of the determination command or a combination of the input of the operation signal and the output of the determination command as a trigger, the MPU 19 controls the post-input regulation time.

The operation will be described sequentially from the arrow on top.

(1) The MPU 19 starts regulating the movement of the pointer 2 with the end of the output of the pulse-like determination command as a trigger, and variably controls the post-input regulation time in accordance with the angular velocity values and the like. The drag operation may be executed on the screen 3 when the post-input regulation time has elapsed and the operation signal is not yet canceled.

(2) The MPU 19 starts regulating the movement of the pointer 2 with the start of the output of the pulse-like determination command as a trigger, and variably controls the post-input regulation time in accordance with the angular velocity values and the like. The drag operation may be executed on the screen 3 when the post-input regulation time has elapsed and the operation signal is not yet canceled.

(3) The MPU 19 starts regulating the movement of the pointer 2 with the start of the input of the operation signal as a trigger, and variably controls the post-input regulation time in accordance with the angular velocity values and the like. It should be noted that instead of regulating the movement of the pointer 2 from immediately after the input of the operation signal, the MPU 19 may start regulating the movement of the pointer 2 after an elapse of a minute time since the input of the operation signal (see arrow with broken line). The drag operation may be executed on the screen when the post-input regulation time has elapsed.

(4) The MPU 19 starts regulating the movement of the pointer 2 with the start of the input of the operation signal as a trigger, and cancels the regulation of the movement of the pointer 2 with the end of the output of the pulse-like determination command as a trigger. It should be noted that the regulation of the movement of the pointer 2 may be started after an elapse of a minute time since the start of the input of the operation signal.

(5) The MPU 19 starts regulating the movement of the pointer 2 with the start of the input of the operation signal as a trigger, and cancels the regulation of the movement of the pointer 2 with the start of the output of the pulse-like determination command as a trigger. It should be noted that the regulation of the movement of the pointer 2 may be started after an elapse of a minute time since the start of the input of the operation signal.

The processing described in this embodiment and the second modification above may be applied to the processing carried out when the code button 98 of the input apparatus 91 shown in FIG. 24 above is pressed, for example. It should be noted that with a TV remote controller and the like, the operation command is output at the start of the pressing of the button in many cases.

(Fourth Modification)

FIG. 44D is a timing chart showing an operation of the input apparatus according to a fourth modification.

In this embodiment, instead of outputting the determination command with the start of the input of the operation signal (start of the pressing of the button 11) as a trigger, the determination command is output with the cancel of the input of the operation signal (release of the pressing of the button 11) as a trigger. The MPU 19 starts counting the post-cancel regulation time with the output of the determination command as a trigger. The MPU 19 variably controls the post-cancel regulation time in accordance with the acceleration values and the like.

(Fifth Modification)

FIG. 44E is a timing chart showing an operation of the input apparatus according to a fifth modification. In this embodiment, instead of issuing the determination command immediately after the cancel of the input of the operation signal (release of the pressing of the button 11), the determination command is output after an elapse of an arbitrary time period since the cancel of the input of the operation signal. With the output of the determination command or a combination of the cancel of the input of the operation signal and the output of the determination command as a trigger, the MPU 19 controls the post-cancel regulation time.

The operation will be described sequentially from the arrow on top.

(1) The MPU 19 starts regulating the movement of the pointer 2 with the end of the output of the pulse-like determination command as a trigger, and variably controls the post-cancel regulation time in accordance with the angular velocity values and the like.

(2) The MPU 19 starts regulating the movement of the pointer 2 with the start of the output of the pulse-like determination command as a trigger, and variably controls the post-cancel regulation time in accordance with the angular velocity values and the like.

(3) The MPU 19 starts regulating the movement of the pointer 2 with the cancel of the input of the operation signal as a trigger, and variably controls the post-cancel regulation time in accordance with the angular velocity values and the like. It should be noted that instead of regulating the movement of the pointer 2 from immediately after the cancel of the input of the operation signal, the MPU 19 may start regulating the movement of the pointer 2 after an elapse of a minute time since the cancel of the input of the operation signal (see arrow with broken line).

(4) The MPU 19 starts regulating the movement of the pointer 2 with the cancel of the input of the operation signal as a trigger, and cancels the regulation of the movement of the pointer 2 with the end of the output of the pulse-like determination command as a trigger. It should be noted that the regulation of the movement of the pointer 2 may be started after an elapse of a minute time since the cancel of the input of the operation signal.

(5) The MPU 19 starts regulating the movement of the pointer 2 with the cancel of the input of the operation signal as a trigger, and cancels the regulation of the movement of the pointer 2 with the start of the output of the pulse-like determination command as a trigger. It should be noted that the regulation of the movement of the pointer 2 may be started after an elapse of a minute time since the cancel of the input of the operation signal.

The processing of the input apparatus 1 may be executed by a combination of one of the processing of the MPU 19 described in the second modification and third modification above and one of the processing of the MPU 19 described in the fourth modification and fifth modification above. Accordingly, the same operational effect as the embodiment shown in FIG. 32 above can be obtained.

(Sixth Modification)

FIG. 44F is a timing chart showing an operation of the input apparatus according to a sixth modification.

In descriptions of this embodiment, a case where a movement control button (not shown) is operated will be described. The movement control button is a button having a function of moving the pointer 2 when the button is pressed, or a button having a function of moving the pointer when the button is not pressed. Here, the button 11 (determination button) and the movement control button may be provided as a single button. In the descriptions of this embodiment, the movement control button is described to be a button having a function of moving the pointer 2 when the button is pressed and that is also used as the button 11. Moreover, the MPU 19 will be described to output a determination command with the release of the pressing of the movement control button (button 11) as a trigger.

The user swings the casing 10 and places the pointer 2 on an arbitrary icon 4 while pressing the movement control button. Upon placing the pointer 2 on the arbitrary icon 4, the user releases the pressing of the movement control button 11. When the pressing of the movement control button is released and the input of the operation signal is canceled, the MPU 19 stops outputting the movement command so that the movement of the pointer 2 is regulated. In addition, when the input of the operation signal is canceled, the MPU 19 outputs a determination command. In this embodiment, because the movement of the pointer is regulated when the pressing of the movement control button is released, processing unintended by the user, such as the pointer 2 being moved from the icon 4 due to the movement of the casing 10 when the movement control button is released with the result that a command cannot be issued, can be prevented from being executed. It should be noted that the MPU 19 may output the determination command after an elapse of an arbitrary time period since the cancel of the input of the operation signal (see FIG. 44E). Moreover, insofar as it is a minute time, the movement of the pointer 2 may be regulated after an elapse of a predetermined time period since the cancel of the input of the operation signal (see arrow with broken line).

The user represses the movement control button and starts moving the pointer. When the movement control button is pressed and the operation signal is input, the MPU 19 starts counting the post-input regulation time with the start of the input of the operation signal as a trigger, and variably controls the post-input regulation time in accordance with the angular velocity values. Accordingly, the pointer 2 can be prevented from making any moves unintended by the user due to the movement of the casing 10 when the movement control button is pressed, and the movement of the pointer can readily be started when the user wishes to readily start moving the pointer. Moreover, even a user who causes a large apparatus shake can readily perform the pointing operation. It should be noted that the MPU 19 may start counting the post-input regulation time with the output of the determination command as a trigger (see FIG. 44B).

Heretofore, descriptions have been given using the expressions of the input of the operation signal by the pressing of the button and the cancel thereof. However, "generates operational information" means that a status of an electric signal is shifted due to the input of the operation signal and the cancel thereof by the operation to the operation section, meaning that both statuses of the input and cancel are contained.

Next, descriptions will be given assuming that the button pressed in FIG. 44F is the scroll button.

It should be noted that descriptions will be given assuming that the image is scrolled on the screen 3 when the scroll button is pressed.

The user swings the casing 10 while pressing the scroll button to thus scroll the image, and displays an arbitrary image on the screen. Upon displaying the arbitrary image, the user releases the pressing of the scroll button and regulates the scroll. When the pressing of the scroll button 11 is released and the input of the operation signal is canceled, the MPU 19 regulates transmission of the velocity values. Accordingly, it becomes possible to prevent a displayed arbitrary image from being deviated due to the scroll of the image on the screen caused by the movement of the casing 10 when the scroll button is released. By repressing the scroll button, the user starts scrolling the image on the screen. When the scroll button is pressed and the input of the operation signal is started, the MPU 19 starts counting the post-input regulation time with the start of the input of the operation signal as a trigger, and variably controls the post-input regulation time in accordance with the acceleration values and the like. The MPU 19 starts the transmission of the velocity values after an elapse of the post-input regulation time. Accordingly, the image can be prevented from being scrolled in a direction unintended by the user due to the movement of the casing 10 when the scroll button is pressed, and the scroll can readily be started when the user wishes to readily start the scroll. Moreover, even the user who causes a large apparatus shake can readily perform the scroll operation.

The processing according to each of the modifications shown in FIG. 44 may be executed mainly by the input apparatus 1 or may be executed mainly by the control apparatus 40. When executed mainly by the control apparatus 40, the control apparatus 40 receives the operational information, control command, and operation command from the input apparatus 1. The control apparatus 40 generates movement information for moving an image such as the pointer 2 based on the received control command. Then, the control apparatus 40 generates the movement information for changing the sensitivity of the movement of the image such as the pointer 2 with respect to the input apparatus 1 in temporal relation to a reception timing of the operational information or the operation command.

Descriptions have been given as the scroll operation in the above descriptions. However, the same operational effect can also be obtained in a zoom operation.

The above embodiments have described about the control system that includes the input apparatus and the control apparatus. However, a handheld apparatus in which a display section is provided to a device such as the input apparatus, and a pointer and other images are displayed on the display section may also be used, for example. Examples of the handheld apparatus include a cellular phone, a compact PC, and a PDA (Personal Digital Assistance).

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An input apparatus outputting a command for controlling a pointer on a screen, comprising:
    a casing;
    a sensor to detect a movement of the casing and output a detection signal corresponding to the movement of the casing;
    an operation section to input an operation signal with respect to the input apparatus, that is unrelated to the movement of the casing;
    a command output means for outputting a movement command corresponding to a displacement amount of the pointer on the screen, the movement command corresponding to the detection signal, and an operation command corresponding to the operation signal input via the operation section; and
    a control means for controlling the output of the movement command so that, during a first time period since a cancel of the input of the operation signal via the operation section, a movement of the pointer on the screen is stopped, and wherein the control means controls the output of the movement command so that, during a second time period since a start of the input of the operation signal via the operation section, the movement of the pointer on the screen is stopped,
    wherein at least one of the first time period since the cancel of the input of the operation signal and the second time period since the start of the input of the operation signal is customized by a user.

2. The input apparatus according to claim 1,
wherein the control means controls the output of the movement command so that, when the input of the operation signal is started within the first time period since the cancel of the input of the operation signal, the movement of the pointer on the screen is stopped during a second time period since the start of the input of the operation signal.

3. The input apparatus according to claim 1,
wherein the control means controls the output of the movement command so that, when the input of the operation signal is canceled within the second time period since the start of the input of the operation signal, the movement of the pointer on the screen is stopped during the first time period since the cancel of the input of the operation signal.

4. The input apparatus according to claim 1,
wherein the sensor is a biaxial angular velocity sensor or a biaxial acceleration sensor to detect a movement corresponding to an X axis as a horizontal axis on the screen and a movement corresponding to a Y axis as a vertical axis on the screen.

5. The input apparatus according to claim 1, wherein the first time period since the cancel of the input of the operation signal is 0.2 seconds, and the second time period since the start of the input of the operation signal is 0.2 seconds.

6. A control apparatus controlling a pointer on a screen in accordance with a detection signal and an operation signal output from an input apparatus including a casing, a sensor to detect a movement of the casing and output the detection signal corresponding to the movement of the casing, and an operation section to input the operation signal that is unrelated to the movement of the casing, the control apparatus comprising:
a reception means for receiving the detection signal and the operation signal;
an output means for outputting a first control signal corresponding to a displacement amount of the pointer on the screen, the first control signal corresponding to the detection signal, and a second control signal corresponding to the operation signal input via the operation section;
a processing means for controlling a display position of the pointer on the screen in accordance with the first control signal and executing predetermined processing in accordance with the second control signal; and
a control means for controlling the output of the first control signal so that, during a first time period since a cancel of the input of the operation signal via the operation section, a movement of the pointer on the screen is stopped, and wherein the control means controls the output of the movement command so that, during a second time period since a start of the input of the operation signal via the operation section, the movement of the pointer on the screen is stopped,
wherein at least one of the first time period since the cancel of the input of the operation signal and the second time period since the start of the input of the operation signal is customized by a user.

7. A control method, comprising:
detecting a movement of a casing of an input apparatus and outputting a detection signal corresponding to the movement of the casing;
outputting a movement command corresponding to a displacement amount of a pointer on a screen, the movement command corresponding to the detection signal;
controlling a display position of the pointer on the screen in accordance with the movement command;
outputting an operation command corresponding to an operation signal with respect to the input apparatus input via an operation section of the casing, the operation signal being unrelated to the movement of the casing;
executing predetermined processing in accordance with the operation command; and
controlling the output of the movement command so that, during a first time period since a cancel of the input of the operation signal via the operation section, a movement of the pointer on the screen is stopped, and controlling the output of the movement command so that, during a second time period since a start of the input of the operation signal via the operation section, the movement of the pointer on the screen is stopped,
wherein at least one of the first time period since the cancel of the input of the operation signal and the second time period since the start of the input of the operation signal is customized by a user.

8. An input apparatus controlling a movement of a pointer on a screen, comprising:
a casing;
a movement signal output means for detecting a movement of the casing and outputting a first movement signal corresponding to the movement of the casing;
an operation section to output an operation signal that is unrelated to the movement of the casing;
a command output means for outputting a movement command for moving the pointer on the screen and an operation command corresponding to the operation signal;
an output control means for controlling the output of the movement command so that, after the operation signal is input, during a first time period since a cancel of the input of the operation signal, the movement of the pointer on the screen is stopped; and
a time control means for variably controlling the first time period in accordance with the first movement signal, wherein the time control means controls the first time period so that the first time period is shortened as an output value of the first movement signal increases, wherein the shortened first time period has a value greater than zero.

9. The input apparatus according to claim 8,
wherein the time control means controls the first time period so that the first time period is prolonged as an output value of a signal within a predetermined frequency range out of an output value of the first movement signal increases.

10. The input apparatus according to claim 8,
wherein the output control means controls the output of the movement command so that, during a second time period since a start of the input of the operation signal, the movement of the pointer on the screen is stopped.

11. The input apparatus according to claim 10,
wherein the time control means variably controls the second time period in accordance with the first movement signal.

12. The input apparatus according to claim 11,
wherein the time control means controls the second time period so that the second time period is shortened as an output value of the first movement signal increases, wherein the shortened second time period has a value greater than zero.

13. The input apparatus according to claim 11,
wherein the time control means controls the second time period so that the second time period is prolonged as an output value of a signal within a predetermined frequency range out of an output value of the first movement signal increases.

14. A control apparatus controlling a movement of a pointer on a screen in accordance with a movement signal and an operation signal output from an input apparatus including a casing, a movement signal output means for detecting a movement of the casing and outputting the movement signal corresponding to the movement of the casing, and an operation section to output the operation signal that is unrelated to the movement of the casing, the control apparatus comprising:
- a reception means for receiving the movement signal and the operation signal;
- an output means for outputting a first control signal for moving the pointer and a second control signal corresponding to the operation signal;
- a processing means for controlling display of the movement of the pointer on the screen in accordance with the first control signal and executing predetermined processing in accordance with the second control signal;
- an output control means for controlling the output of the first control signal so that, after the operation signal is input, during a first time period since a cancel of the input of the operation signal, the movement of the pointer on the screen is stopped; and
- a time control means for variably controlling the first time period in accordance with the movement signal, wherein the time control means controls the first time period so that the first time period is shortened as an output value of the first movement signal increases, wherein the shortened first time period has a value greater than zero.

15. A control method, comprising:
- detecting a movement of a casing and outputting a movement signal corresponding to the movement of the casing;
- outputting a movement command for moving a pointer on a screen;
- controlling display of a movement of the pointer on the screen in accordance with the movement command;
- outputting an operation command corresponding to an operation signal that is unrelated to the movement of the casing;
- executing predetermined processing in accordance with the operation command;
- controlling the output of the movement command so that, during a first time period since a cancel of the input of the operation signal, the movement of the pointer on the screen is stopped; and
- variably controlling the first time period in accordance with the movement signal, wherein the first time period is controlled so that the first time period is shortened as an output value of the first movement signal increases, wherein the shortened first time period has a value greater than zero.

16. An input apparatus controlling a movement of a pointer on a screen, comprising:
- a casing;
- a movement signal output means for detecting a movement of the casing and outputting a first movement signal corresponding to the movement of the casing;
- an operation section to output an operation signal that is unrelated to the movement of the casing;
- a command output means for outputting a movement command for moving the pointer on the screen and an operation command corresponding to the operation signal;
- an output control means for controlling the output of the movement command so that, after the operation signal is input, during a first time period since a start of the input of the operation signal, the movement of the pointer on the screen is stopped; and
- a time control means for variably controlling the first time period in accordance with the first movement signal, wherein the time control means controls the first time period so that the first time period is shortened as an output value of the first movement signal increases, wherein the shortened first time period has a value greater than zero.

17. A control apparatus controlling a movement of a pointer on a screen in accordance with a movement signal and an operation signal output from an input apparatus including a casing, a movement signal output means for detecting a movement of the casing and outputting the movement signal corresponding to the movement of the casing, and an operation section to output the operation signal that is unrelated to the movement of the casing, the control apparatus comprising:
- a reception means for receiving the movement signal and the operation signal;
- an output means for outputting a first control signal for moving the pointer and a second control signal corresponding to the operation signal;
- a processing means for controlling display of the movement of the pointer on the screen in accordance with the first control signal and executing predetermined processing in accordance with the second control signal;
- an output control means for controlling the output of the first control signal so that, after the operation signal is input, during a first time period since a start of the input of the operation signal, the movement of the pointer on the screen is stopped; and
- a time control means for variably controlling the first time period in accordance with the movement signal, wherein the time control means controls the first time period so that the first time period is shortened as an output value of the first movement signal increases, wherein the shortened first time period has a value greater than zero.

18. A control method, comprising:
- detecting a movement of a casing and outputting a movement signal corresponding to the movement of the casing;
- outputting a movement command for moving a pointer on a screen;
- controlling display of a movement of the pointer on the screen in accordance with the movement command;
- outputting an operation command corresponding to an operation signal that is unrelated to the movement of the casing;
- executing predetermined processing in accordance with the operation command;
- controlling the output of the movement command so that, during a first time period since a start of the input of the operation signal, the movement of the pointer on the screen is stopped; and
- variably controlling the first time period in accordance with the movement signal, wherein the first time period is controlled so that the first time period is shortened as an output value of the first movement signal increases, wherein the shortened first time period has a value greater than zero.

19. A handheld apparatus, comprising:
- a casing;
- a display section;

a sensor to detect a movement of the casing and output a detection signal corresponding to the movement of the casing;

an operation section to input an operation signal that is unrelated to the movement of the casing;

a command output means for outputting a movement command corresponding to a displacement amount of a pointer on a screen of the display section, the movement command corresponding to the detection signal, and an operation command corresponding to the operation signal input via the operation section;

a control means for controlling the output of the movement command so that, during a first time period since a cancel of the input of the operation signal via the operation section, a movement of the pointer on the screen is stopped, and wherein the control means controls the output of the movement command so that, during a second time period since a start of the input of the operation signal via the operation section, the movement of the pointer on the screen is stopped, wherein at least one of the first time period since the cancel of the input of the operation signal and the second time period since the start of the input of the operation signal is customized by a user; and a processing means for controlling a display position of the pointer on the screen in accordance with the movement command and executing predetermined processing in accordance with the operation command.

\* \* \* \* \*